(12) United States Patent
Launais

(10) Patent No.: US 6,198,483 B1
(45) Date of Patent: Mar. 6, 2001

(54) MOTION USER INTERFACE

(76) Inventor: Ken Launais, 1301 La. Playa, Apt. #4, San Francisco, CA (US) 94122

(*) Notice: Subject to any disclaimer, the term of this patent is extended or adjusted under 35 U.S.C. 154(b) by 0 days.

(21) Appl. No.: 08/964,655

(22) Filed: Nov. 5, 1997

Related U.S. Application Data

(60) Provisional application No. 60/036,619, filed on Jan. 30, 1997.

(51) Int. Cl.[7] .................................. G06F 7/00; G06F 3/14
(52) U.S. Cl. ........................ 345/355; 345/340; 345/977
(58) Field of Search .................... 345/340, 341, 345/342, 355, 356, 357, 977

(56) References Cited

U.S. PATENT DOCUMENTS

| | | | |
|---|---|---|---|
| 5,262,761 | 11/1993 | Scandura et al. | 340/133 |
| 5,333,254 | 7/1994 | Robertson | 395/155 |
| 5,339,390 * | 8/1994 | Robertson et al. | 345/342 |
| 5,485,197 * | 1/1996 | Hoarty | 345/349 |
| 5,499,330 * | 3/1996 | Lucas et al. | 345/357 |
| 5,513,306 | 4/1996 | Mills et al. | 395/148 |
| 5,670,984 * | 9/1997 | Robertson et al. | 345/355 |
| 5,689,287 * | 11/1997 | MacKinlay et al. | 345/427 |
| 5,717,914 * | 2/1998 | Hasick et al. | 345/340 |
| 5,751,286 * | 5/1998 | Barber et al. | 345/348 |
| 5,754,809 * | 5/1998 | Gandre | 345/340 |
| 5,781,175 * | 7/1998 | Hara | 345/127 |
| 5,880,733 * | 3/1999 | Horvitz et al. | 345/355 |

OTHER PUBLICATIONS

Cognitive Systems, Ken Launaais, 1995.

Video Search Engine/Operating System: A Cognitive Approach to Interface Design, Data Structures & Informational Transfer to the Mind, Ken Launaisl 1995, 1996.

* cited by examiner

Primary Examiner—Raymond J. Bayerl
Assistant Examiner—Cao H. Nguyen

(57) ABSTRACT

A data viewing terminal for displaying graphical indices pointing to elements of a database of information in a way that takes into account properties of the human visual perception system so as to maximize the amount of information that the user can absorb. The system has an interface with a processor that displays the graphical indices as images moving across a viewing screen. The screen is divided into viewing segments, each of which displays graphical indices in motion in a direction predetermined for that segment where the information in at least one pair of adjacent viewing segments moves in anti-parallel directions.

55 Claims, 63 Drawing Sheets

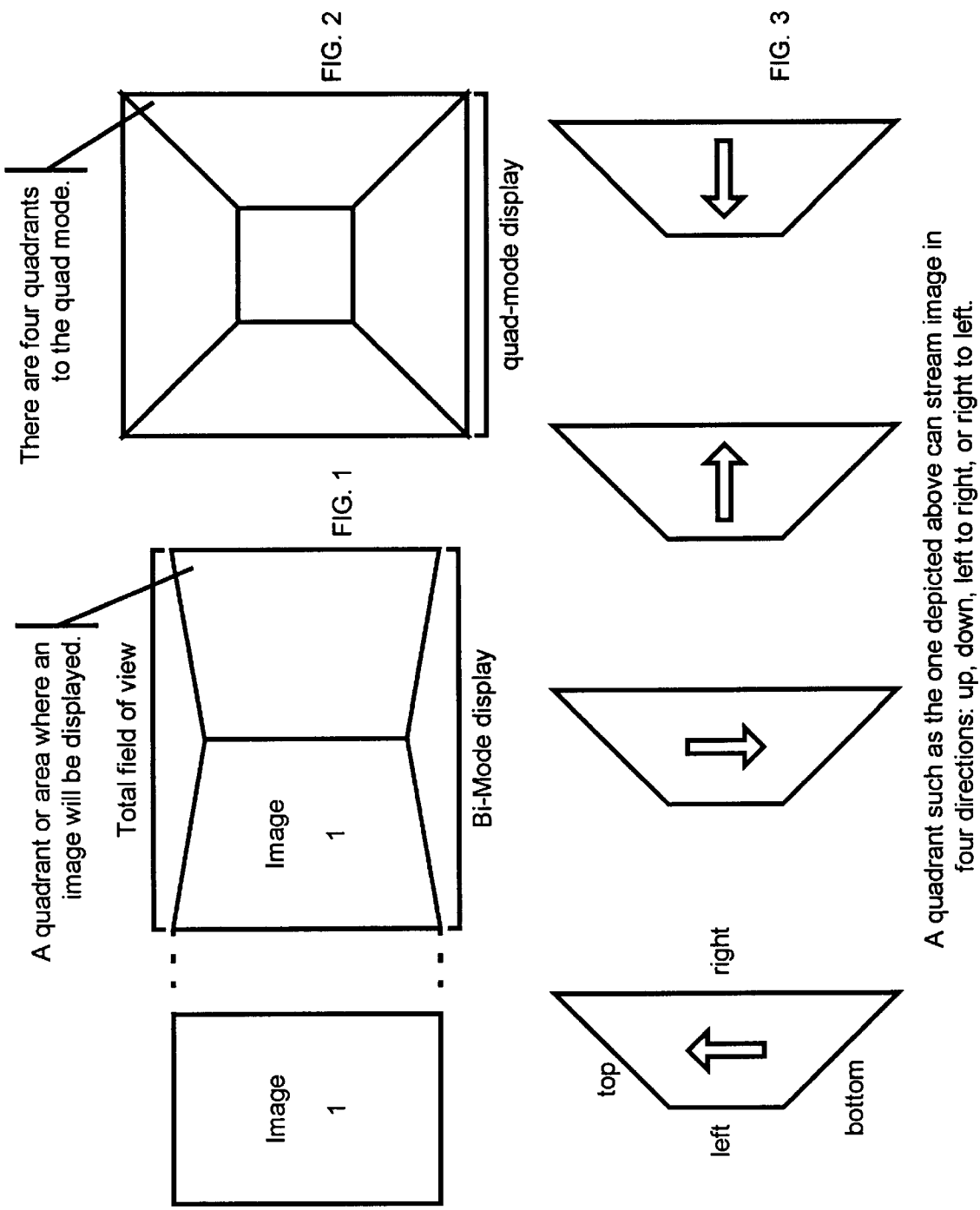

The directional flow setting splits the original total field of view into two separate fields (field A & B). This results in the visual cortex identifying two data input channels.

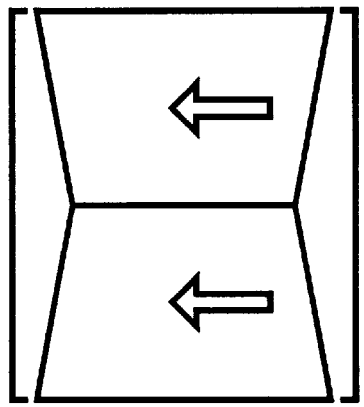
Configuration 5
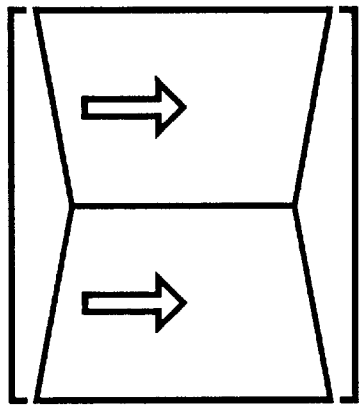
Configuration 6
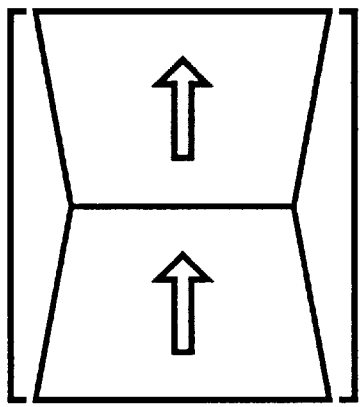
Configuration 7
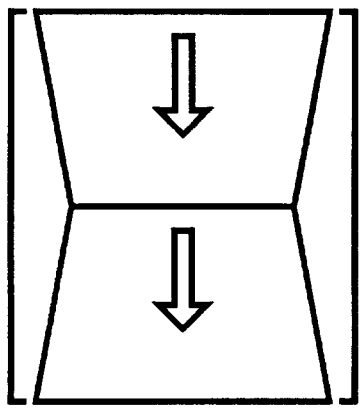
Configuration 8
FIG. 6
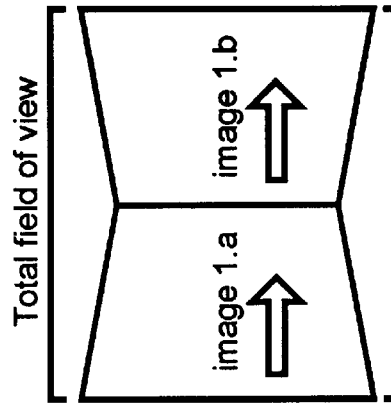
Configuration 7 is taken as an example but the resulting effect is the same as with config. 5, 6, & 8
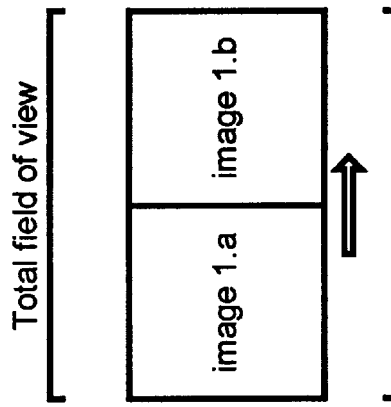
Two sets of information must be identified in one total field of view or one input channel rather than 2 as shown in Fig 5.
FIG. 7

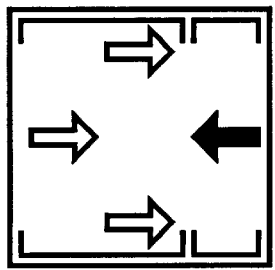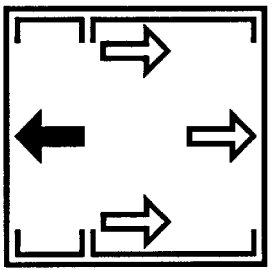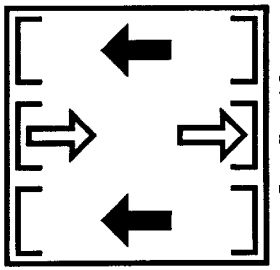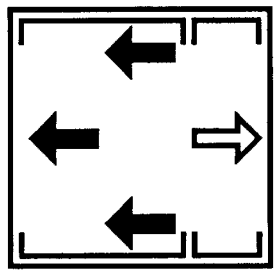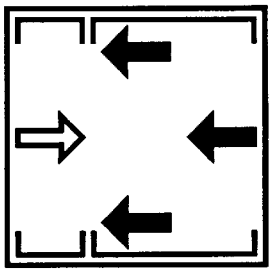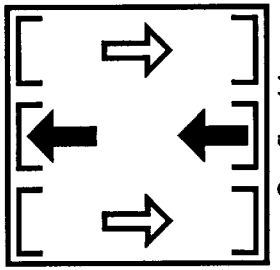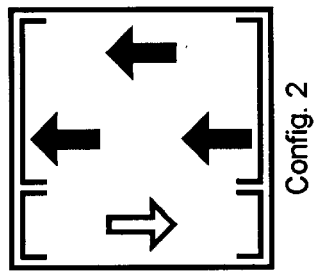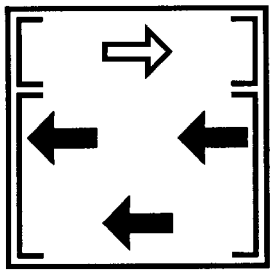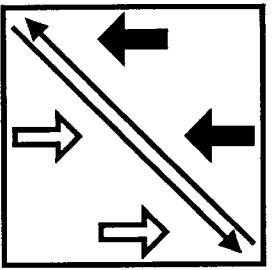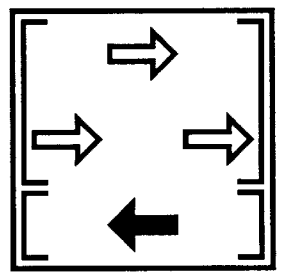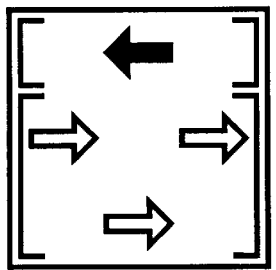
FIG. 8

Bi-Modal Multiple Cell 2

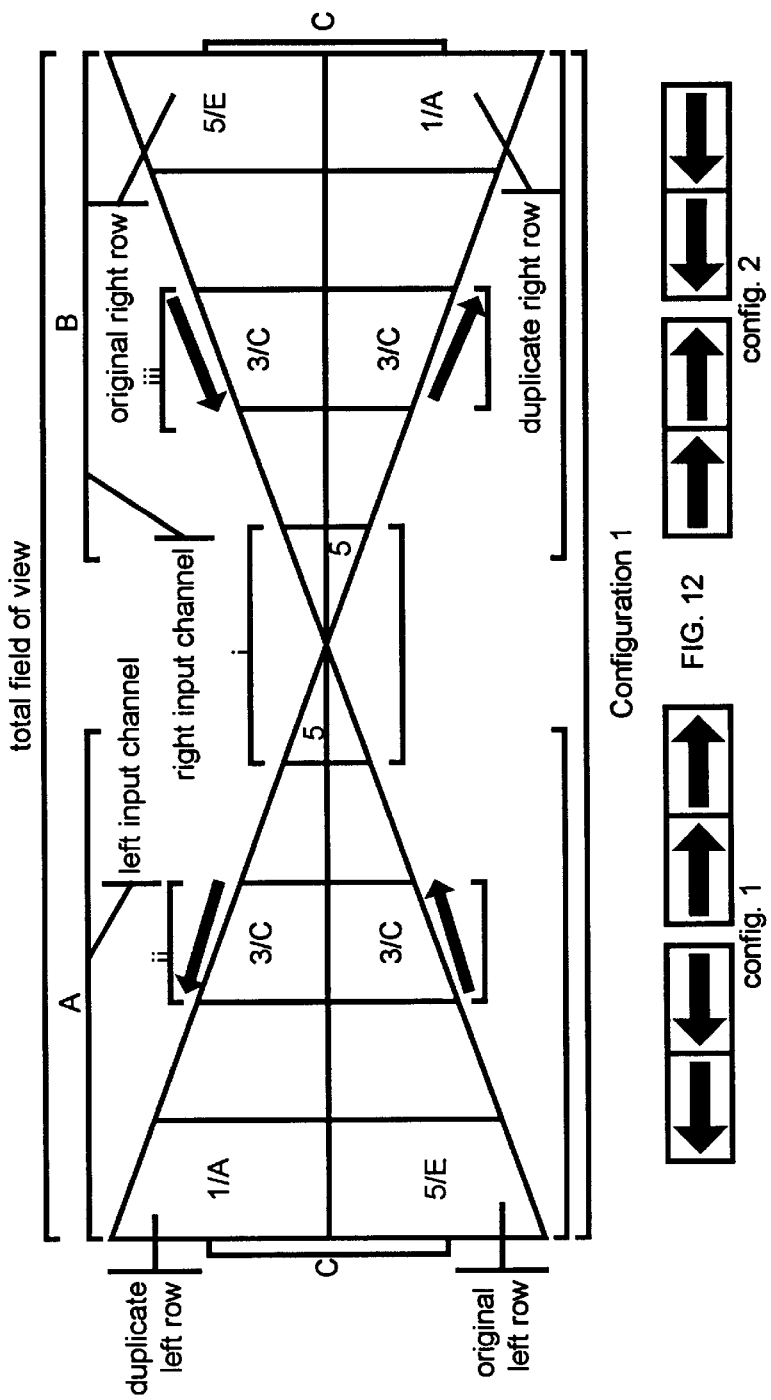

FIG. 12

A+B: As with the other bi-mode displays, the directional flow settings of both original and duplicate row split the total field of view into two vertical input CHANNELS (A & B) for one visual cortex.

C: Bi-modal multiple cell 2 is an advanced configuration where 5 cells and two duplicated rows per side increase the complexity of the display. For effective concurrent viewing to be possible, the directional flow setting of each specific row is inverted in relation to the same specific row on the opposite side. This results in C, a single horizontal input channel.

i: Central field of view
ii+iii: Adjacent field of views where the viewer can quickly shift his/her attention to the aligned proximity prompt.

A & B: first pair of vertical input CHANNELS.
C & D: second pair of vertical input CHANNELS.
I & II: third pair of input CHANNELS. This horizontal pair essentially splits the screen into the two pairs of vertical input CHANNELS, pair AB and pair CD.

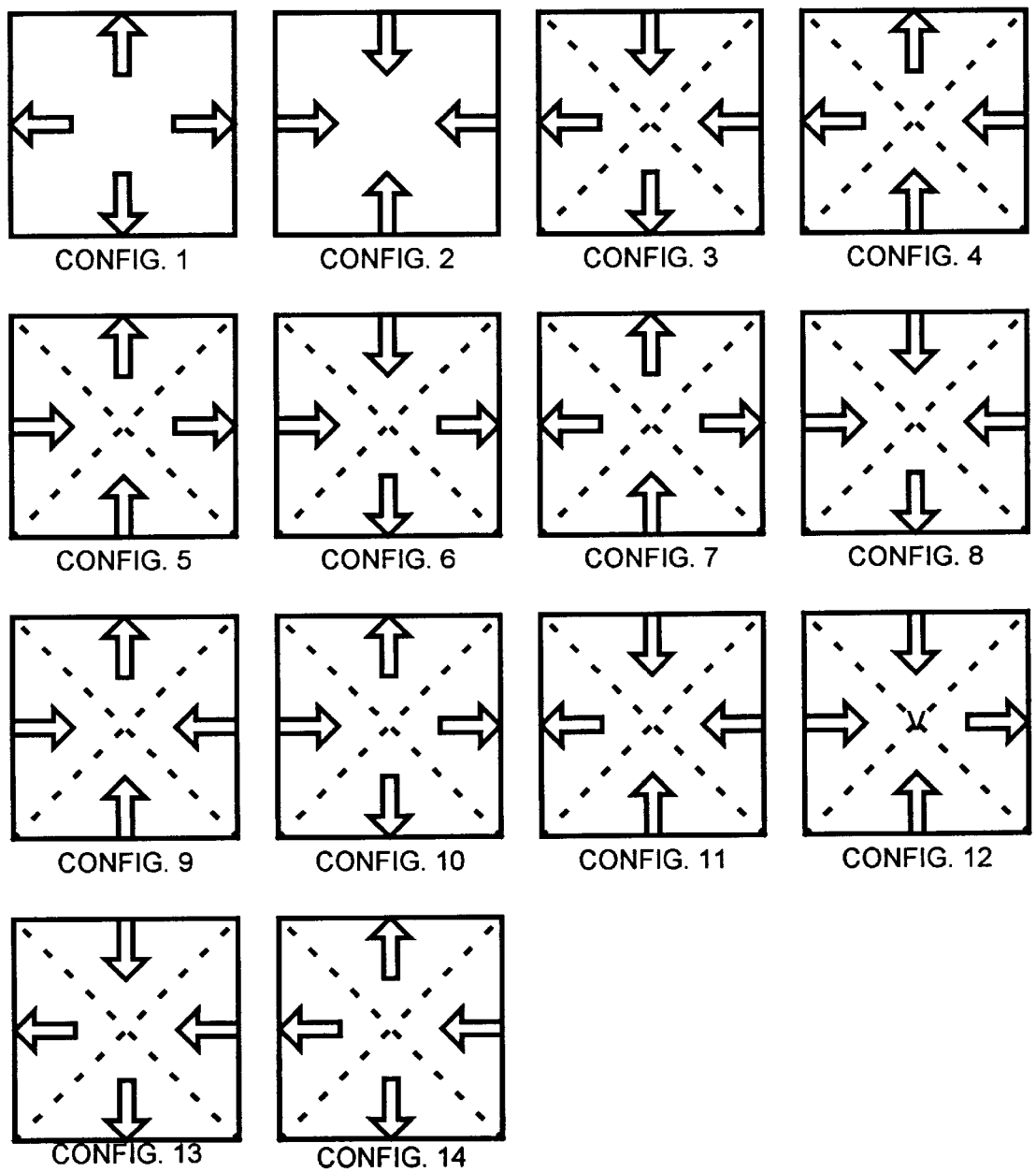
 Indicates positioning of split visual fields or input CHANNELS for the visual cortex.
FIG. 16

Bi-Mode Multiple Cell showing a user-defined visual tag search

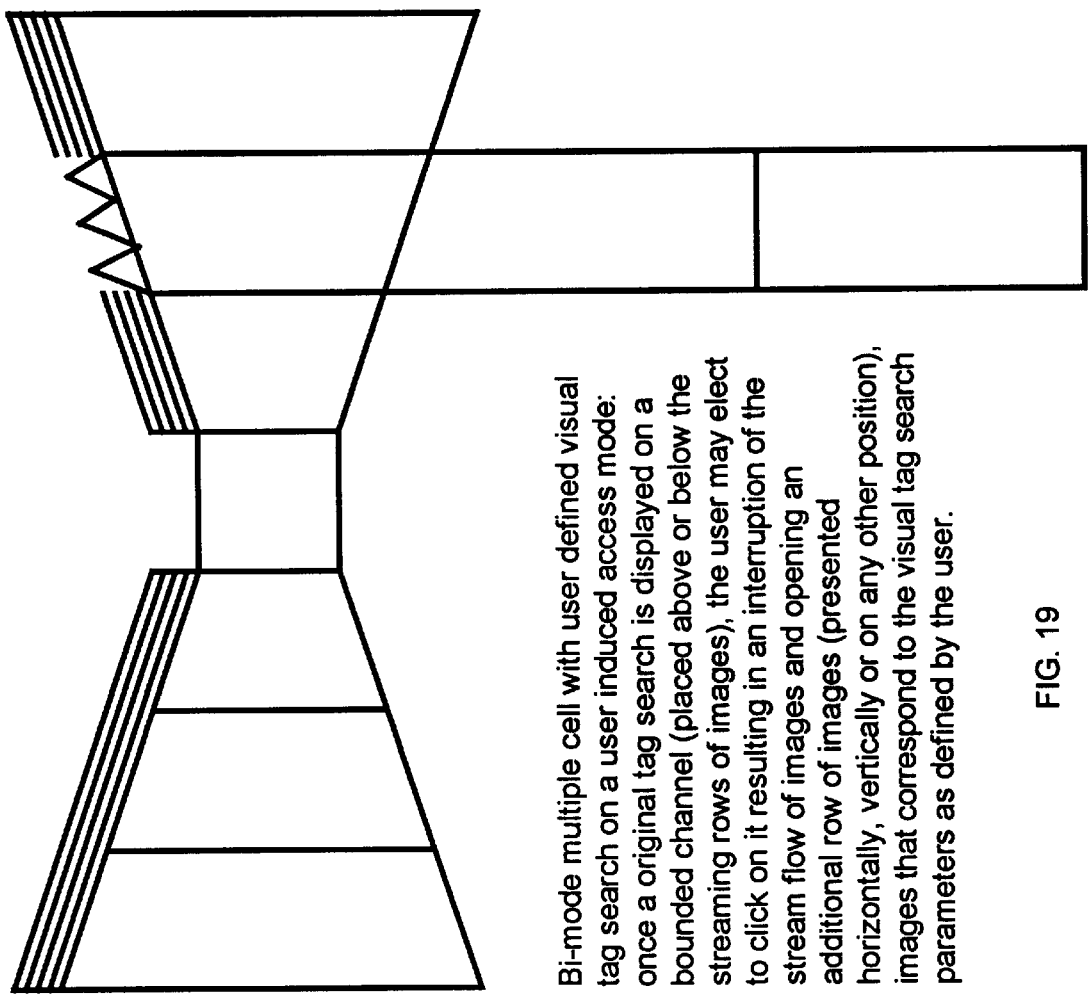

Bi-mode multiple cell with user defined visual tag search on a user induced access mode: once a original tag search is displayed on a bounded channel (placed above or below the streaming rows of images), the user may elect to click on it resulting in an interruption of the stream flow of images and opening an additional row of images (presented horizontally, vertically or on any other position), images that correspond to the visual tag search parameters as defined by the user.

FIG. 19

MOTION USER INTERFACE

RELATED APPLICATION DATA

The present application claims priority from U.S. Provisional Application No. 60/036,619 filed Jan. 30, 1997 pending, entitled MOTION USER INTERFACE the entirety of which is incorporated herein by reference for all purposes.

FIELD OF THE INVENTION

This invention relates to the use of a visual interface to enable a user to access data located on computer servers.

BACKGROUND OF THE INVENTION

Today's principal commercial computer user interface is the GUI (Graphical User Interface). It is based upon two simple user interface elements: the mouse controlled cursor and the pull-down menu. These elements have also been used in tandem to enable hypertext linking.

The current implementations of a GUI has serious limitations when used to navigate through large databases. It presents tree-like structures of file names, file contents and links on the Web. In doing so, 95% of the time it presents lists as vertical or horizontal screen displays. Just as the graphical format display of telephone books, GUI's tree-structures relegates the user to a tedious search through lists, and lists of lists, reached through only two features: scroll up and down buttons and links. In either case, the complete content of the database is not effectively presented and the format soon exhausts the user's attention span, making GUI inefficient at best for speedy navigation and location of desired content.

Numerous hierarchical tree-like structures, branching and sub-branching methodologies have been developed to ease this limitation. Their common flaw lies in the method of data presentation. The method of presentation has but one purpose: the communication of information to the user's mind. Thus, the presentation problem should be approached from the point of view of the mind's "information acquirement" abilities. A step towards higher cognitive processing should not ignore such information acquirement factors as differentiation, elimination, in-depth analysis and context identification with formal commitment to memory.

BRIEF DESCRIPTION OF THE INVENTION

The present invention does not supplant the usual user interface elements, but provides arrangements of elements presented on the GUI to facilitate the acquisition of information from a small or large database.

The present invention utilizes features of the mind's acquirement patterns to improve the ability to navigate through large databases of images, text or a combination of both. In enabling this approach, the inventor avoids having all information presented in a static form, in which once accessed it remains immobile on the page and the screen. Hence, navigation for the purpose of a fast visual fly-over analysis of a database's content-terrain is effectuated in the present invention by particular motion of graphical elements on a console. Mere motion is not sufficient, however, but as enabled in this invention it takes into account basic principles of the user's mind's viewing patterns. The invention avoids the prior art, which merely had the user clicking on a scroll button to pull-down a list or stack-up an array of windows. In essence, this motion carefully feeds data to the user in an easily digestible form rather than having the user feeding the data to himself/herself. Eliminating this self-feeding process as implemented in the present invention by particular formats designed for easy assimilation is a unique and unprecedented approach.

In making the invention, it was found that several categories of information could be viewed simultaneously once the information was put in motion and the self feeding eliminated during a fast visual fly-over analysis. Concurrent viewing of two or more sets of information greatly increases the speed with which information acquirement can occur, beyond that already expected by the velocity by the motion. Where the increase persists as multiple layers of information are presented to the user, the increase in speed greatly exceeds the speed of data access of conventional methods.

Applications for the invention are wide ranging. These include any applications where navigation (or browsing) through a large database for the purpose of locating a single piece of data or samples of data is necessary and where the search process calls for selection from strings of data. (Strings of data is defined for our purposes as numerous pieces of information pertaining to a defining category.)

A medical imaging application using the invention, as a case in point, might help a student looking for video clips of two specific surgical procedures. He/She could utilize the invention to display (in data cells) clips pertaining to key images of each case scenario. Those relating to the first procedure could be displayed in motion on a left quadrant and those relating to the second procedure on the right quadrant (FIG. 1). Along with the still image of each case scenario, a key title would be superimposed on the image in each data cell. The student, with the aid of this invention, can visually skim through 1,000 images for each procedure in just a few minutes! As soon as a data cell arouses his/her attention, the student need only interrupt the flow and through a click of the mouse, enlarge the image, access an in-depth textual description and view the surgical procedure's video clip.

The invention can also be applied to electronic shopping where a user wants to search through the hundreds of VCR's and TV sets available at a cybermall. The invention can be applied to Video On Demand where a consumer in the near future may browse through an entire video library of a large video store in about 45 minutes, a feat not feasible by physically walking the aisles of an actual large Store. The invention can also be used to help a car purchaser search through hundreds or even thousands of options on the World Wide Web.

BRIEF DESCRIPTION OF THE DRAWINGS

FIG. 1 shows and embodiment in which a screen is divided into quadrants as the location where images are displayed in a Bi-Mode.

FIG. 2. Shows a Quad-Mode display and the four quadrants location.

FIG. 3 shows four possible streaming directions for images.

FIG. 6 shows an incorrect Bi-Mode directional flow configurations.

FIG. 7 shows how incorrect Bi-Mode directional flow configurations do not split the total field of view into separate input channels for effective concurrent viewing.

FIG. 8 shows Quad Mode Directional flow configurations and the resulting split input channels. Config. 11 and Config. 12 show incorrect directional flow settings and the resulting emergence of three input channels.

FIG. 12 is a drawing of the Bi-Modal Multiple Cell 2 display which shows how a single horizontal input channel is established through a combination of directional flow configurations and original and duplicate row positioning.

FIG. 16 shows the directional flow configurations for Quad-Mode Multiple Cell 1.

FIG. 19 shows a Visual Tag Search (VST) in a "Tag User-Induced Access Mode" with the establishment of a third horizontal image channel.

This is where execution begins.

Figure 30:
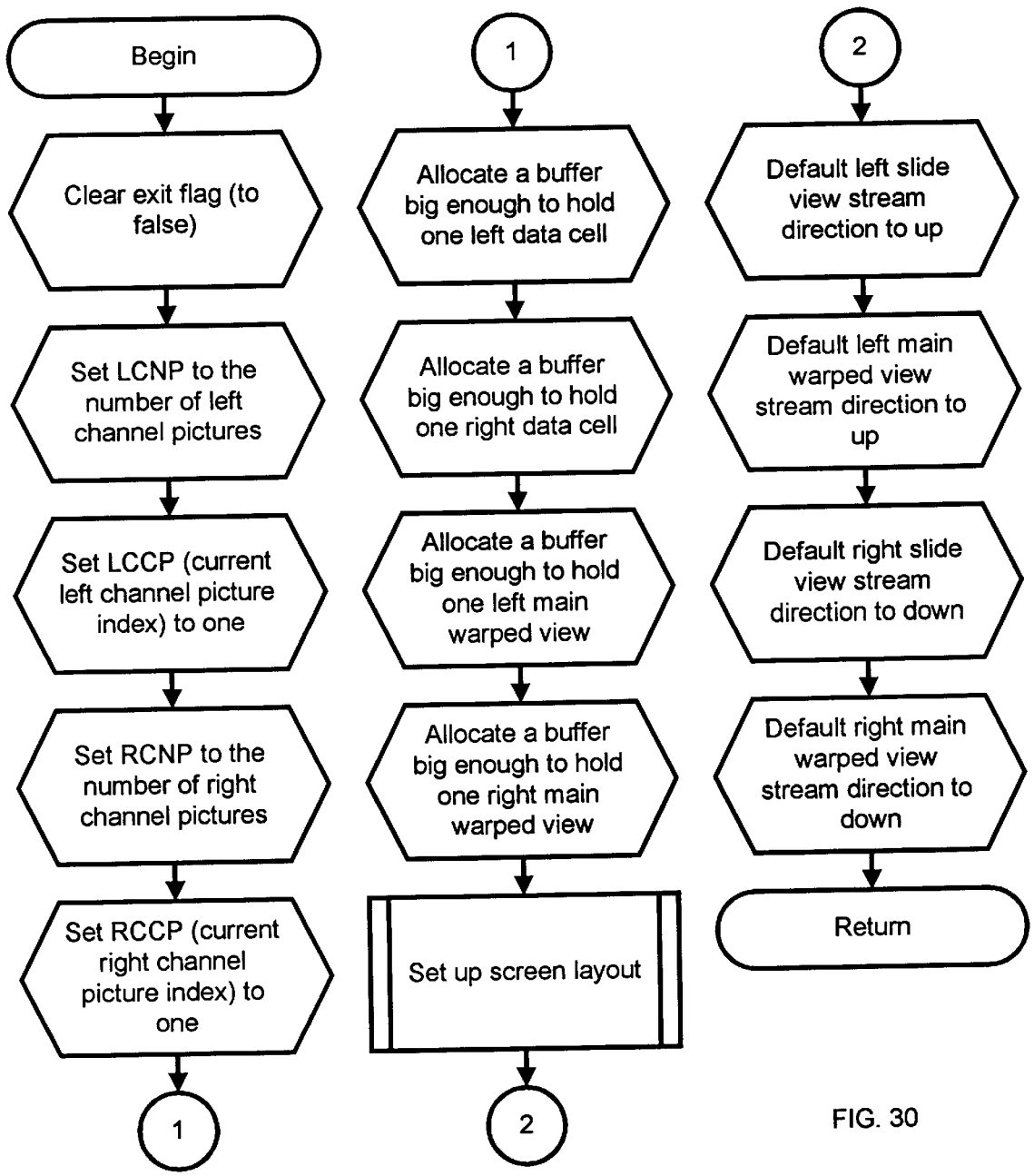

FIG. 30, Initialize: shows the preparations needed to run the Bi-Mode.

Figure 31:
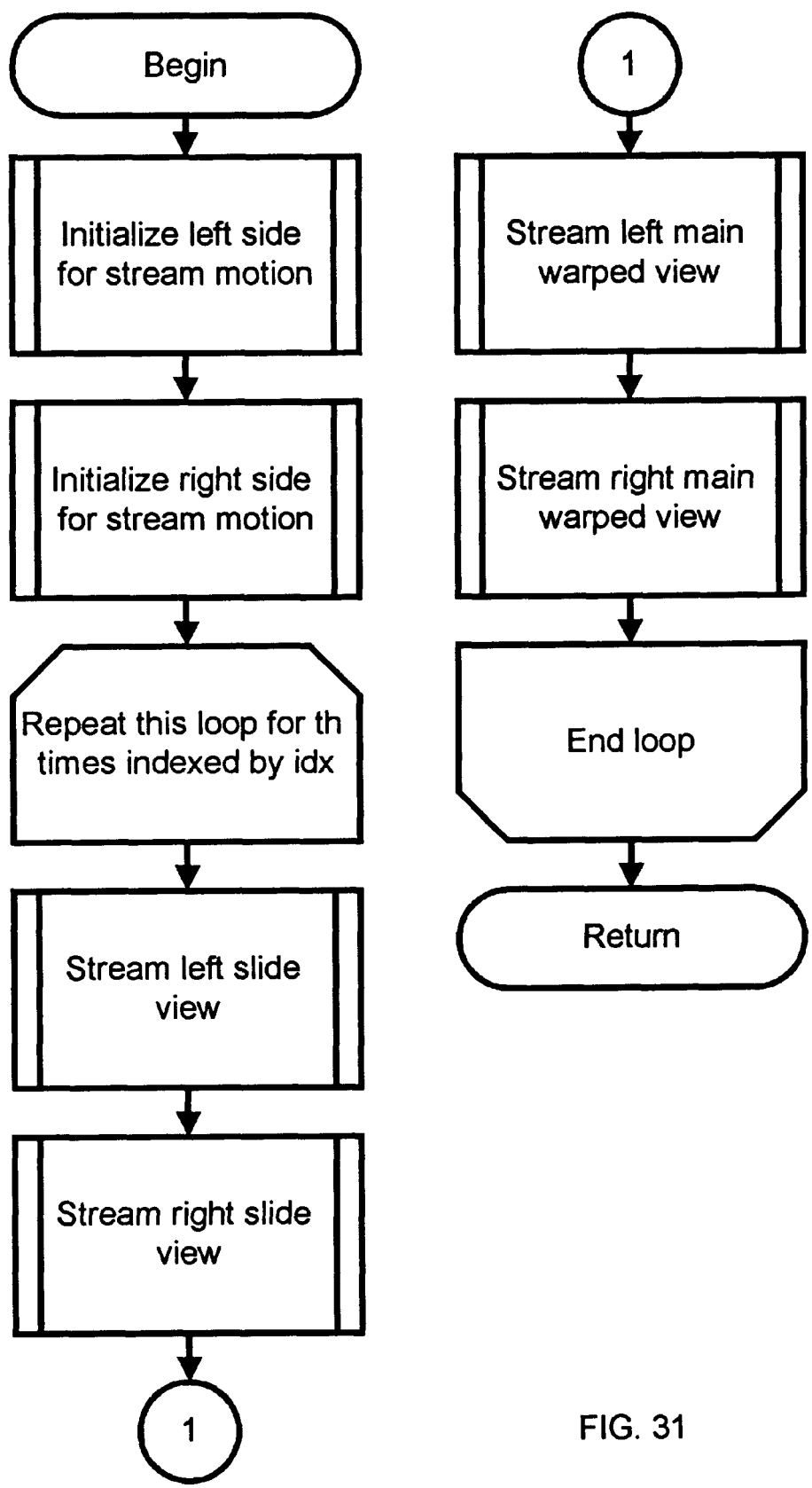

FIG. 31, Stream Pictures: shows the overview of how streaming works in the Bi-Mode.

Figure 32:
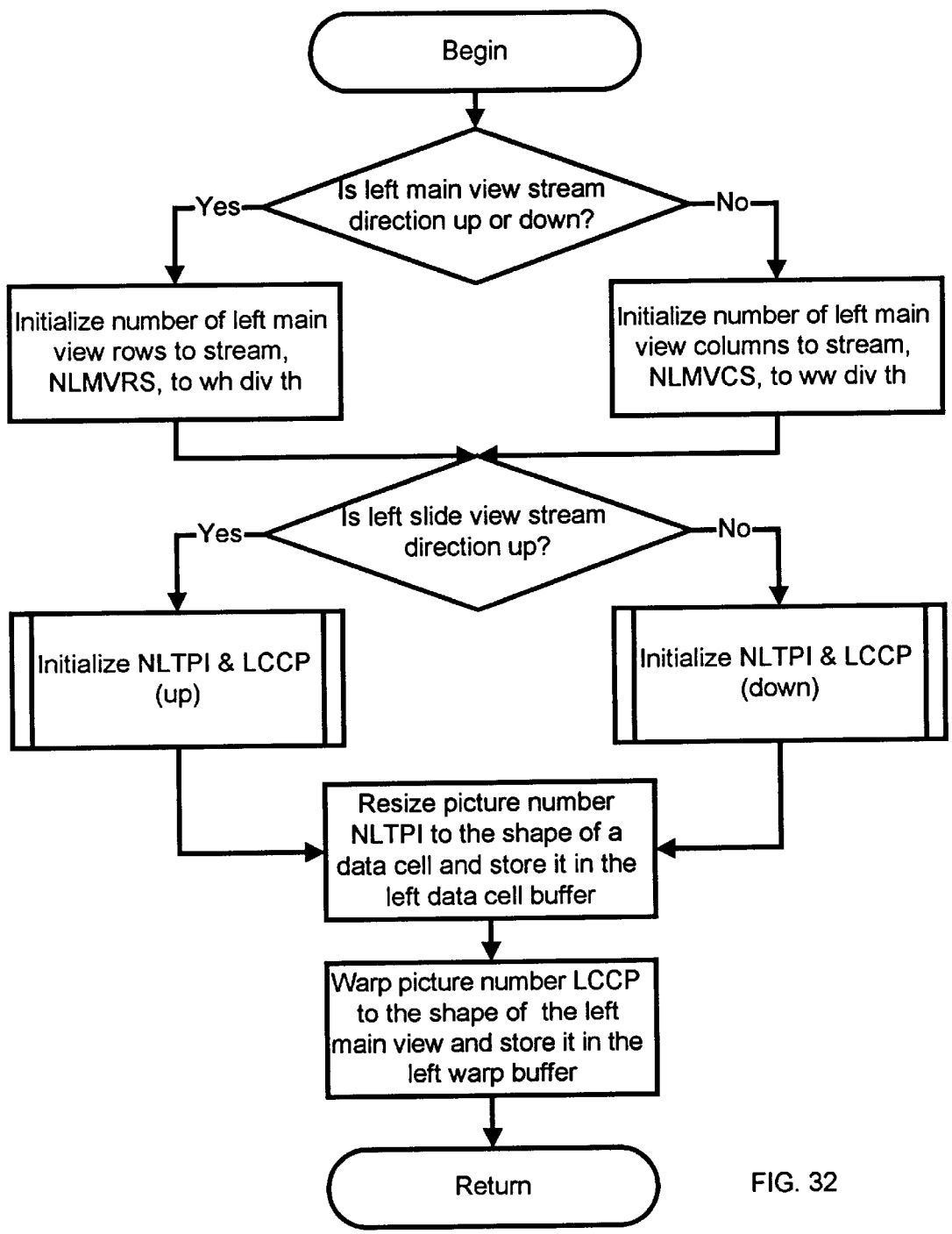

FIG. 32, Initialize Left Side for Stream Motion: shows the necessary preparations to stream the left channel.

Figure 33:
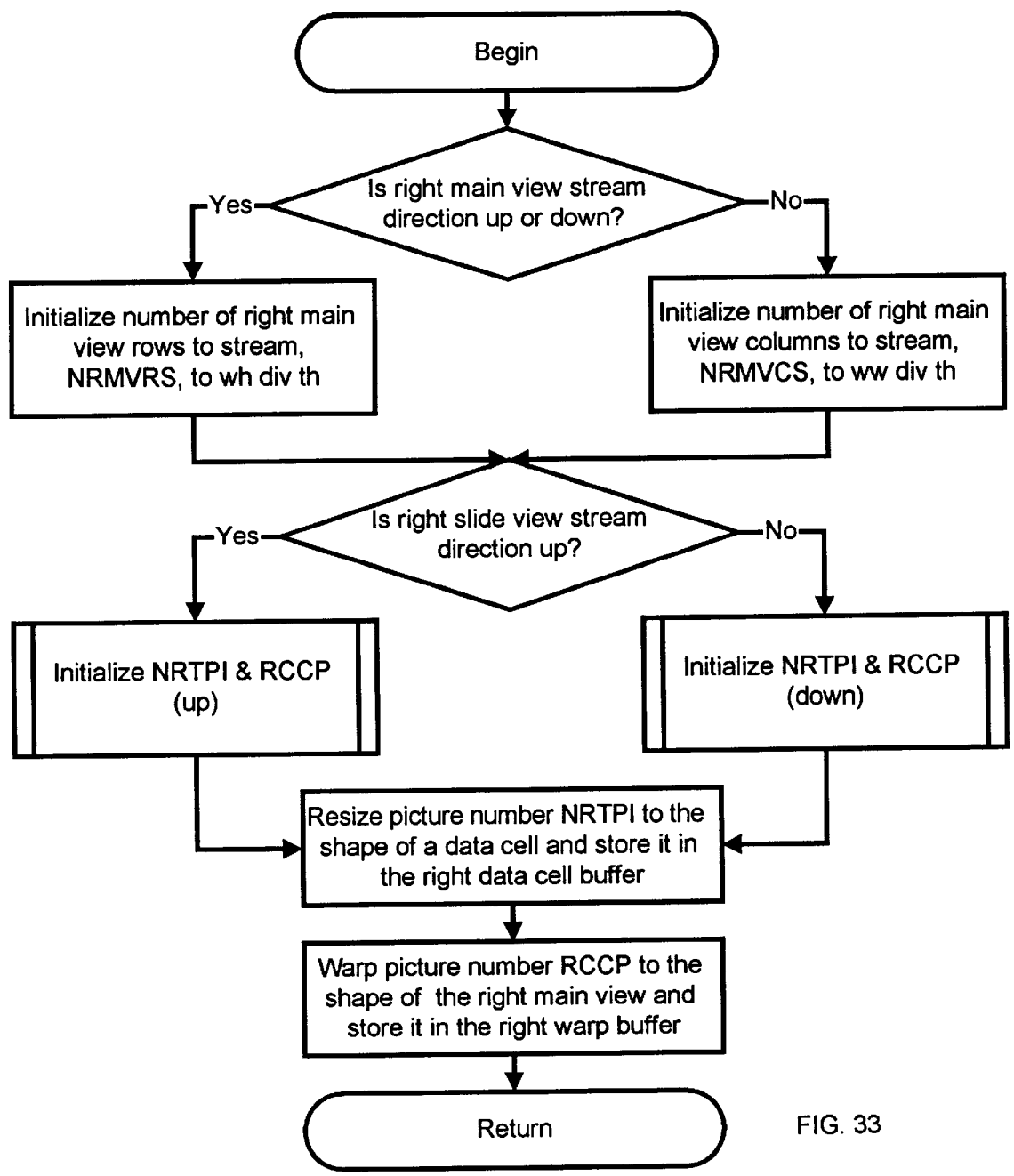

FIG. 33, Initialize Right Side for Stream Motion: shows the necessary preparations to stream the right channel.

Figure 34:
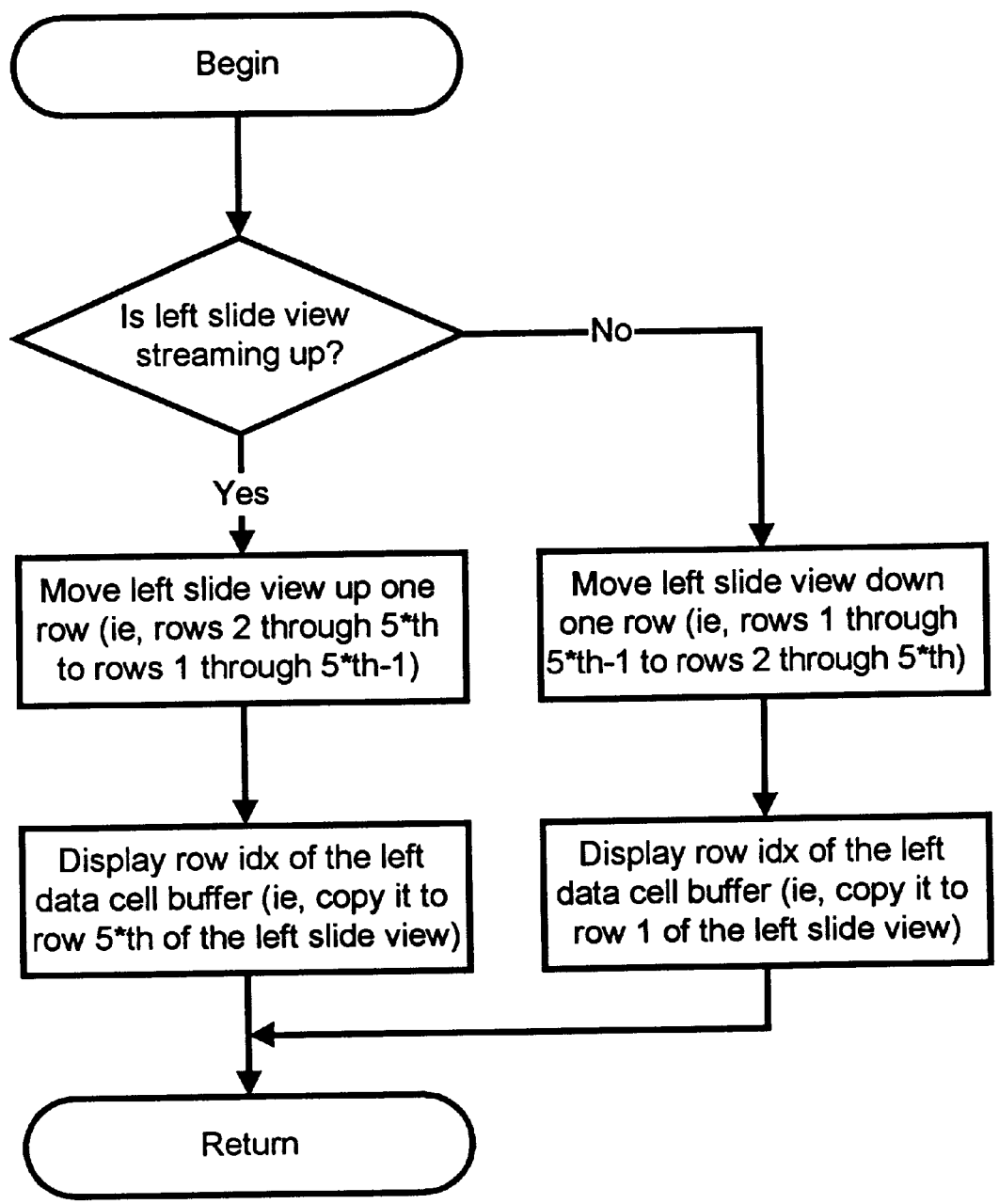

FIG. 34, Stream Left Slide View: shows how the left channel slide view is streamed.

Figure 35:
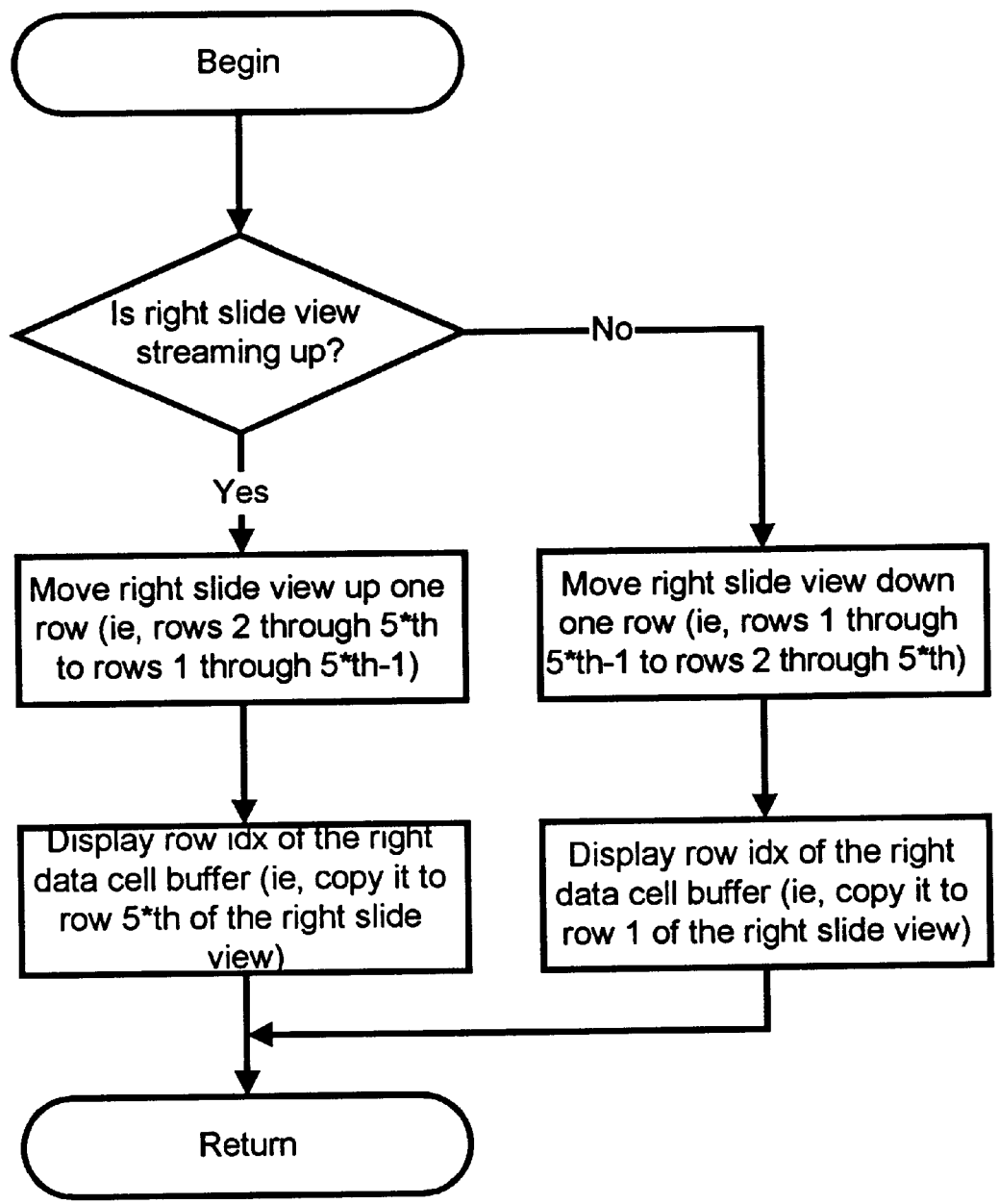

FIG. 35, Stream Right Slide View: shows how the right channel slide view is streamed.

Figure 36:
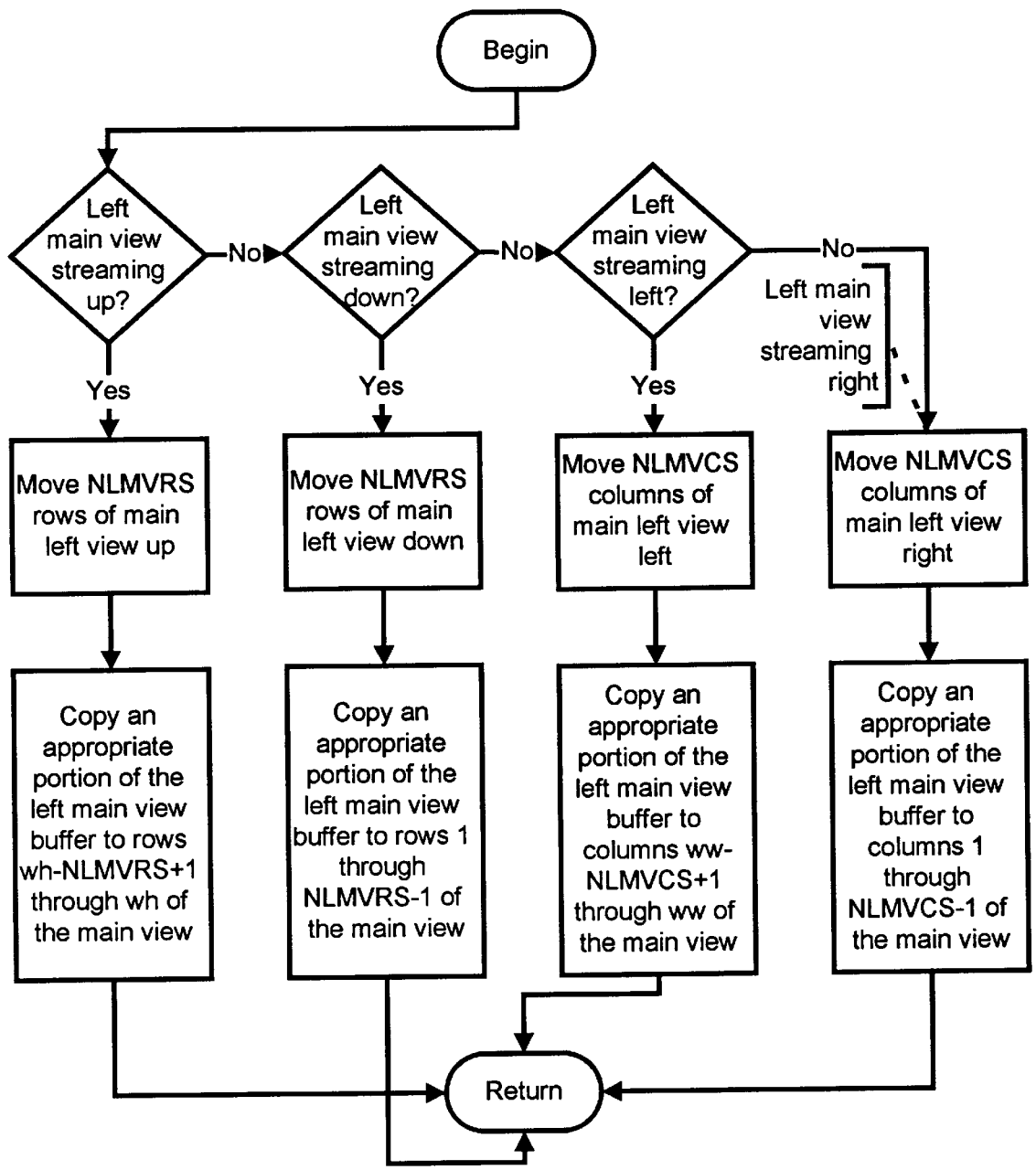

FIG. 36, Stream Left Main Warped View: shows how the left channel perspective is streamed.

Figure 37:
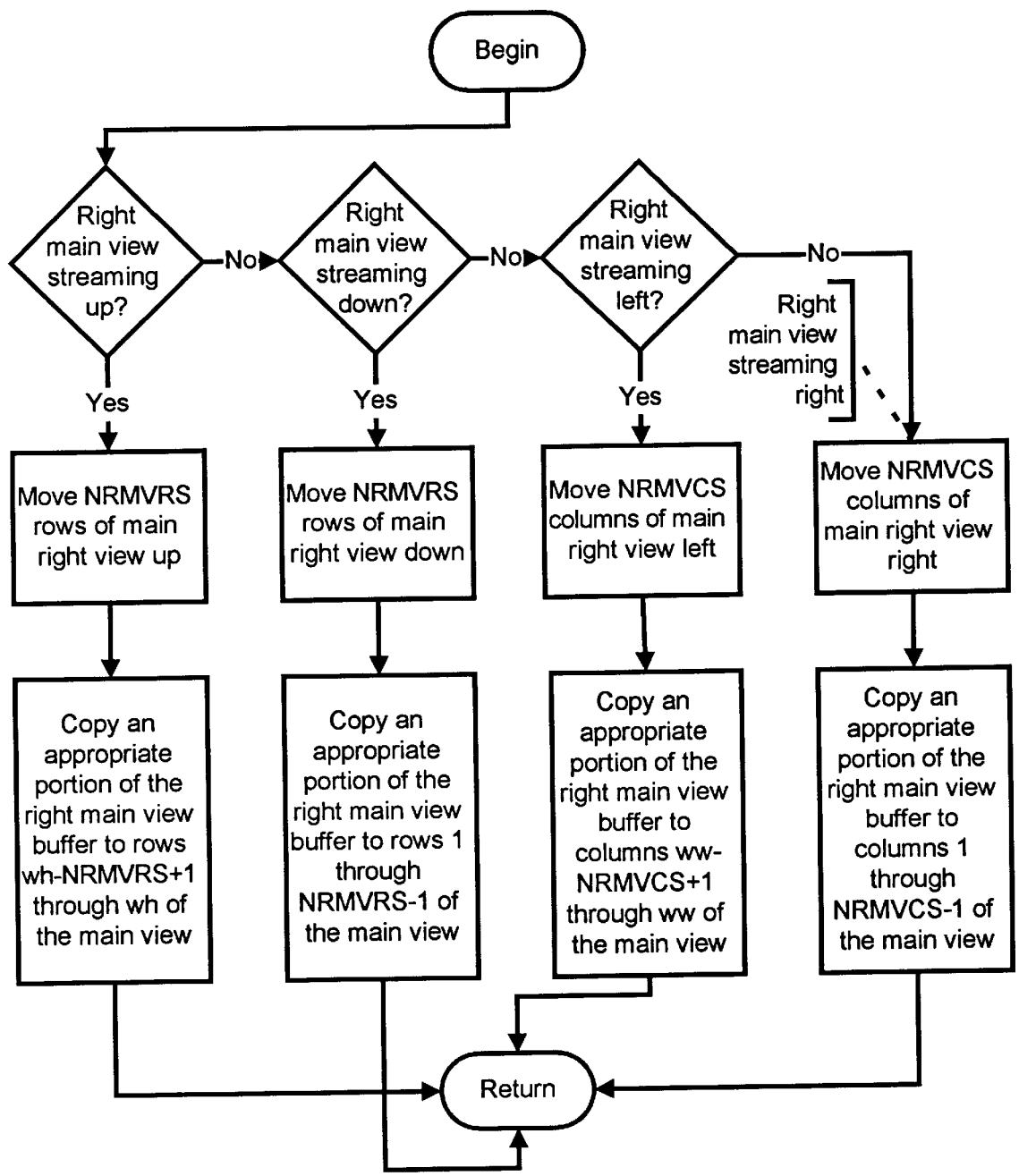

FIG. 37, Stream Right Main Warped View: shows how the right channel perspective is streamed.

Figure 38:
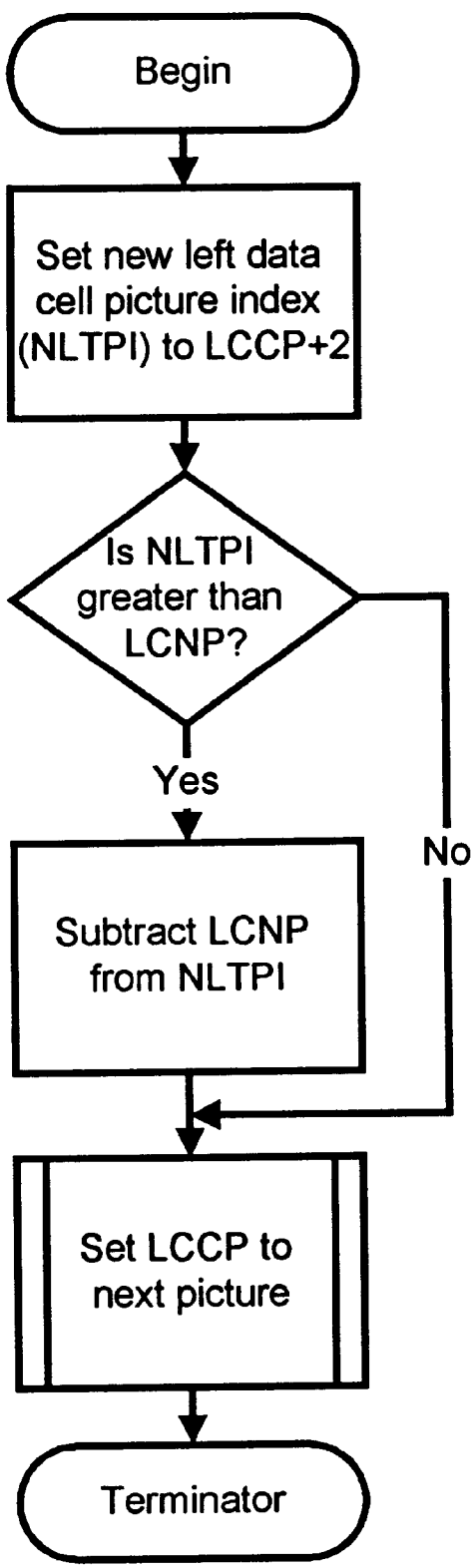

FIG. 38, Initialize NLTPI & LCCP (up): shows how to determine the next picture to show when the right channel slide view is streaming up.

Figure 39:
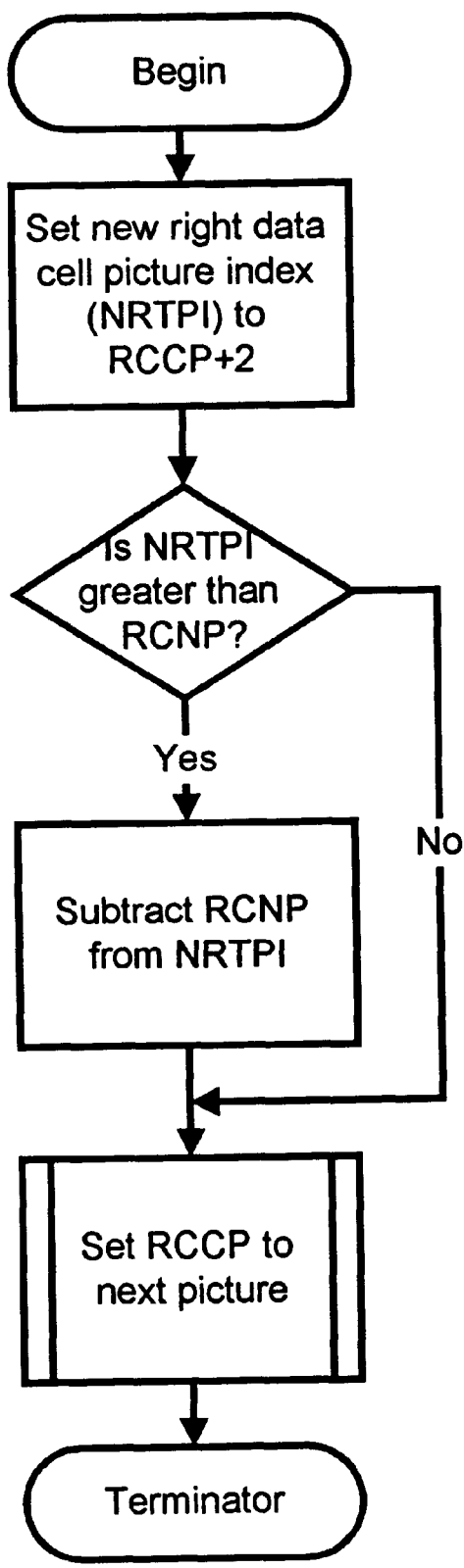

FIG. 39, Initialize NRTPI & RCCP (up): shows how to determine the next picture to show when the left channel slide view is streaming down.

Figure 40:
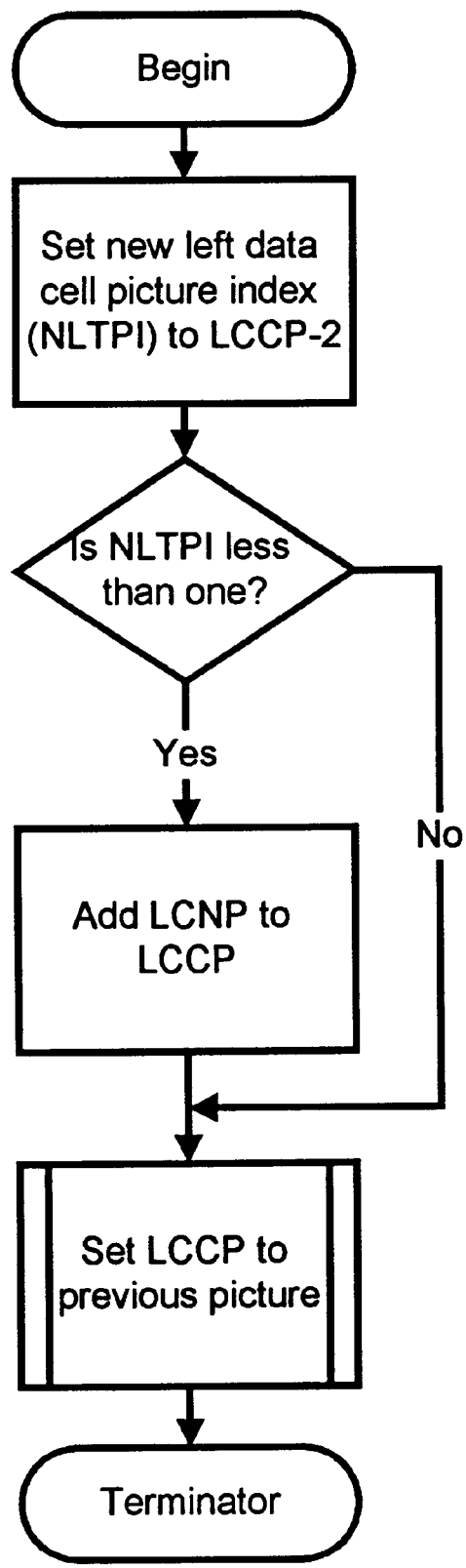

FIG. 40, Initialize NLTPI & LCCP (down): shows how to determine the previous picture to show when the right channel slide view is streaming down.

Figure 41:
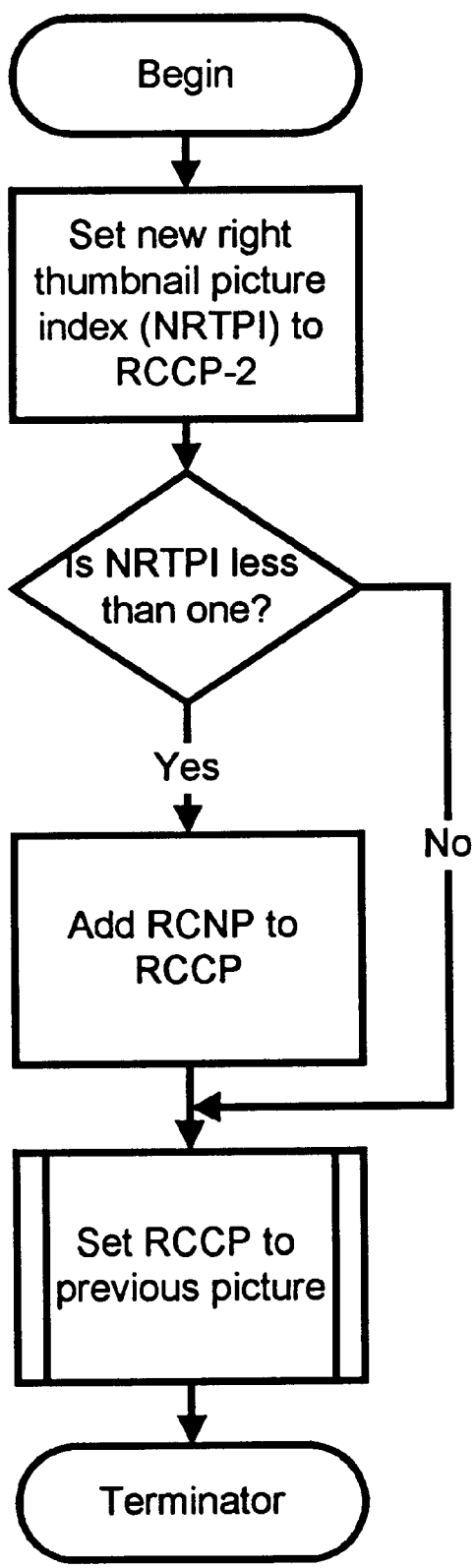

FIG. 41, Initialize NRTPI & RCCP (down): shows how to determine the previous picture to show when the right channel slide view is streaming down.

Figure 42:
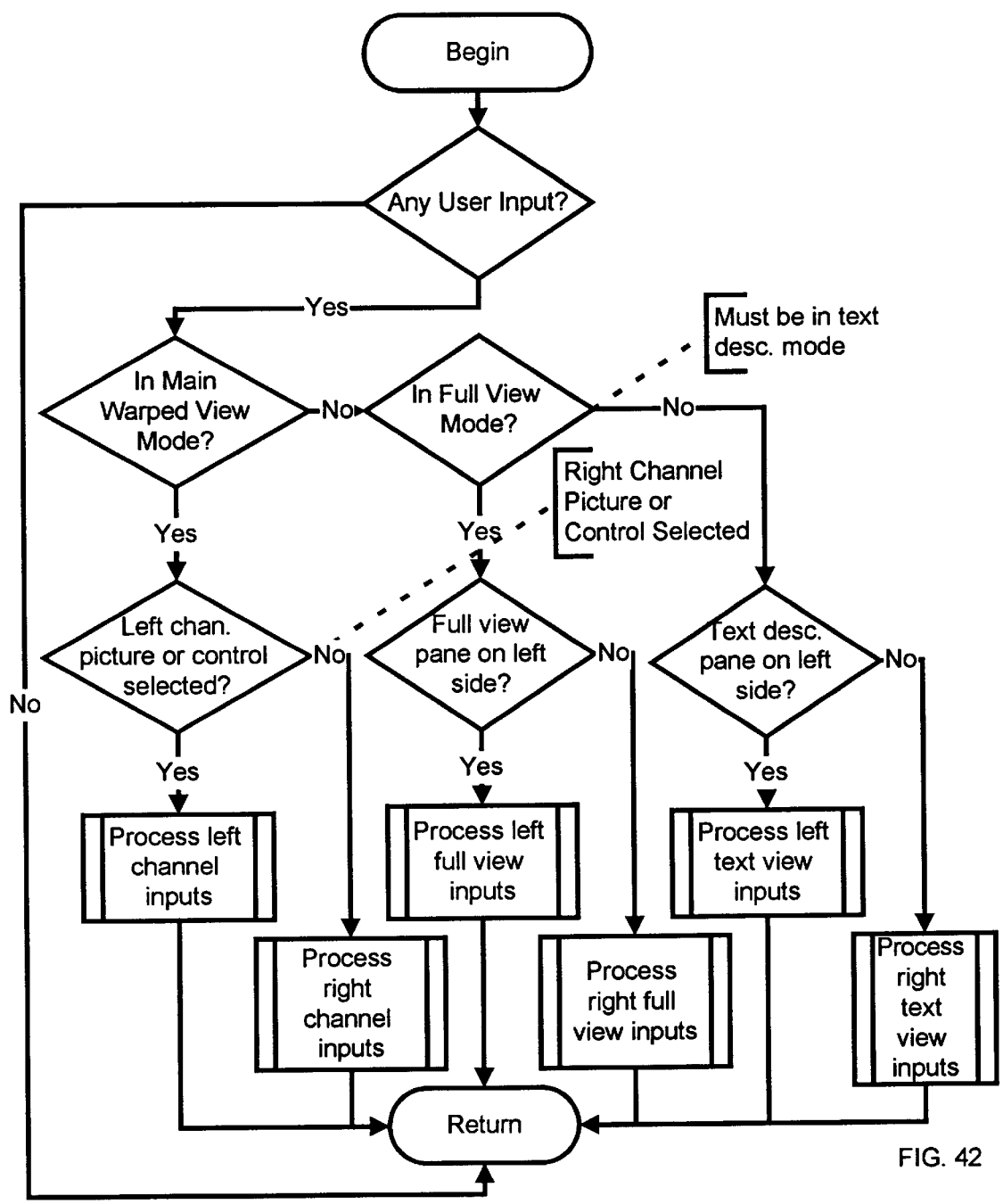

FIG. 42, Poll User Input: shows the overview of polling for user inputs, such as double clicking on a picture to enter full view and text view.

Figure 43:
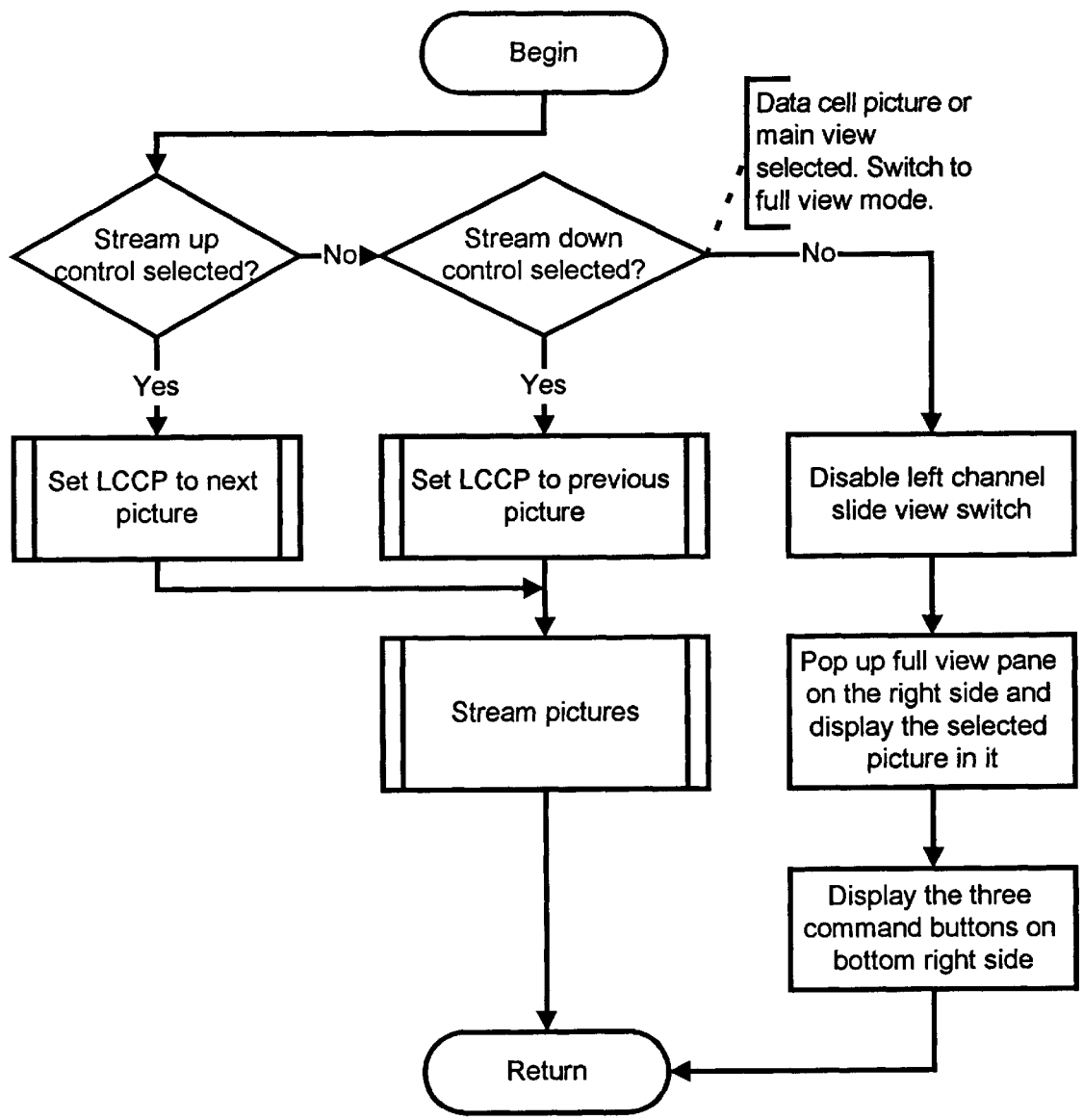

FIG. 43, Process Left Channel Inputs: shows how user inputs on the left channel are processed.

Figure 44:
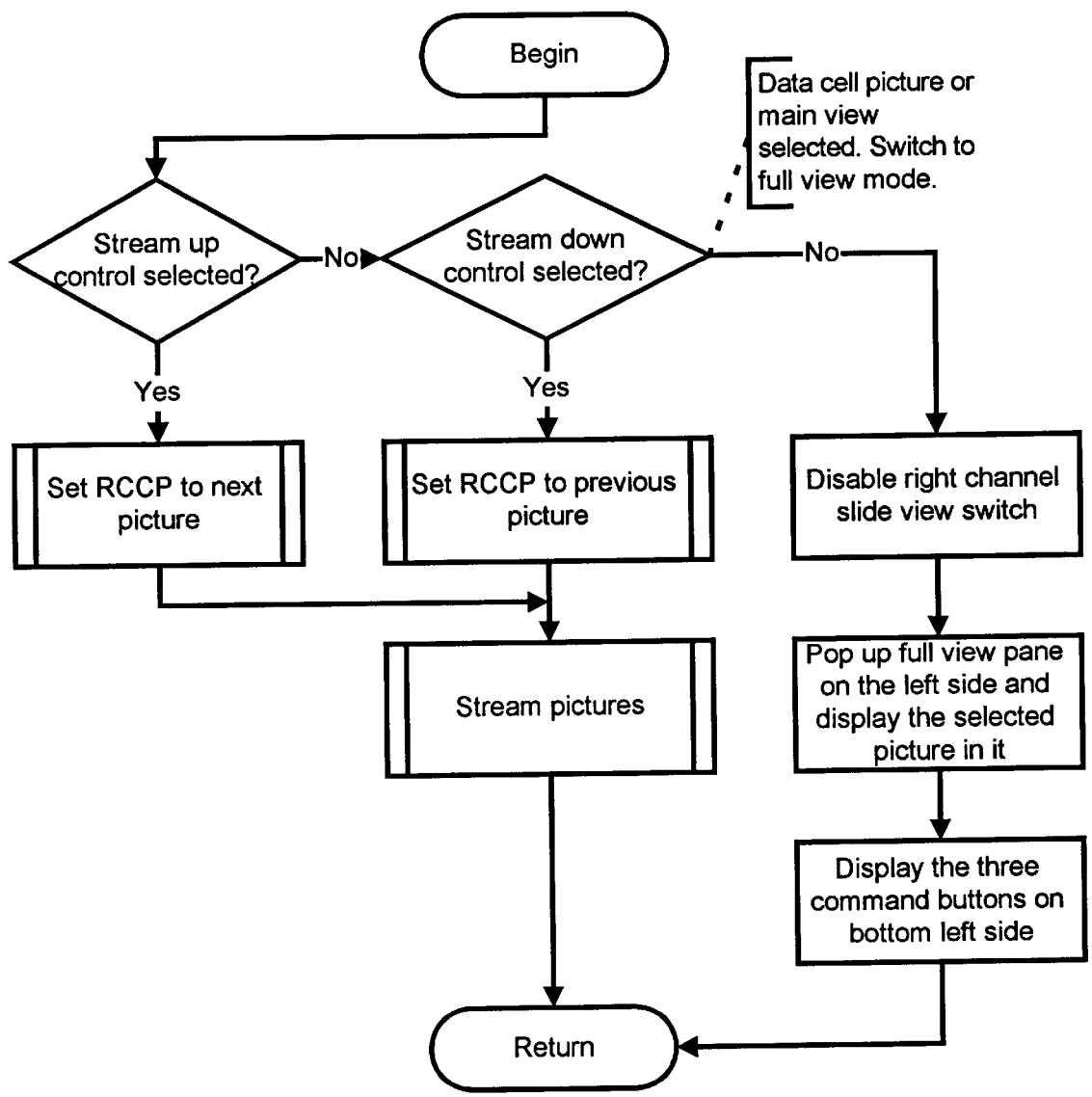

FIG. 44, Process Right Channel Inputs: shows how user inputs on the right channel are processed.

Figure 45:
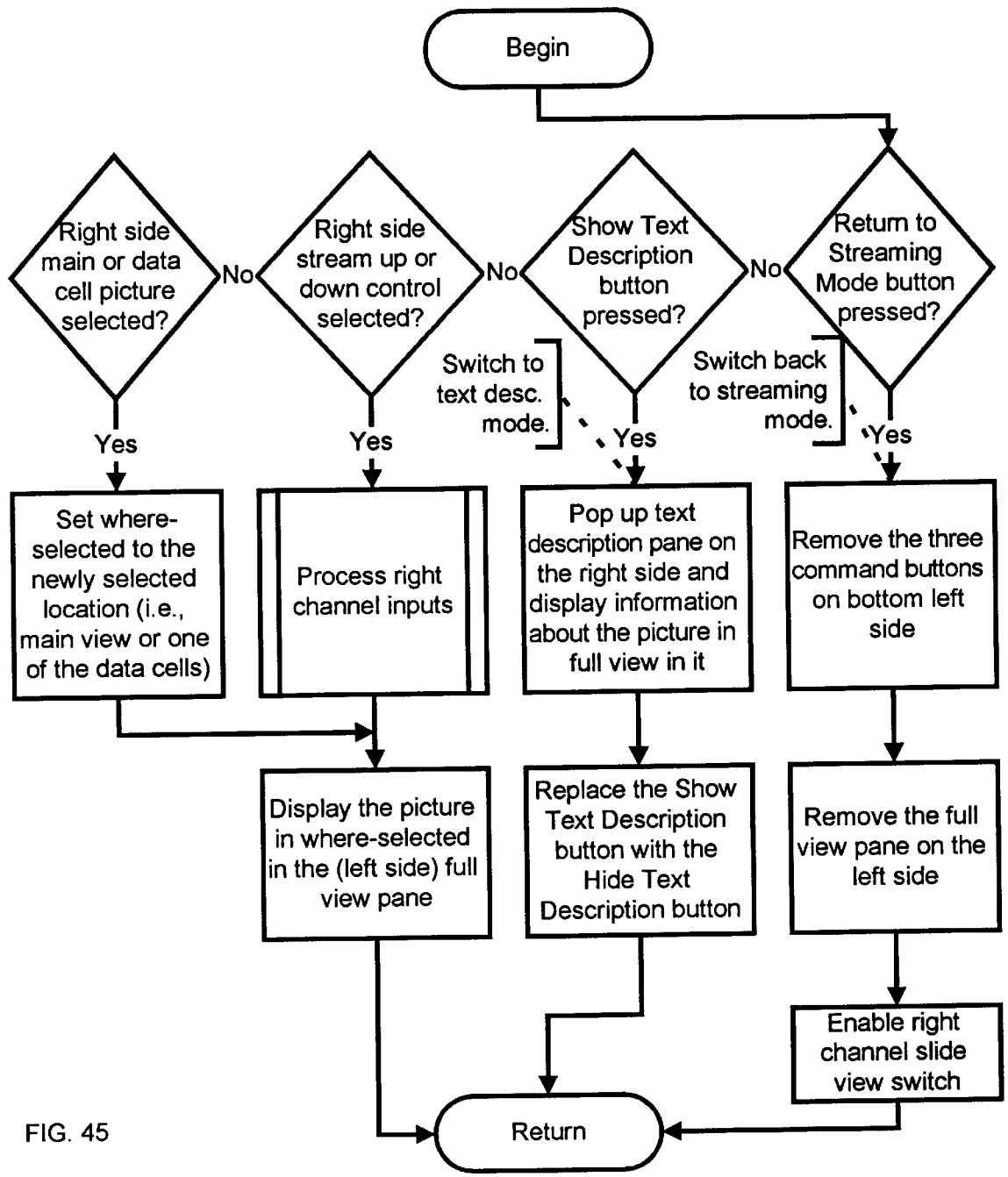

FIG. 45, Process Left Full View Inputs: shows how user inputs are processed when the user has clicked on a picture on the right channel and entered full view mode.

Figure 46:
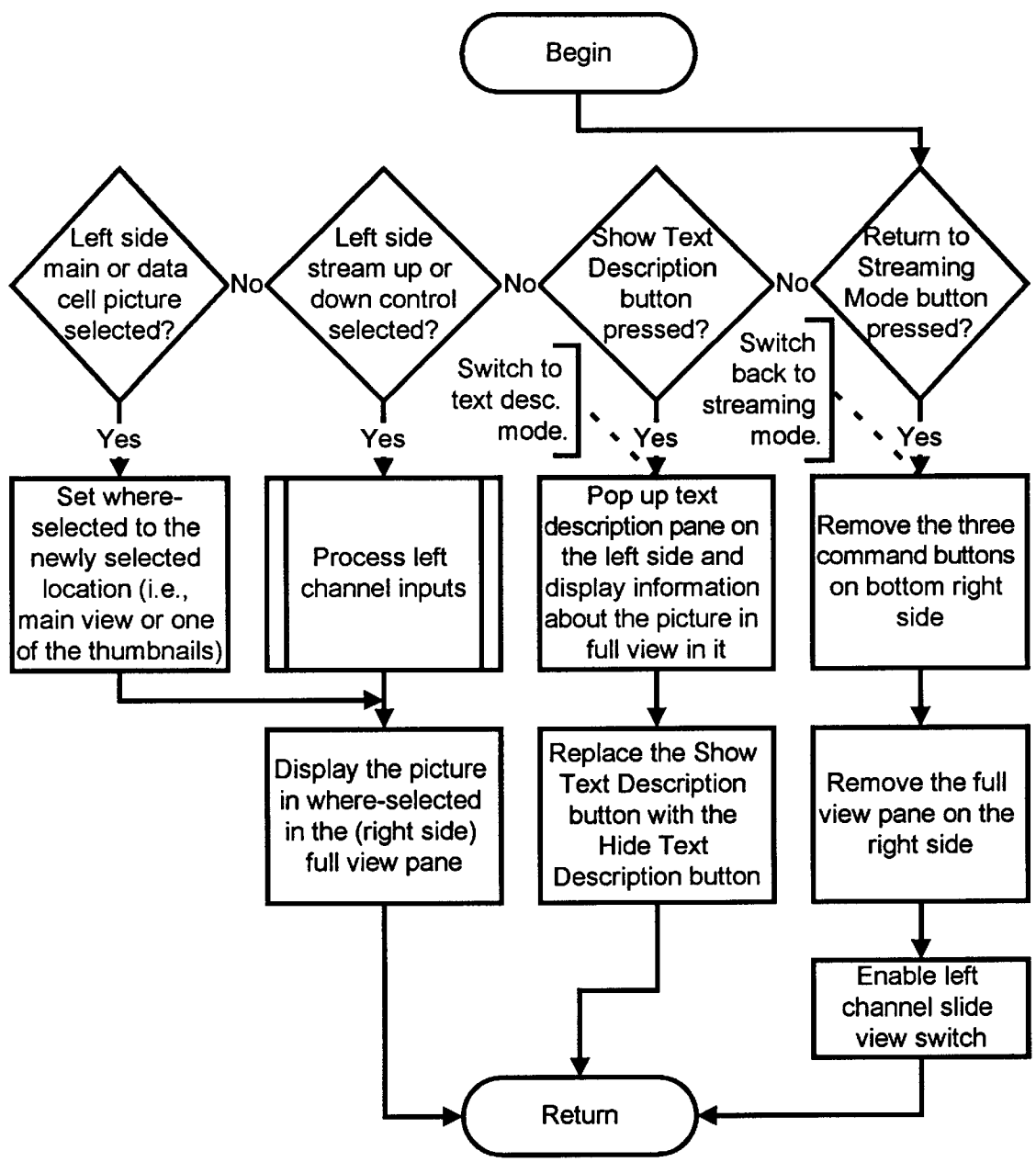

FIG. 46, Process Right Full View Inputs: shows how user inputs are processed when the user has clicked on a picture on the left channel and entered full view mode.

Figure 47:
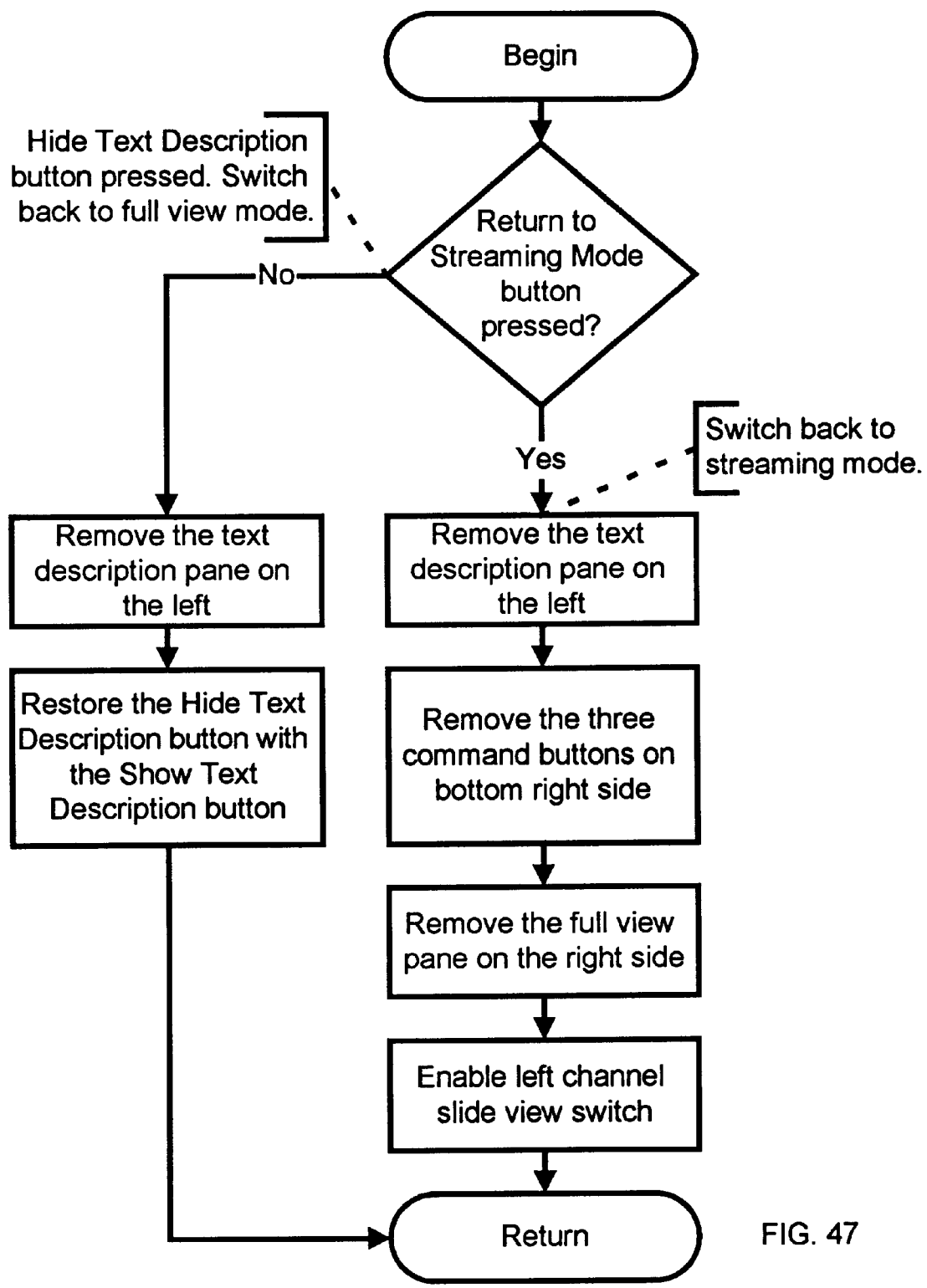

FIG. 47, Process Left Text View Inputs: shows how user inputs are processed when the user has clicked on the Show Text Description button on the right channel and entered the full view mode on the left channel.

Figure 48:
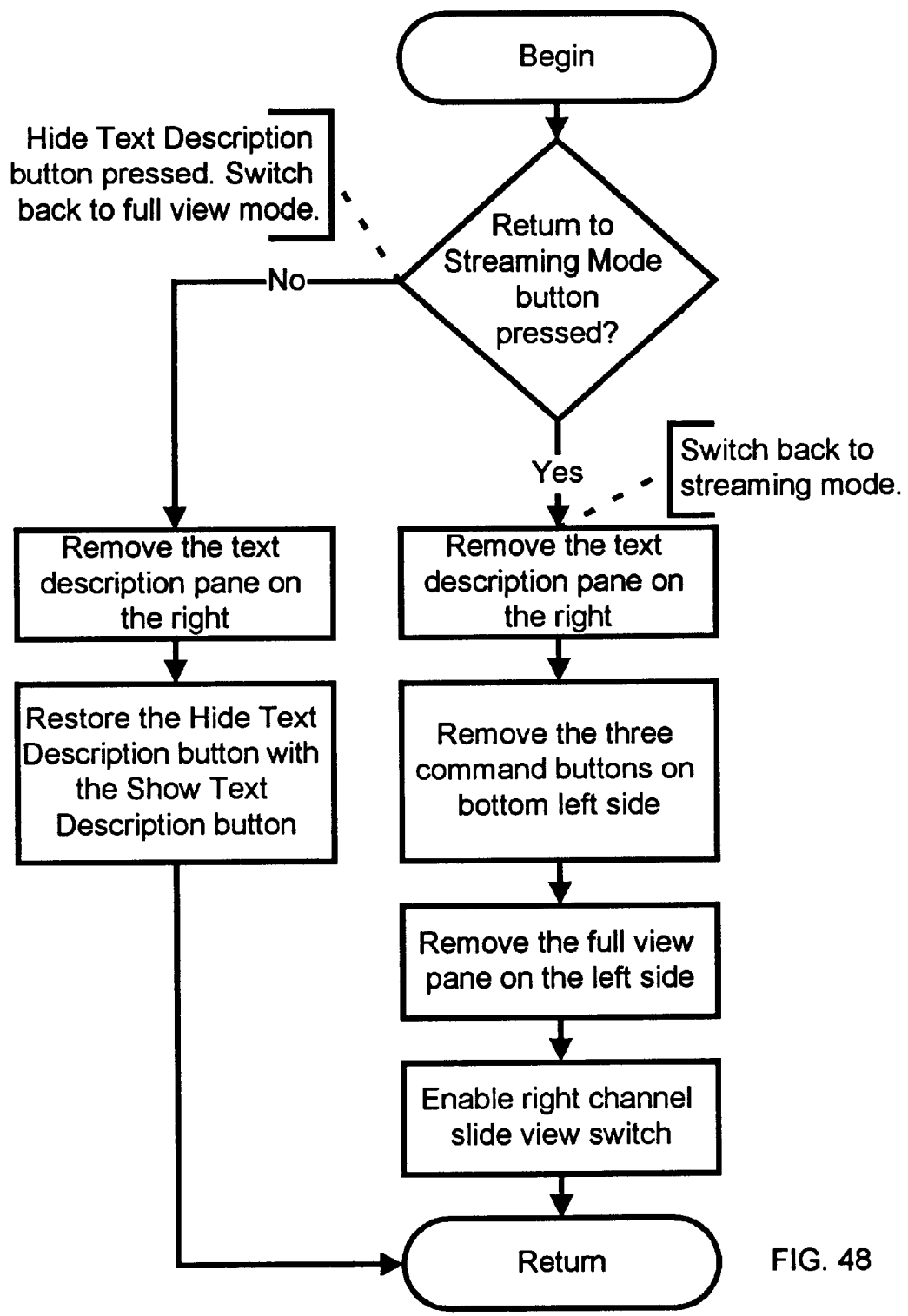

FIG. 48, Process Right Text View Inputs: shows how user inputs are processed when the user has clicked on the Show Text Description button on the left channel and entered the full view mode on the right channel.

Figure 49:
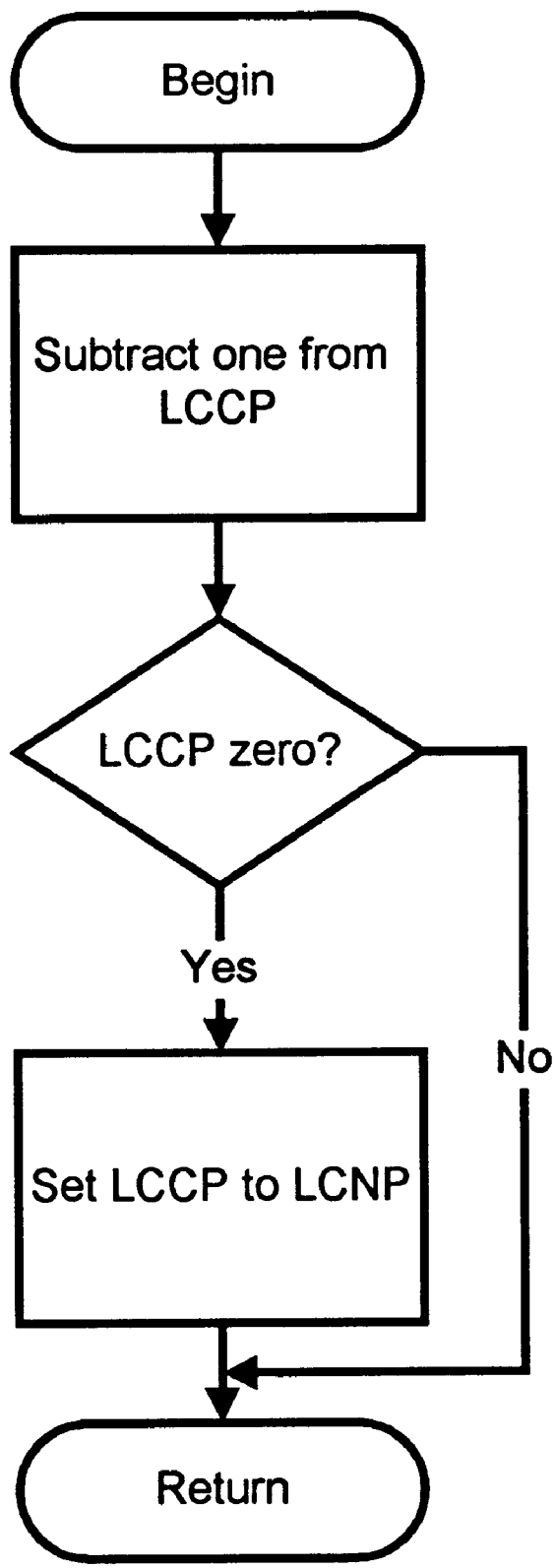

FIG. 49, Set LCCP to Previous Picture: shows how to determine the previous picture to display on the left channel.

Figure 50:
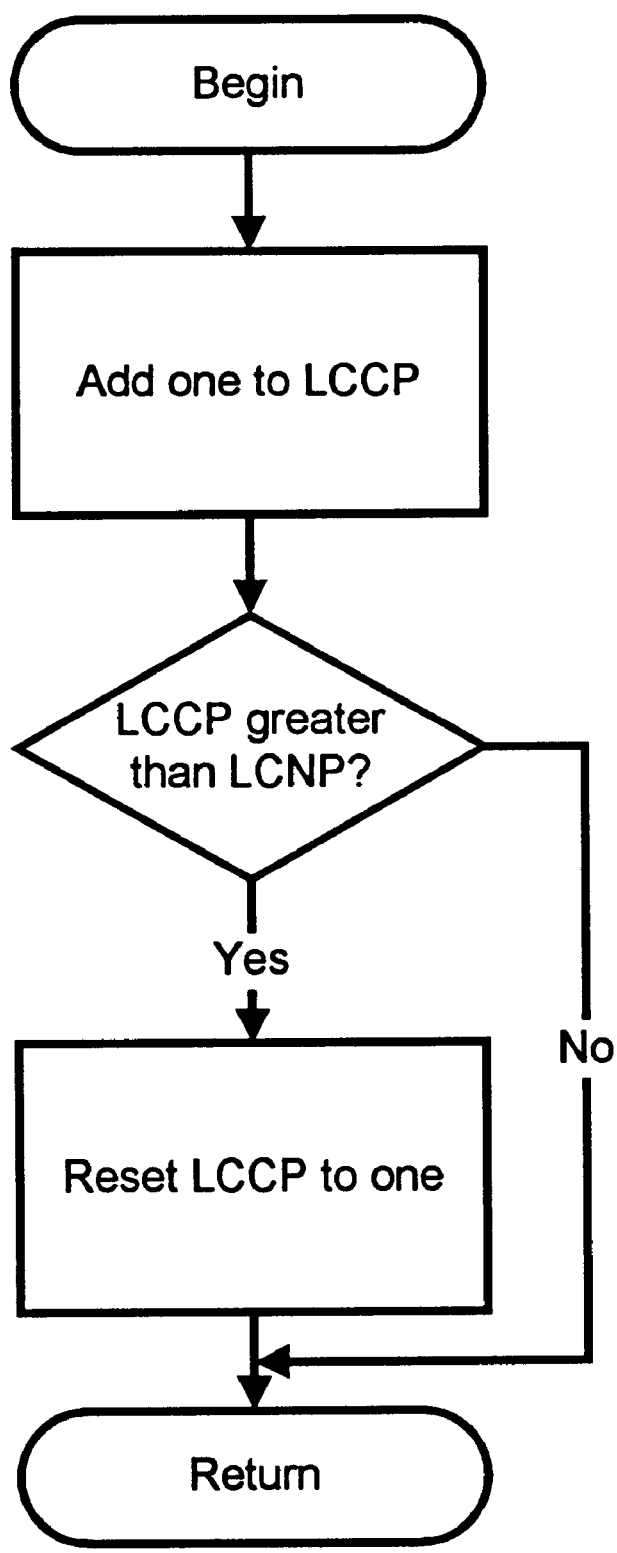

FIG. 50, Set LCCP to Next Picture: shows how to determine the next picture to display on the left channel.

Figure 51:
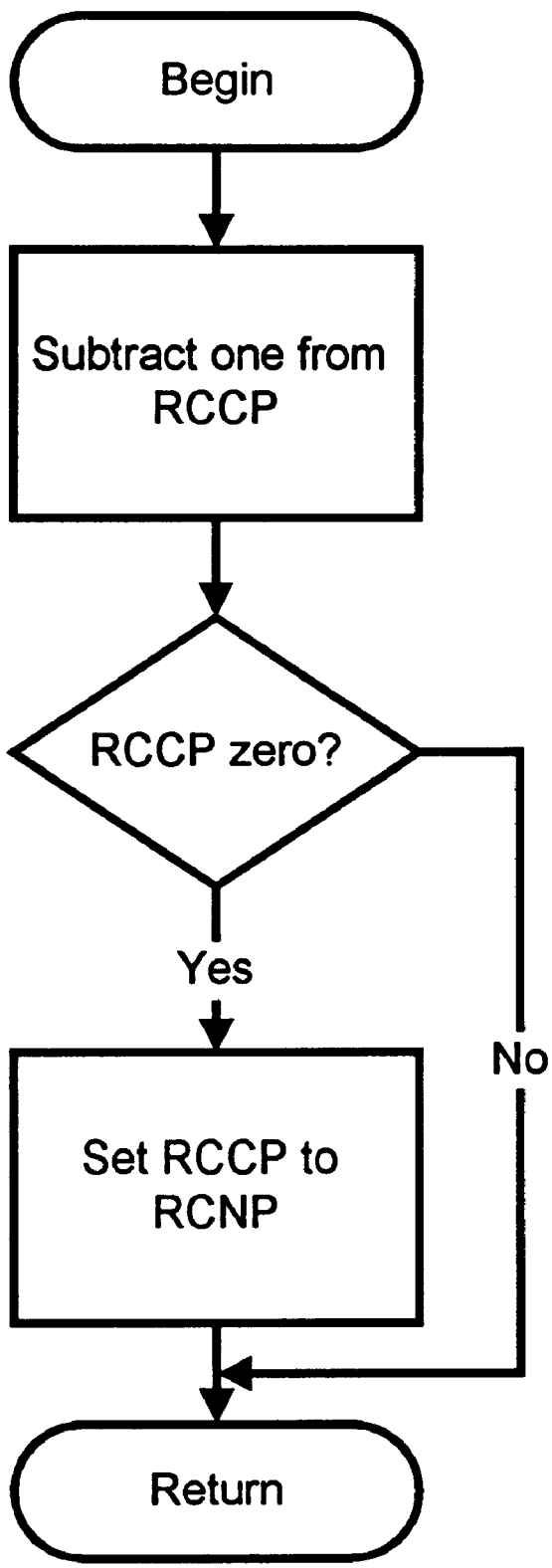

FIG. 51, Set RCCP to Previous Picture: shows how to determine the previous picture to display on the right channel.

Figure 52:
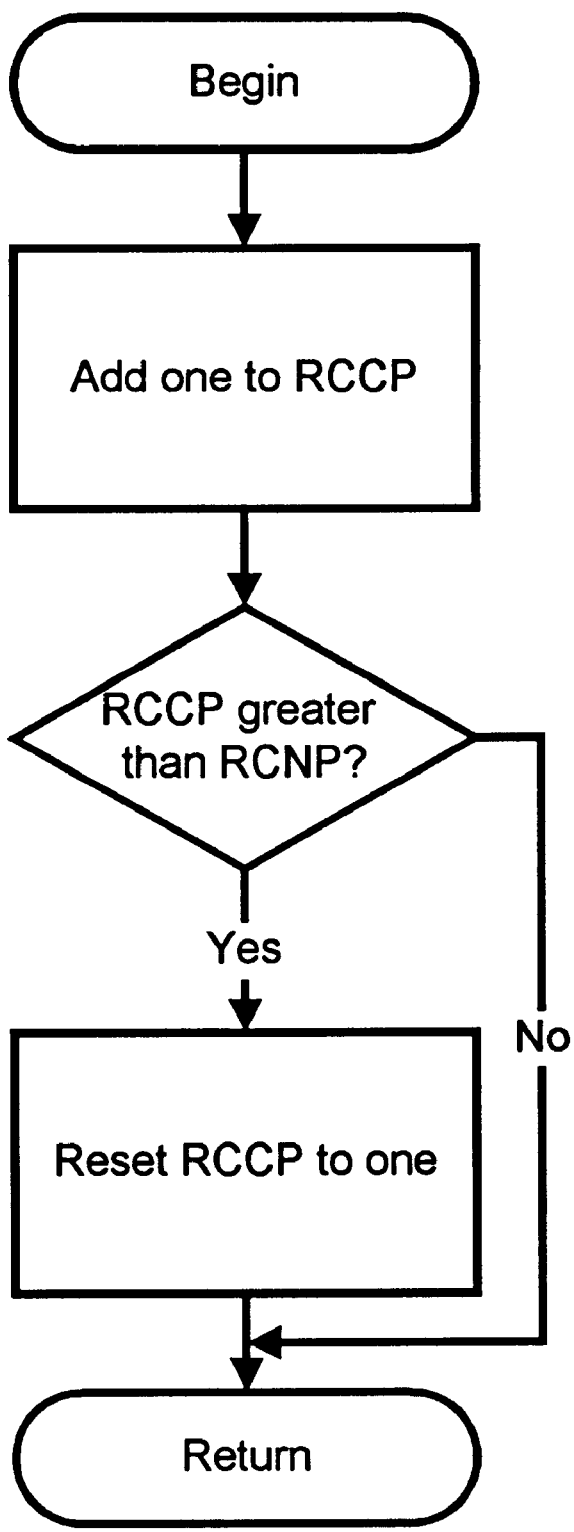

FIG. 52, Set RCCP to Next Picture: shows how to determine the next picture to display on the right channel.

Figure 53:
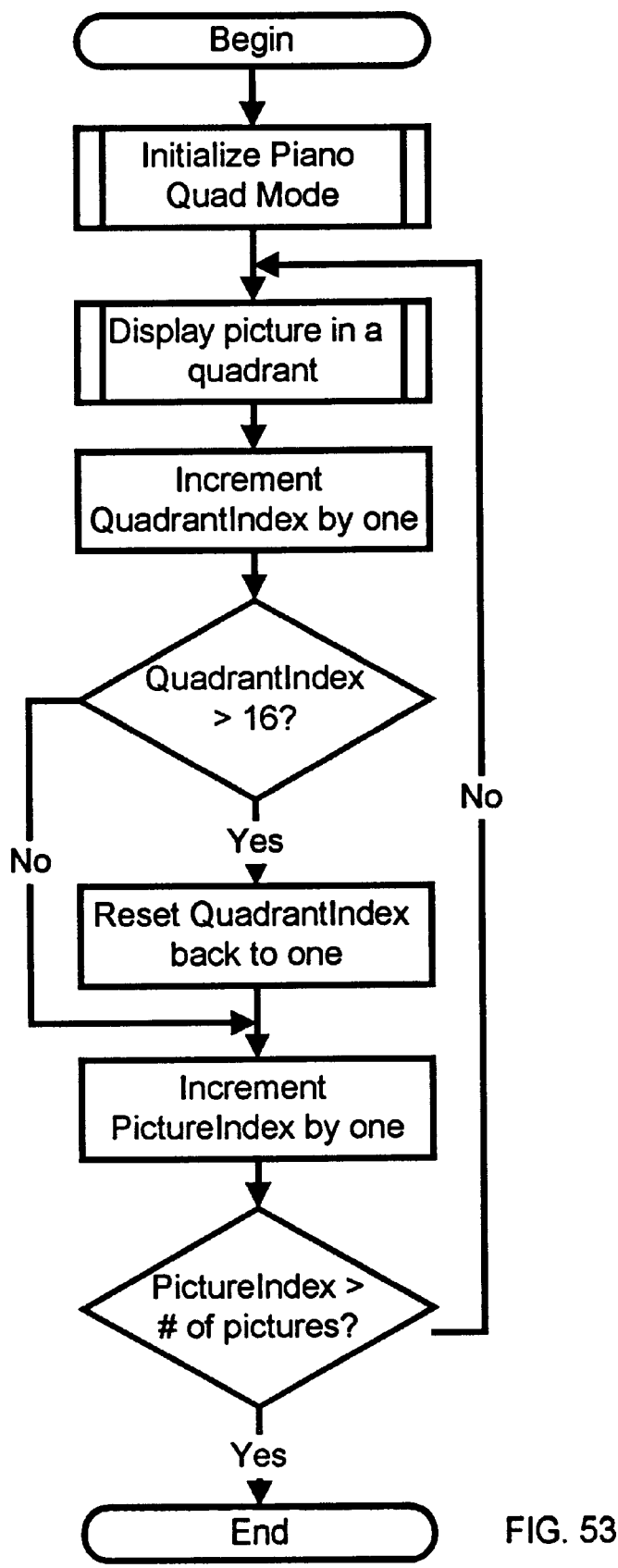

FIG. 53, Quad Mode Piano Sequenced: shows how the Quad Mode Piano Sequenced works overall. This is where execution begins.

Figure 54:
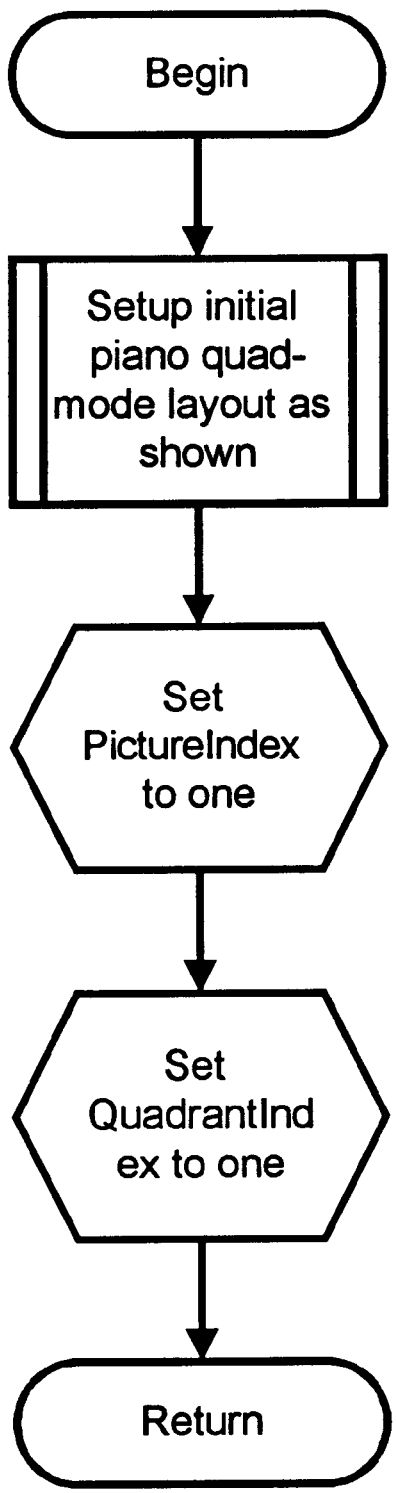

FIG. 54, Initialize Piano Sequenced Quad Mode: shows the preparations for the Quad Mode Piano Sequenced.

Figure 55:
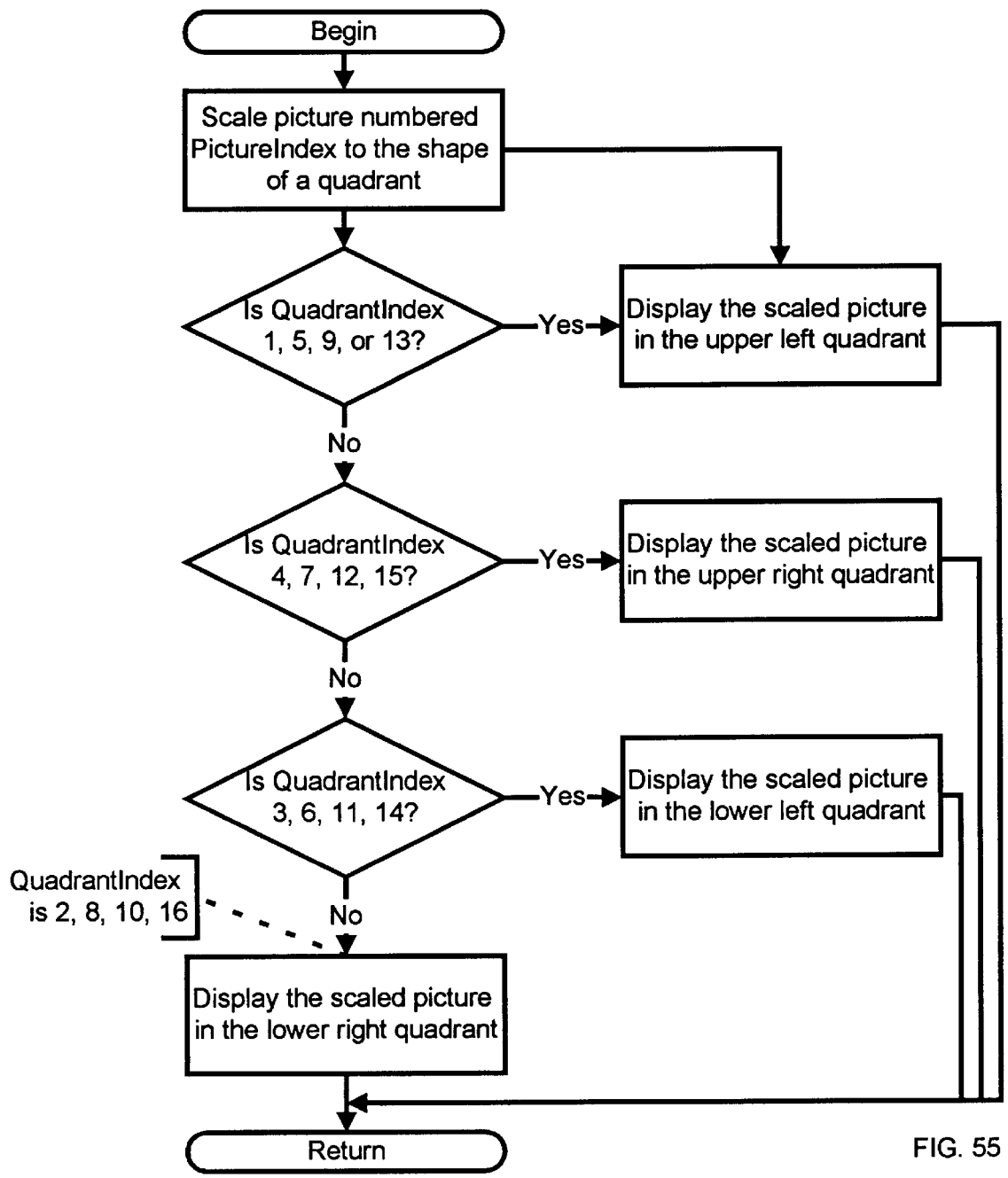

FIG. 55, Display Picture in a Quadrant: shows how pictures are displayed in the Quad Mode Piano Sequenced.

Figure 56:
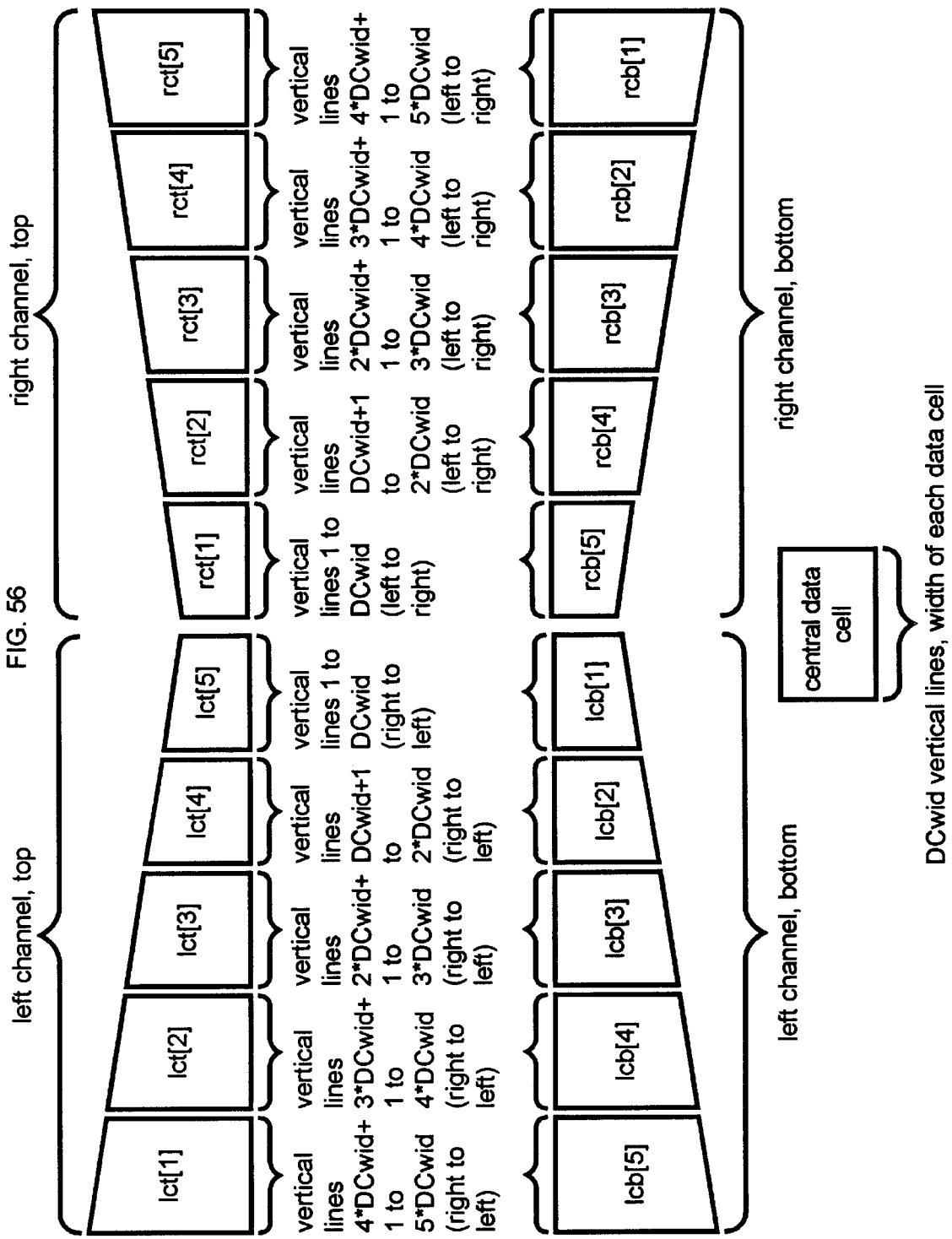

FIG. 56, Parametric Mode Definitions: shows the Parametric Mode Definitions.

Figure 57:
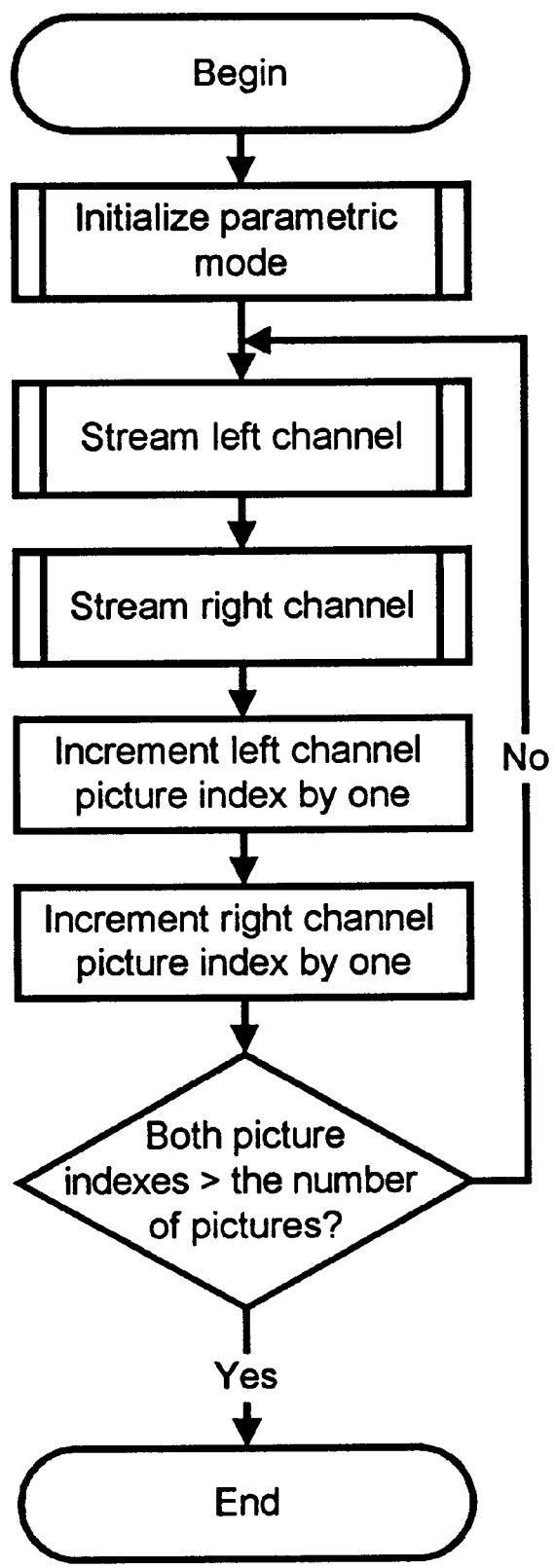

FIG. 57, Parametric Mode Main Routine: shows how the overall view of the Parametric Mode, where execution begins.

Figure 58:
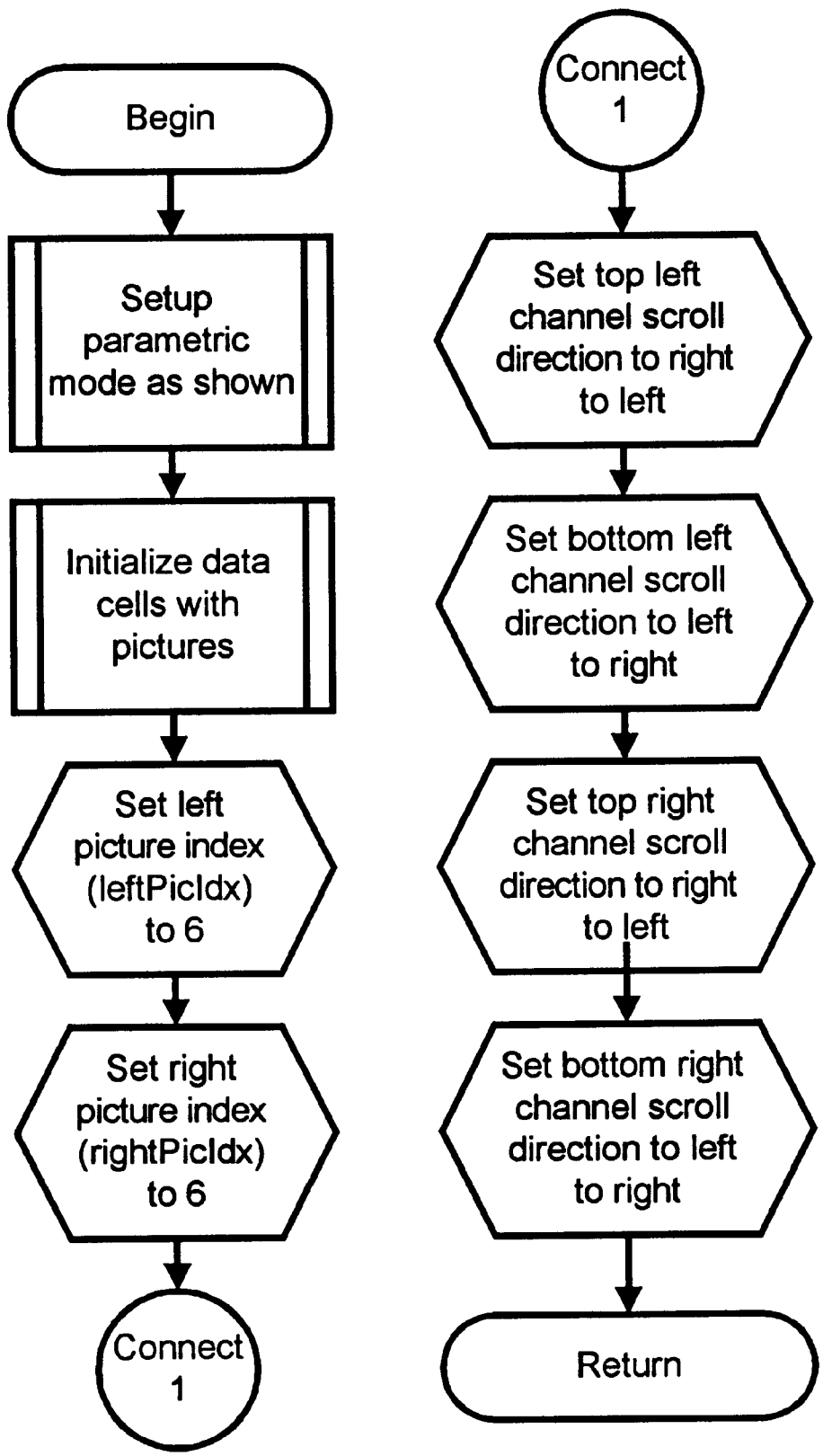

FIG. 58, Initialize Parametric Mode: shows the preparations necessary to enter the Parametric Mode.

Figure 59:
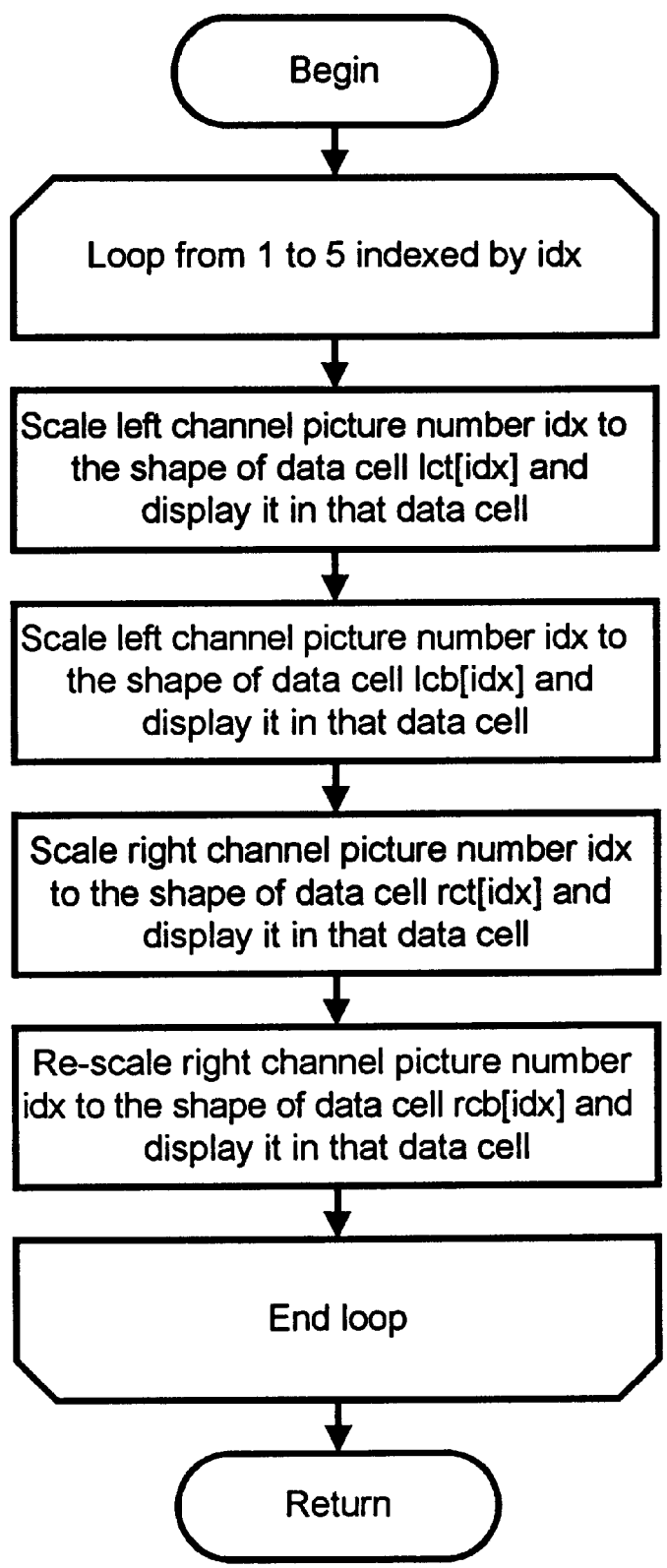

FIG. 59, Initialize Data Cells with Pictures: shows all data cells filled with pictures.

Figure 60:
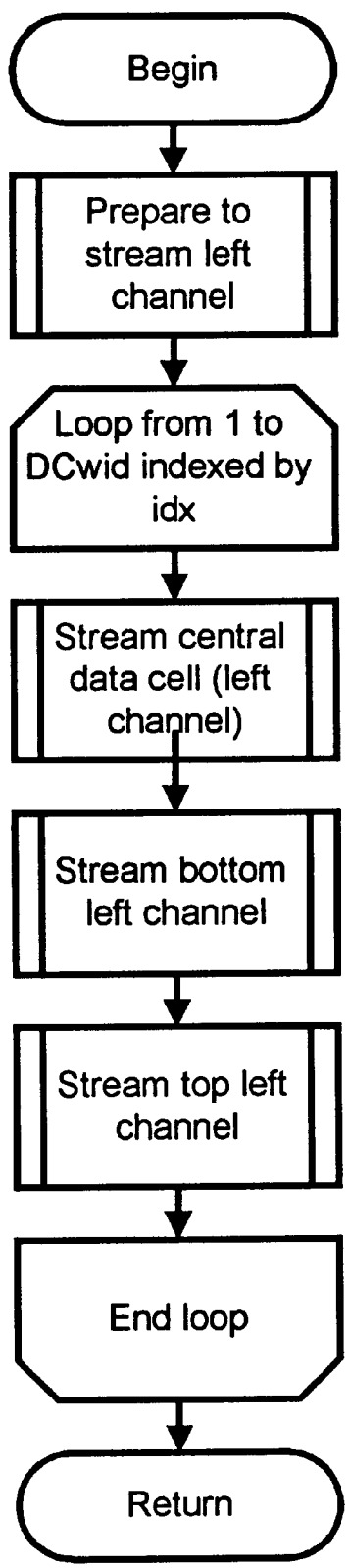

FIG. 60, Stream Left Channel: shows how the left channel is streamed overall.

Figure 61:
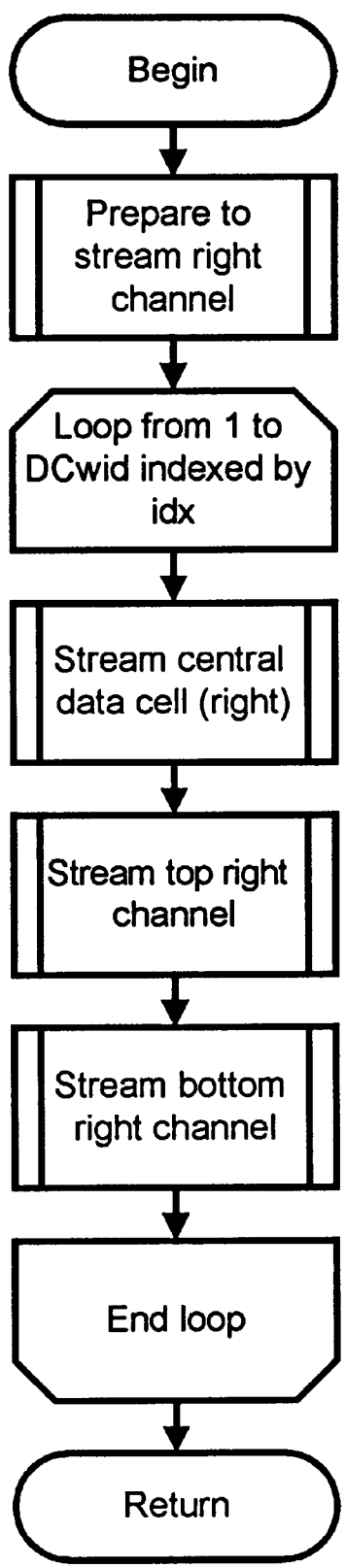

FIG. 61, Stream Right Channel: shows how the right channel is streamed overall.

Figure 62:
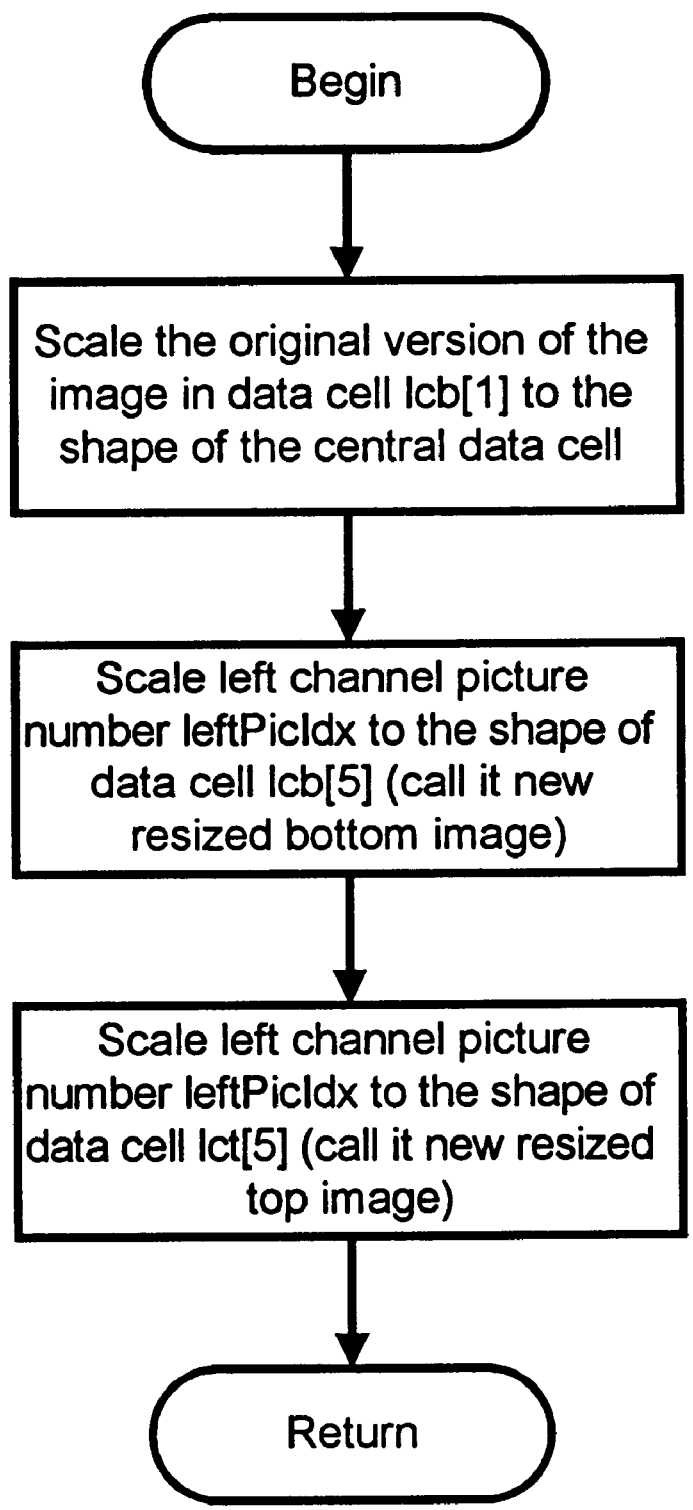

FIG. 62, Prepare to Stream Left Channel: shows the preparations needed to stream the left-channel.

Figure 63:
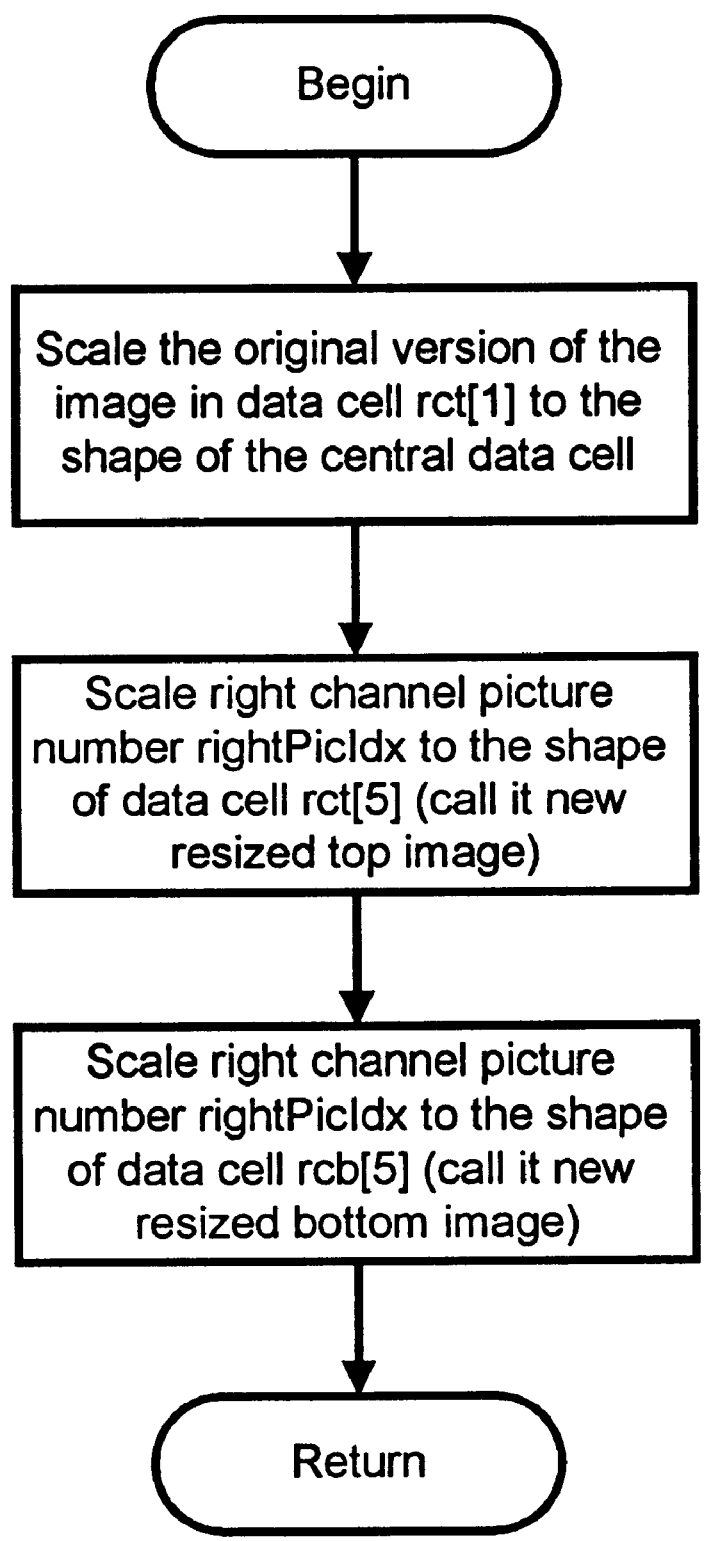

FIG. 63, Prepare to Stream Right Channel: shows the preparations needed to stream the right channel.

Figure 64:
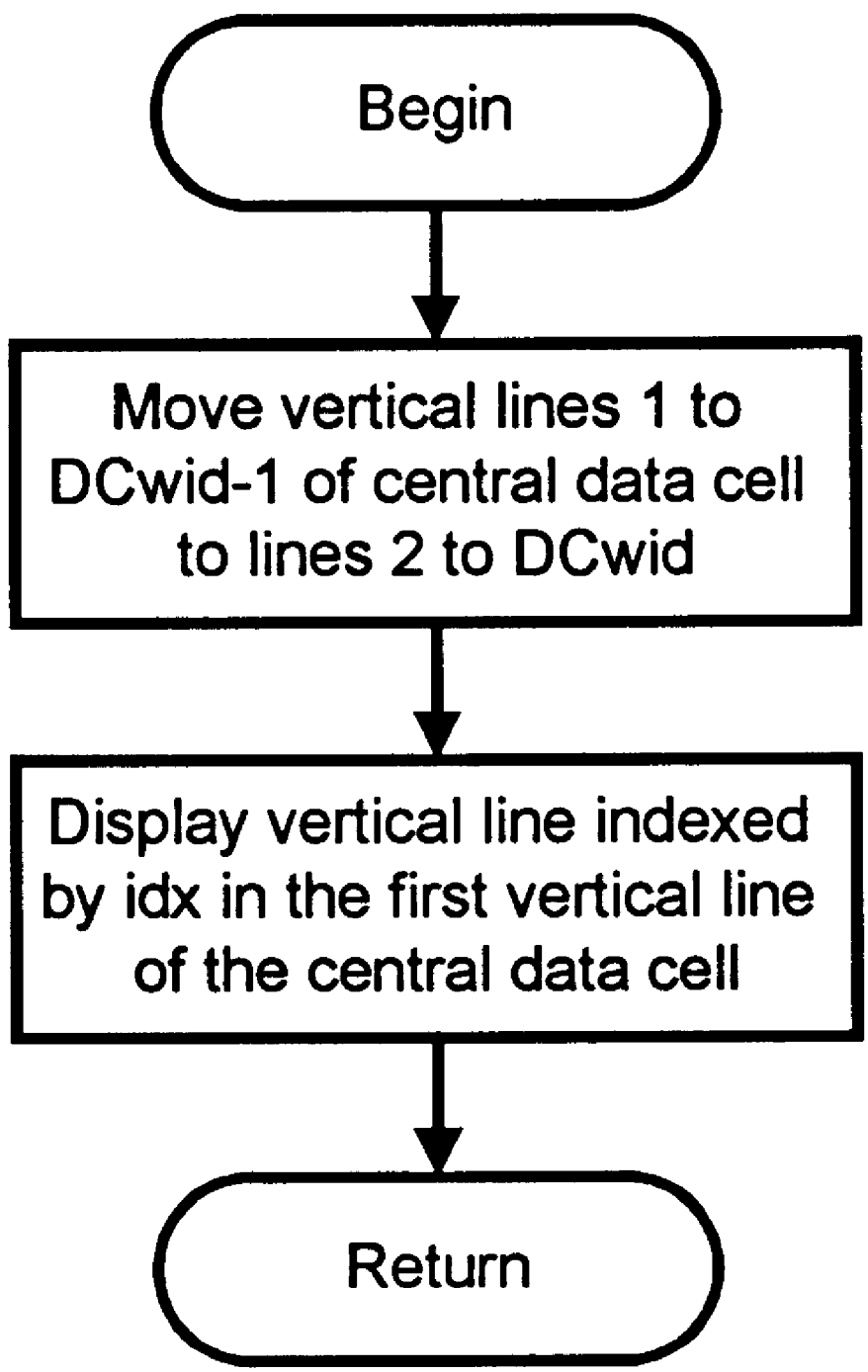

FIG. 64, Stream Central Data Cell (Left Channel): shows how the right most picture on the bottom left channel is streamed into central view.

Figure 65:
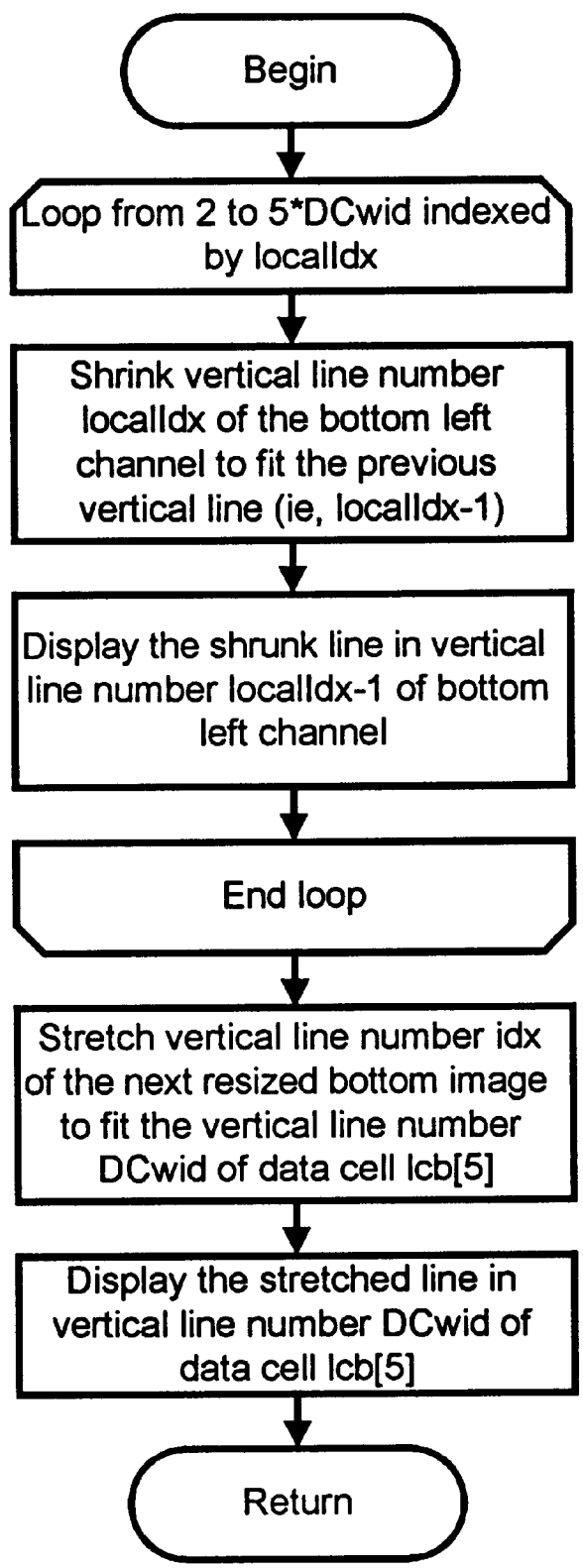

FIG. 65, Stream Bottom Left Channel: shows how a new picture is streamed into the bottom left channel.

Figure 66:
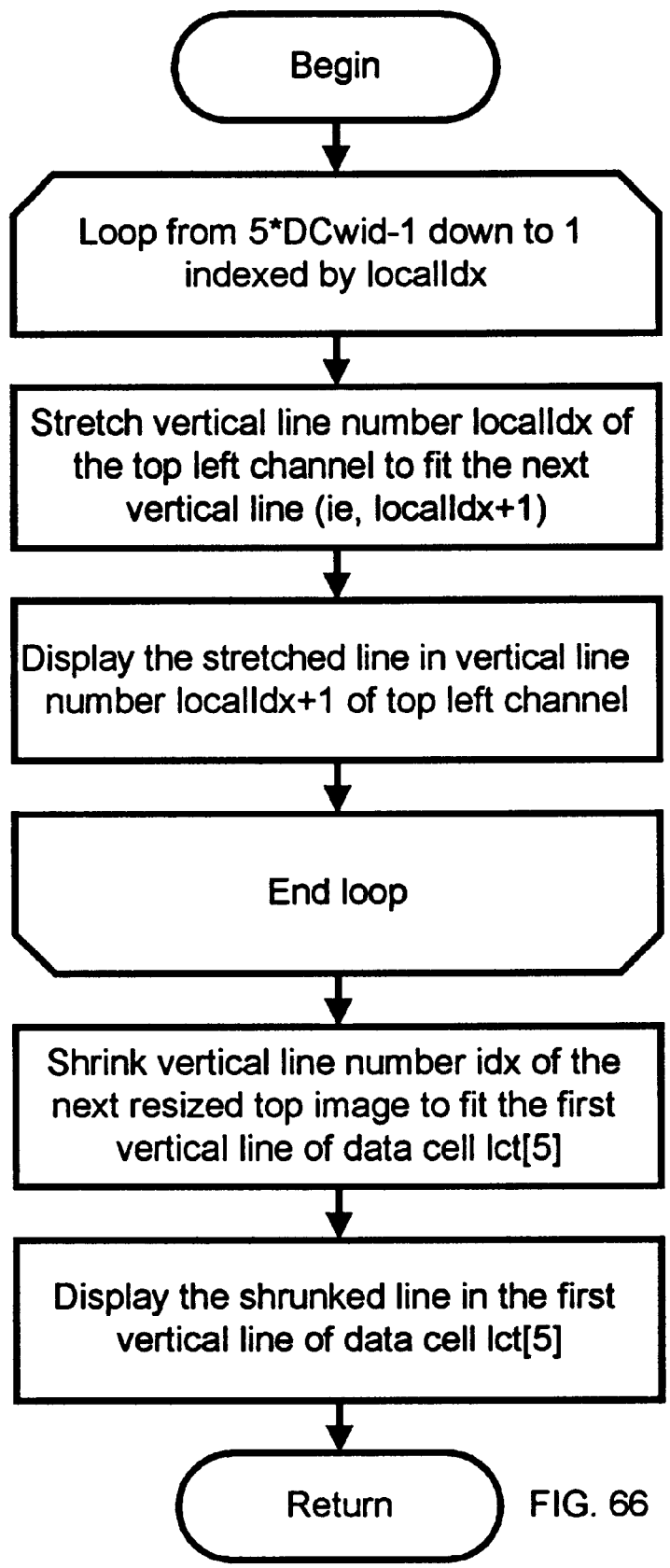

FIG. 66, Stream Top Left Channel: shows how the same new picture is streamed into the top left channel.

Figure 67:
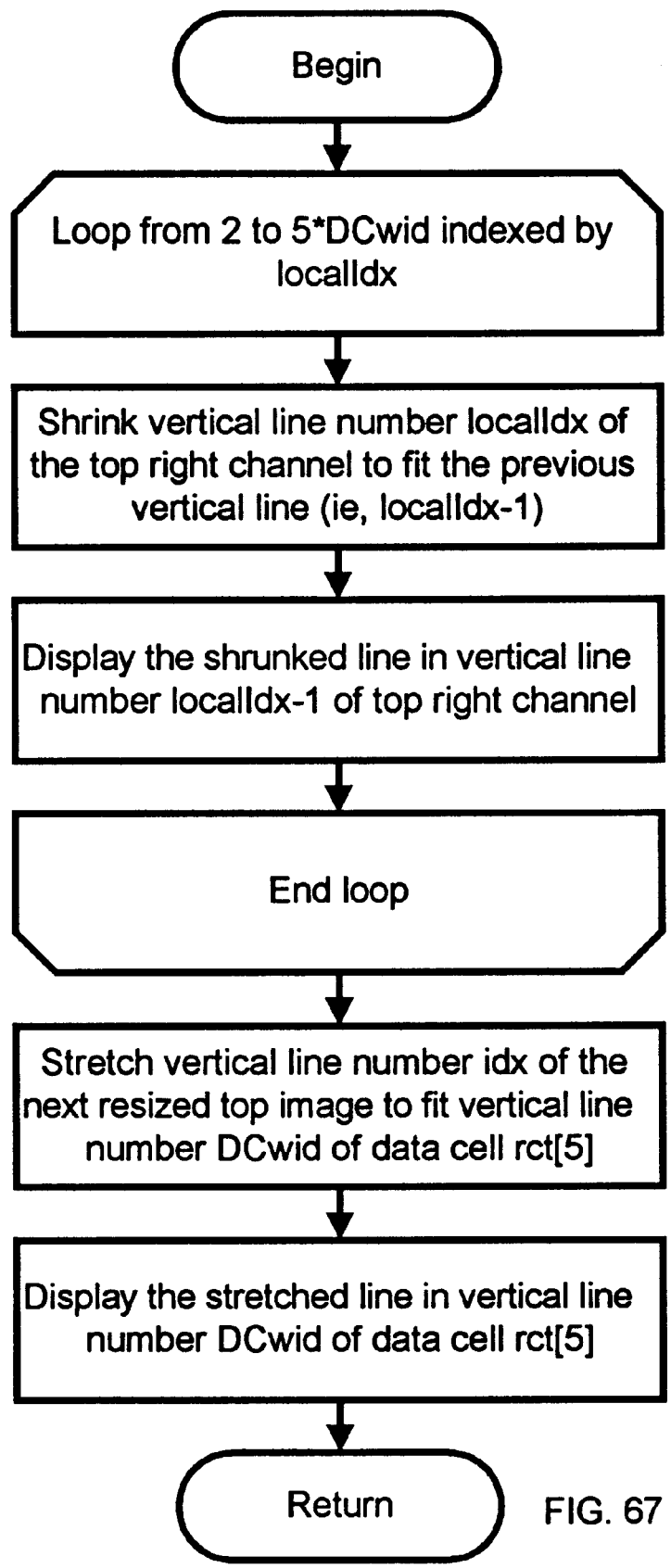

FIG. 67, Stream Top Right Channel: shows how a new picture is streamed into the top right channel.

Figure 68:
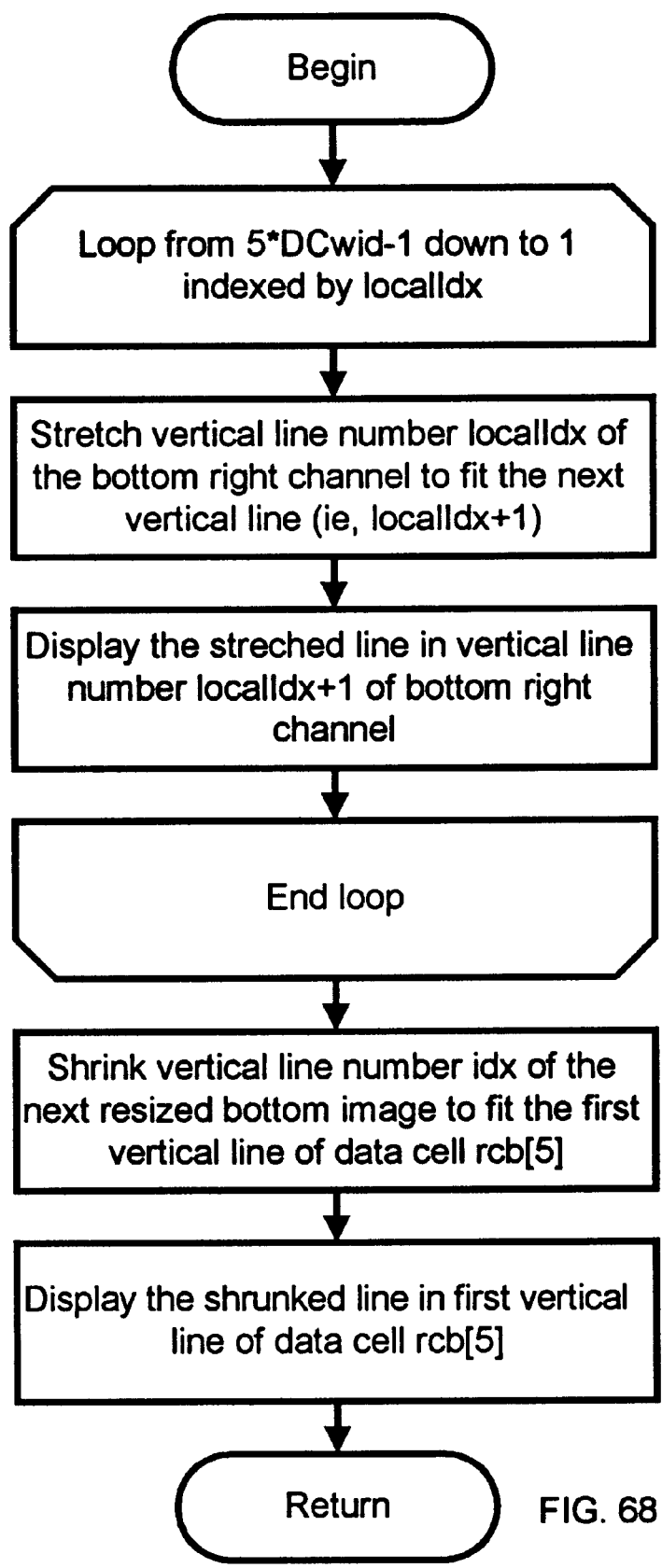

FIG. 68, Stream Bottom Right Channel: shows how the same new picture is streamed into the bottom right channel.

DETAILED DESCRIPTION OF A PREFERRED EMBODIMENT OF THE PRESENT INVENTION

The invention, named "MUI" or "Motion User Interface", is a visual interface for action by a user, based on basic cognitive viewing patterns of the mind to allow for faster registration of visual stimuli by the mind. The first aspect of the present invention is based on the premise that the mind can assimilate larger quantities of information when differentiated by motion as opposed to a static presentation on paper or on screen. Furthermore, when information is presented in motion, not only can larger quantities of data be assimilated, but assimilation also occurs at much higher speed than possible when static. The motion used in MUI is based on a continuous and smooth stream, allowing the mind to seamlessly and effortlessly assimilate the data being presented. Data can either be pictures, text (images of words) or a combination of both.

A second aspect of the MUI invention facilitates simultaneous viewing of concurrent channels of streaming information. Several viewing configurations are offered with MUI, wherein each configuration relies on the user's visual cortex interpreting the received images as if only two main input channels are presented. This is achieved by setting the stream directions of each quadrant. A quadrant refers to a position on the screen where an image is seen (FIG. 1).

Preferably the MUI allows two, three and up to four quadrants to be displayed simultaneously (FIGS. 1 & 2). These quadrants are displayed simultaneously, and can each hold one picture at a time. Each quadrant can stream images in different directions (up, down, left to right or right to left). By setting the directional flow of each stream motion in relation to the others (FIG. 3), the user's mind will only acknowledge two main viewing areas (visual cortex input channels) even if there are in fact 2, 3, or 4 concurrent streaming images. The MUI's display is preferably rendered in perspective, allowing a reduced width of the field of view through the Y-axis and added depth through the Z-axis. Depth via perspective eases the visual separation of streaming images as it is similar to one's physical experience in the real world.

There are two Beginner's Modes, the bi-mode and the quad-mode. A tri-mode can also be used but for purposes of the invention's description, only bi-modal and quad-mode configurations will be described. The principle for a tri-mode or configurations higher than quad-mode remains the same. There are also six advanced modes: Bi-Mode Multiple Cell 1, 2 and 2.A.; Quad-Mode Multiple Cell 1, 2 and 2.A; as well as a seventh mode that uses a different motion pattern, the Quad-Mode Piano-Sequence. The detailed description of the invention focuses for the most part on illustrating its functioning through the Bi-Mode.

BI-MODE

The Bi-mode is preferably implemented on a computer monitor by a digital computer capable of graphical display and presents two quadrants in perspective to the viewer. The data displayed may be present on a server or other data storage medium. The display is controlled by a processor implementing a user interface algorithm. This is the simplest of the viewing modalities and the easiest for viewing-by the untrained user.

Figure 4:
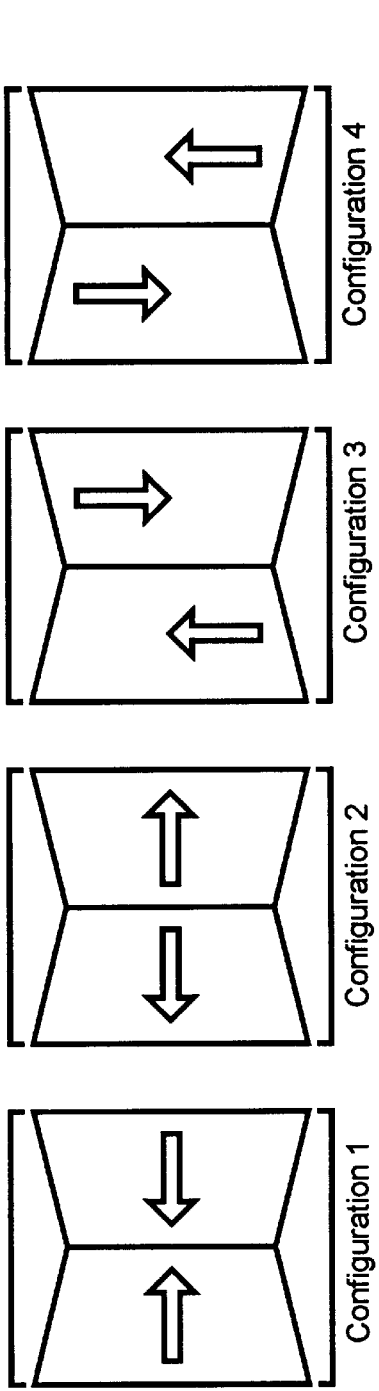
FIG. 4 shows possible directional flow configurations of image streams in a Bi-Mode display.

Directional flow can be set in four main configurations as shown in FIG. 4:

Configuration 1: The right quadrant streams from right to left while the left quadrant streams from left to right, in both instances towards the center.

Configuration 2: The right quadrant streams from left to right while the left quadrant streams from right to left, in both instances away from the center.

Configuration 3: The right quadrant streams from top to bottom while the left quadrant streams from bottom to top.

Configuration 4: The right quadrant streams from bottom to top while the left quadrant streams from top to bottom.

Figure 5:
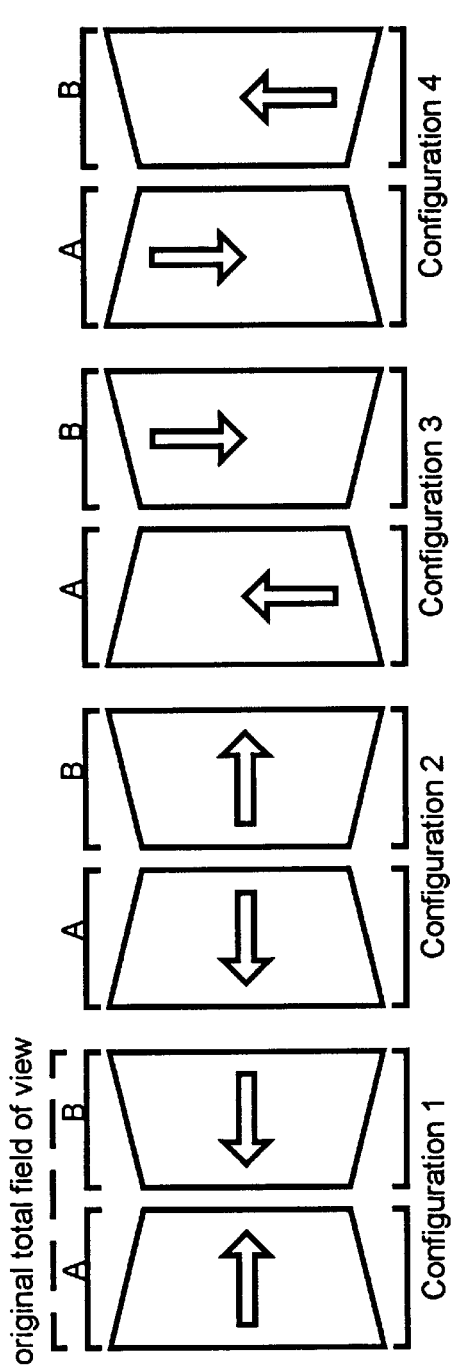
FIG. 5 shows how directional flow settings split a total field of view into two separate fields A & B, or two input channels for the visual cortex.

The above directional flow configurations result in the user identifying two viewing areas or two input channels A & B (FIG. 5). This separation of the field of view allows the user to view two images simultaneously for a short period of time (stream motion speed can be set by the user) before two more images are loaded into the respective quadrants for a same duration. Each setting efficiently achieves concurrent viewing—but different users will feel more comfortable with different configurations.

Incorrect configurations of Directional Flow (FIG. 6):

Configuration 5: Both right and left quadrant stream upward.

Configuration 6: Both right and left quadrant stream downward.

Configuration 7: Both right and left quadrant stream from left to right.

Configuration 8: Both right and left quadrant stream from right to left.

These incorrect settings will not have the effect of splitting the field of view into two viewing areas or two input channels for the user but will instead lead to the user acknowledging two sets of information—2 images—in a single viewing area (FIG. 7). Since the information is moving, the user must struggle to identify each set separately (one after the other) and the greater the speed, the more difficult it becomes. After a while, the mind loses the benefit of the stream and for every ten pictures, only three are effectively identified. A good example is the NYSE stock quote display or Cable TV's Preview Channel. The average-viewer gets lost in the flow of information. However, these displays are somewhat effective when the viewer is looking for specific information—either a specific quote or show rather than viewing the overall content of an entire database.

Configuration 5 through 7 have some value if the speed is sufficiently slow and there are only two quadrants presented. They are not preferable and are presented merely to illustrate the unique solutions that Configuration 1 through 4 present as concurrent viewing results in a faster registration of higher quantities of data.

Additionally, setting the directional flow as per configuration 1 through 4 allows the user to separate the field of view into two distinct viewing areas (FIG. 5), while smoothly assimilating the stream of one image to another in each quadrant. This results in the possibility of the user being presented with 2, 3 or 4 concurrent channels of information even though as far as the user is concerned, it is as if he/she was still dealing with just two separate input channels.

QUAD-MODE

Just as with the Bi-mode, the Quad-mode (FIG. 2) allows concurrent viewing of several channels of information. However, instead of two quadrants, the user is presented with four quadrants, each simultaneously streaming an image into another. The principle is the same as previously since each quadrant is set to stream in a particular direction in relation to the others (FIG. 8). These settings also result in the user concentrating on just two main viewing areas or input channels.

There are 12 directional flow configurations of which 10 effectively result in two main viewing areas while two result in three distinct viewing areas (FIG. 8, Configuration 11 & 12) and are thus less preferable for the user. The 12 possible configurations, are depicted in FIG. 8.

MULTIPLE CELL MODES

Multiple Cell Modes are advanced viewing configurations that exponentially increase the number of images that can be seen in the same amount of time as with the regular Bi and Quad-Mode.

Multiple Cell Modes can also be configured in a Bi-Mode, Tri-Mode or Quad-Mode. The central quadrants are extended into rows of 3 or 5 cells each revealing an image (FIG. 9) presented in a perspective view,. Hence, a picture "A" would stream into cell 3—the cell furthest away from the central quadrant or cell 1—and remain in that position for a determined amount of time (stream motion speed can be set by the user) before streaming into cell 2. This action will continue until the image has reached cell 1. By the time picture A has entered cell 1, picture C will be in cell 3 and as it streams into cell 2, picture D will have entered cell 3.

The perspective view also plays a significant role in facilitating the identification of data. This is true with rows that contain 3 cells or 5 cells. (However, once one starts streaming 2, 3, or 4 rows with 5 cells each, the speed can become overwhelming and embodiments termed "Parametric Repeat Patterns" and "Aligned Proximity" have been developed to solve the problem. These embodiments are addressed under "Parametric Repeat Patterns and Aligned Proximity" and it is the third main preferred embodiment of MUI and perhaps the most-useful.)

In the case of rows affording a three cell presentation (FIG. 9), the central field of view (located at the center of the overall display) is the focal point where the viewer will be naturally prompted to direct his/her attention. (This natural prompting is enhanced through a feature referred to as "Luminance Zones".) In order to see the whole and acknowledge the images coming in from the furthest point of the 2, 3 or 4 rows, the viewer simply retracts his viewing. In essence, the user perceives an enlarged total field of view (FIG. 10). It is preferable to retract by zooming out one's eyesight than to zoom in. MUI was designed to prompt this action as images entering the central cells 1 of each respective row will then disappear. Hence, if one has already identified the images in cell 1 and 2 it is far more logical to zoom out to glimpse at the image in cell 3. Furthermore, as the images in cells 3 have already been identified, the viewer already knows from the overall flow of data that those images will instantly find themselves in cells 2 before proceeding to cells 1. Hence, the overall flow naturally directs the viewer to zoom out, zoom in, zoom out etc. at will, whenever a particular image has caught his/her interest. This action remains valid in the directional flow setting of configuration 2 (FIG. 9, Config.2) as the viewing reflexive methodology is merely inverted from the center to the borders of the display, though it is not preferable from a cognitive standpoint.

PARAMETRIC REPEAT PATTERNS

Figure 11:
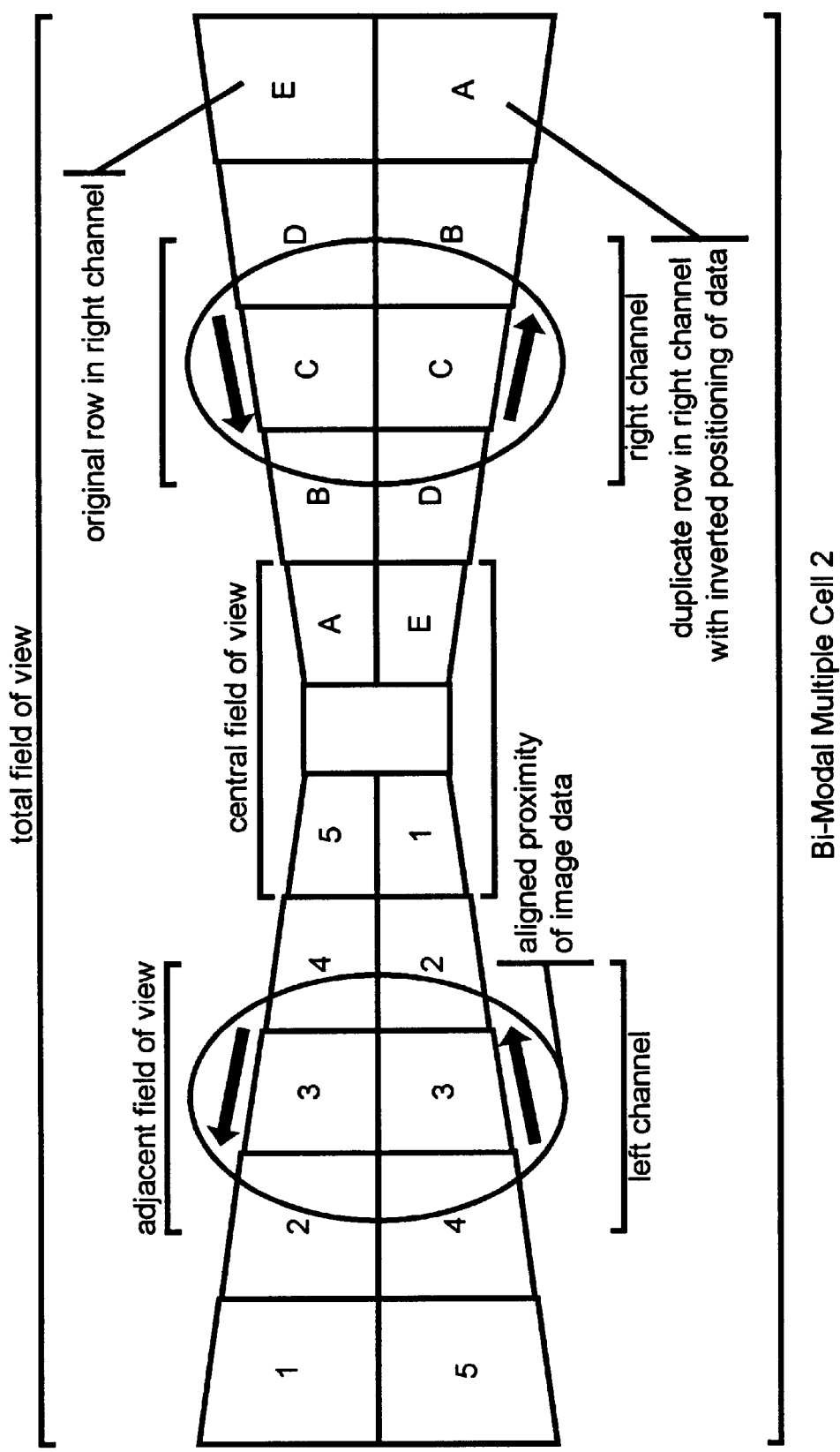
FIG. 11 is a drawing of a Bi-Modal Multiple Cell 2 display having Parametric Repeat Patterns and Aligned Proximity. The drawing also shows the inverted positioning of an original and duplicate row, adjacent fields of view as established by the Aligned Proximity of image data, and a central field of view.

Parametric Repeat Patterns and Aligned Proximity is the third aspect of the MUI invention. Parametric Repeat Patterns are applicable to all Multiple Cell Modes but are used mostly in 5 cells per row configurations and are based on duplicating data cells when presented in a display. Hence, if an image or set of images streams onto the screen, the same image or set of images will appear simultaneously on the screen at another location. Since a Multiple Cell Mode is presented as a row (referred to as the original row), MUI arranges the duplication as a second row (the duplicate row) placed below or above the original row. Furthermore, if the original row presents images A through E, the duplicate row would present images E through A. The streams would also run in opposite direction (FIG. 11).

ALIGNED PROXIMITY

Aligned Proximity is a direct result of a Parametric Repeat Pattern arrangements and manifests itself when, through the action of streaming images, the images from both original and duplicate row interconnect through a visual alignment in cell 3 of each respective row. This has the advantage of enhanced exposure to the specific data cell carried by images that align (FIG. 11).

The reasoning behind Parametric Repeat Patterns and Aligned Proximity is as follows. In the case where rows of 5 cells are displayed irrespective of the number of channels (2, 3 or 4), the same problem occurs as discussed under "Incorrect Directional Flow" settings in Bi-mode (FIG. 7). Although the directional flow for a row runs in relation to the other rows' directional flow, the sheer number of images streaming simultaneously in one row, a number multiplied in a Bi, Tri and Quad Mode, can be overwhelming. Indeed, the user will quickly find itself relegated to focusing on a single row's stream of images. Hence, the viewer chases a stream of images in one row, desperately attempting to identify every image and focuses on just one single field of view. Concurrent viewing of streaming information is no longer achieved and within a short time, the viewer will only identify, for argument's sake, 3 out of 10 images.

The solution found was to duplicate the original number of rows. MUI still presents the original Bi, Tri and Quad-Mode solutions—not 4, 6 and 8 individual rows—but merely takes the content of each cell in a single row and duplicates it immediately below it or above it depending on the directional flow chosen by the user (FIG. 11).

If a row is streaming images A through E in cell 5 through 1, the duplicate row below it will also stream images A through E. However this implementation does not result in any improvement as the viewer is still chasing a stream of images in a single field of view. Hence, rather than merely streaming images A through E, the invention inverts the order of the images so that images E through A will stream from cell 1 to cell 5. The order of the cells has also been inverted. This novel solution achieves two goals (FIG. 11):

1. By setting the directional flow in the duplicated row to stream in the opposite direction, MUI has reinstated 2 fields of view for the user. Note that in all cases of a Bi-mode, Tri-mode or Quad-mode with five multiple cells, two vertical visual fields A & B have been established along with a single horizontal visual field C and this number is still easily handled by the user as all it need do is switch back and forth at will between the logical input channels to identify the streaming data or zoom out and focus on the total display. What the MUI has achieved at this level is essentially to establish a reflexive methodology for the user to switch back and forth between fields of view (FIG. 12).

2. Since there is an odd number of cells, inverting the order of images streaming in a pair of rows will lead to the images aligning at the central point of the rows or cell 3 (FIG. 12). The MUI's purpose is to further establish an additional point for the viewer to select, an adjacent central field of view, that will naturally call attention to the viewer. Hence if image X has caught the attention of the viewer but he/she is more focused on another image, the viewer intuitively knows that he/she can further glimpse and identify the detailed nature of image X when it aligns[] parametrically in the position of cell 3, in both the original row and its duplicate, placed below or above, depending on the directional flow chosen.

BI-MODE MULTIPLE CELL CONFIGURATIONS
BI-MODE MULTIPLE CELL 1

Figure 9:
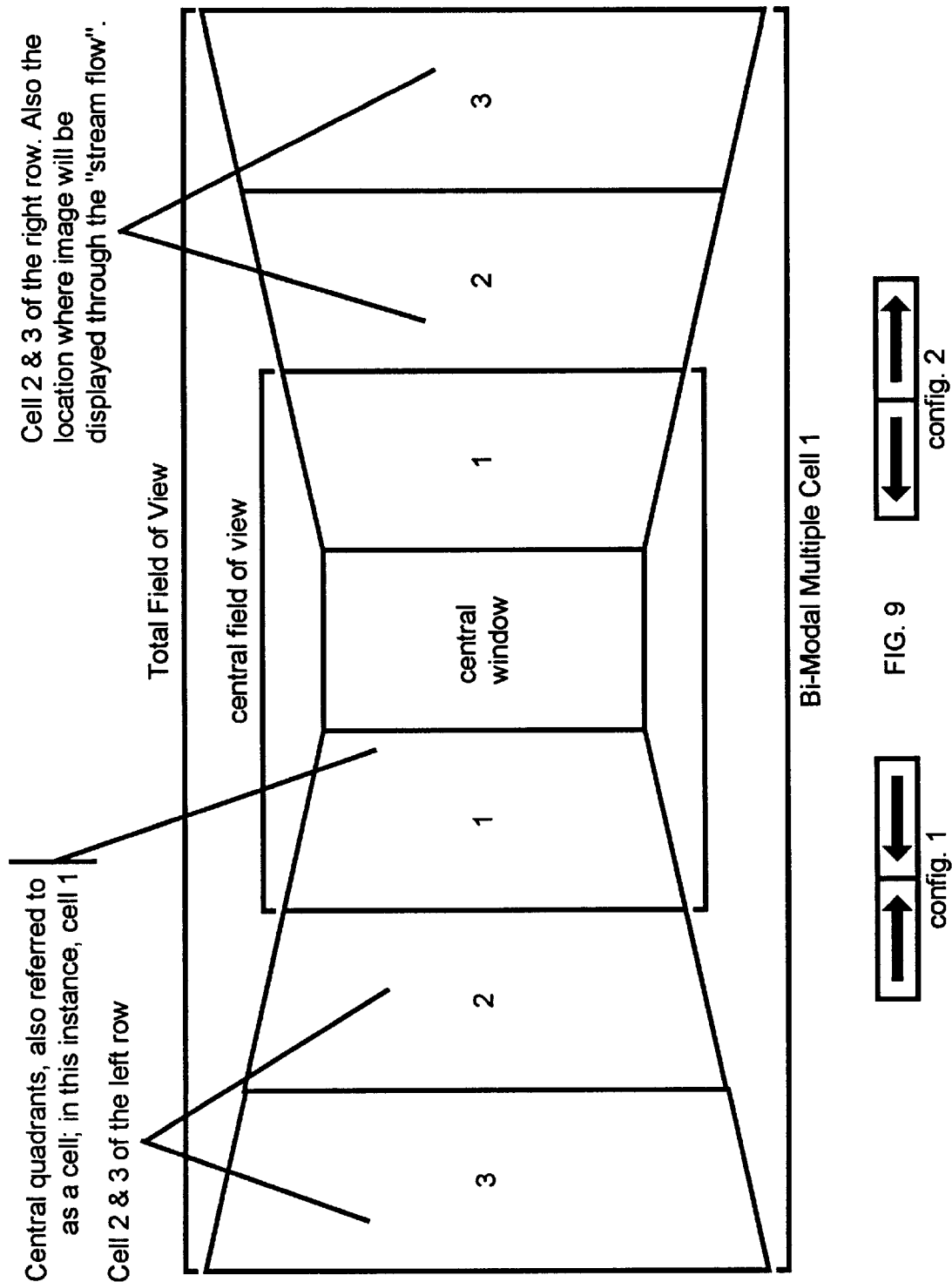
FIG. 9 shows a Multiple Cell Mode in a twin channel configuration, Bi-Modal Multiple Cell 1 with central quadrants and cells, adjacent cells, the location of a central field of view, a central window and the correct directional flow configurations for that particular display.
Figure 10:
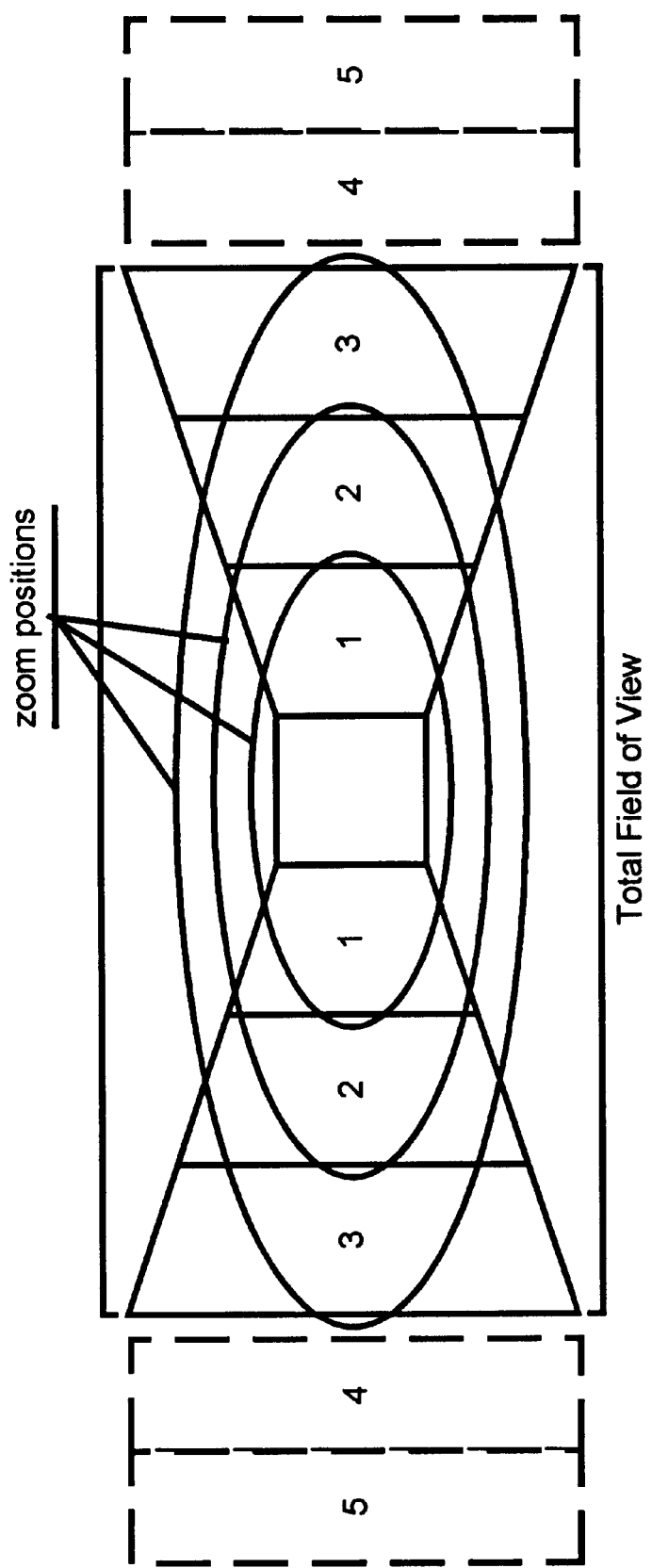
FIG. 10 is a drawing of the Bi-Modal Multiple Cell 1 display and shows the natural zoom positions that aid in the visual interception of images.

In this embodiment only 3 cells are displayed in each row (FIG. 9).

Configuration 1: The left row streams from left to right while the right row streams from right to left, both streaming towards the center.

Configuration 2: The left row streams from right to left while the right row streams from left to right, both streaming away from the center.

BI-MODE MULTIPLE CELL 2

This is the most complex of embodiments (FIG. 11 & 12) where each row displays 5 cells and where use of Parametric Repeat Patterns and Aligned Proximity is necessary for concurrent viewing. (This same configuration is also applied to a Tri and Quad-Multiple Cell mode.)

Configuration 1: The right channel comprises two rows, an original placed on top and a duplicate placed below. The top "original row"—streaming images A through E positioned in cell 5 through 1 with cell 5 being the furthest away from the center—is set to stream from right to left while the "duplicate row below streams images E through A from left to right through cell 1 through 5, with cell 1 being the furthest away from the center (FIG. 12). Conversely, the left channel also comprises two rows with the original row placed below and the duplicate placed above. The bottom "original row"—streaming images A through E via cell 5 through 1 with cell 5 being the furthest way from the center is set to stream from right to left while the "duplicate row" above streams the same images E through A from left to right via cell 5 through 1 with cell 1 being the furthest away from the center. (Note that the images A–E in the right row are different than the images A–E in the left row)

Configuration 2: The opposite of configuration 1 (FIG. 12).

Figure 13:
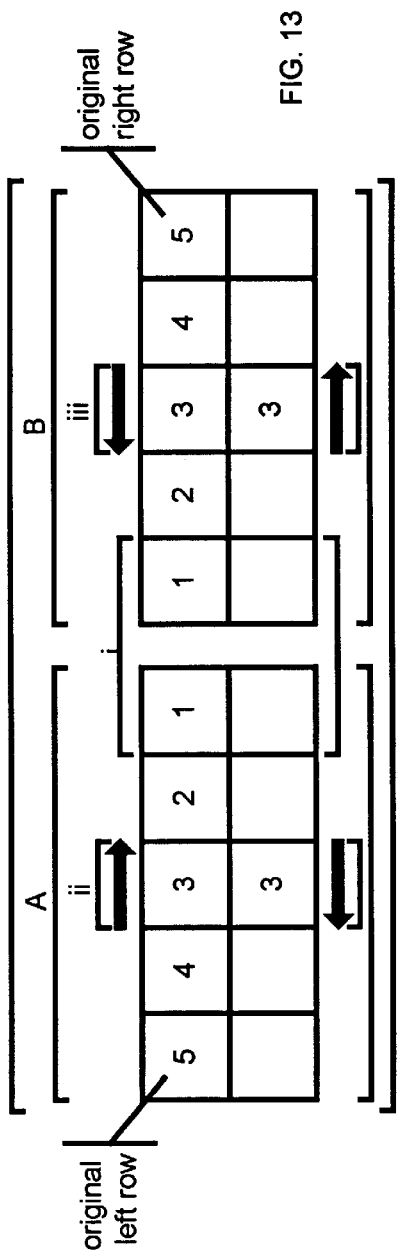
FIG. 13 shows a Bi-Modal Multiple Cell 2 display with incorrect positioning of rows and correct directional flow configurations.
Figure 14:
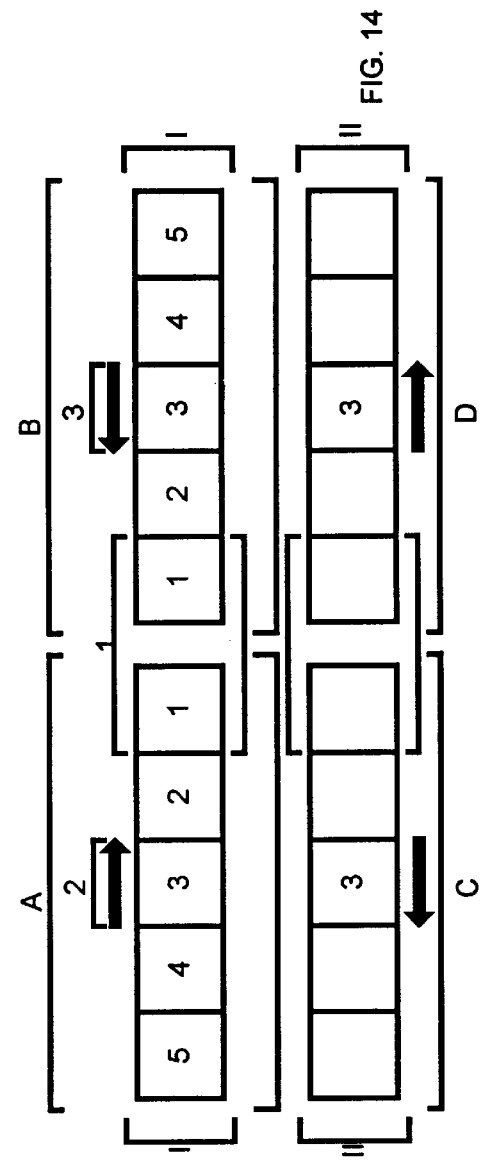
FIG. 14 shows the confusing array of visual fields established by incorrect positioning of rows and correct directional flow configurations, namely two pair of vertical input channels (A;B, C;D) and two pairs of vertical input channels (I;I, II;II).
Figure 15:
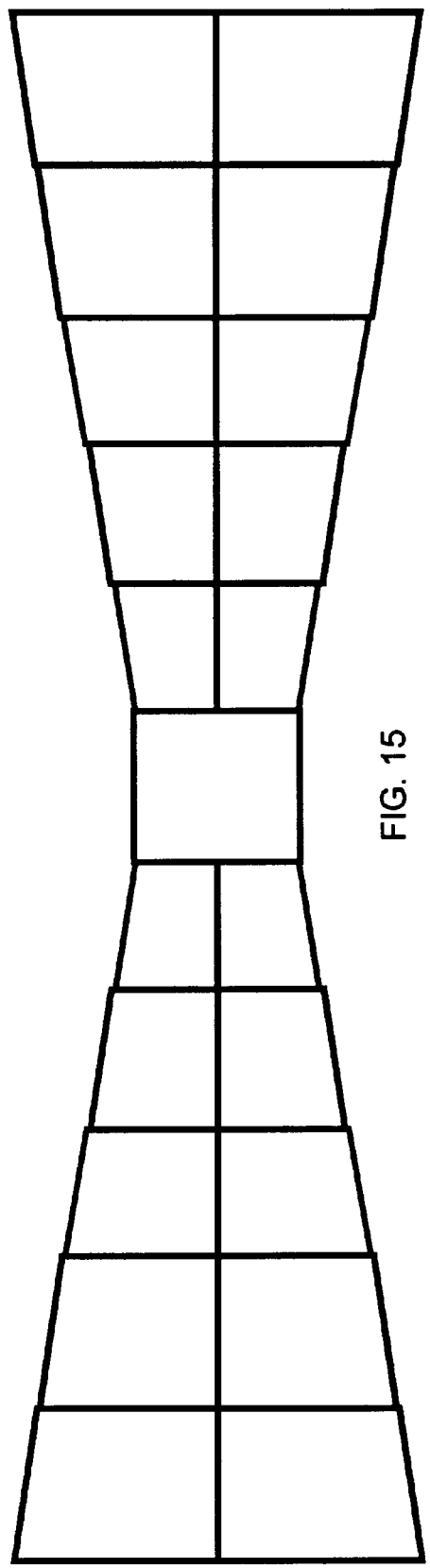
FIG. 15 shows the initial Parametric Mode Lay-out.

It is important to note at this point that with Bi-Mode Multiple Cell 2, the directional flow configurations above achieve concurrent viewing by splitting the total field of view into two vertical pairs of input channels A & B for the visual cortex. This is done by placing the original row in one channel directly opposite the other channel original row's position (FIG. 12). Hence if the original channel in the left row is the top one, then the original channel in the right row will the be the bottom one and vice versa. This establishes the vertical input channels A & B to the visual cortex. Since there are two rows per channel, setting the directional flow as per configuration 1 and 2 above, with both original channels in the top position (FIG. 13), would, in effect, result in the viewer having to gaze back and forth between 4 vertical fields of view (FIG. 14, A, B, C and D), one pair above the other while the two horizontal fields of view become the gaze's travel between the top and bottom levels (FIG. 14, 1 and 11). Within those two levels, concurrent viewing is achieved by the correct setting of directional flow but complete concurrent viewing for the total display/field of view is not achieved, as shown in the abstracted schematic (FIG. 14). By inverting the positions of both original and duplicate channels, the MUI is crisscrossing the paths of two horizontal fields of view, forcing the user to assimilate it as one complete horizontal visual field (FIG. 12). Within the context of this complete viewing area, both left and right channels are correctly split into two concurrent pairs of viewing areas or two input channels and not three.

BI-MODE MULTIPLE CELL 1.A.

Bi-Mode Multiple Cell 1.A: Directional flow settings and row positioning follows the logic above, but one difference exists. The stream of images in the left channel (or vice versa) will start at time x while the opposite channel, the right channel in this example will start streaming at time y, with time x earlier than time y. This configuration will lead image A of the left channel reaching cell 1—within the original rows—before the right channel's image A reaches cell 1. Hence this timing sequence will also allow the viewer to focus his/her attention back and forth between the right and left sides of the display.

Finally, as all Multiple Cell modes contain a central window placed in the center of each quadrant, the MUI uses this central window to feed into it each image that reaches cell 1. This technique provides an enhanced focal point allowing the viewer to further identify the nature of the image or data, in essence extending the time for visual acquisition. Due to the streams starting at different times, reverting to the above scenario would lead the left channel's image A1 to reach cell 1 before the right channel's image A2 while feeding image A1 into the central window—allowing for an extra opportunity—just before image A2 coming in from the right channel enters the central window leaving the position of cell 1.

OUAD-MODE MULTIPLE CELL EMBODIMENTS

All elements of the Bi-Mode Multiple Cell display features are retained in the Quad-Mode Multiple Cell: Parametric Repeat Patterns are also necessary through the inversion of data cell order, the specific target, positioning of original and duplicate rows is utilized, as is the Aligned Proximity of data cells with all configurations having five cells per row. Differential Luminance zones is offered and in the case of Quad-Mode Multiple Cell 2, a configuration whereby the images reaching the central quadrants can enter the central window at timed increments is also offered (Quad-Mode Multiple Cell 2.A).

QUAD-MODE MULTIPLE CELL 1

In this embodiment, three cells per row are utilized and there are no Parametric Repeat Patterns and Aligned Proximity. There are 14 directional flow configurations. See FIG. 16.

QUAD-MODE MULTIPLE CELL 2

As with the Bi-Mode Multiple Cell 2, this configuration calls for the use of Parametric Repeat Patterns and Aligned Proximity. There are four original rows and corresponding duplicate rows, all presenting five data cells and a central window to the viewer.

Positioning of rows follows the same logic as the Bi-Mode Multiple Cell 2, as does the directional flow settings.

Figure 17:
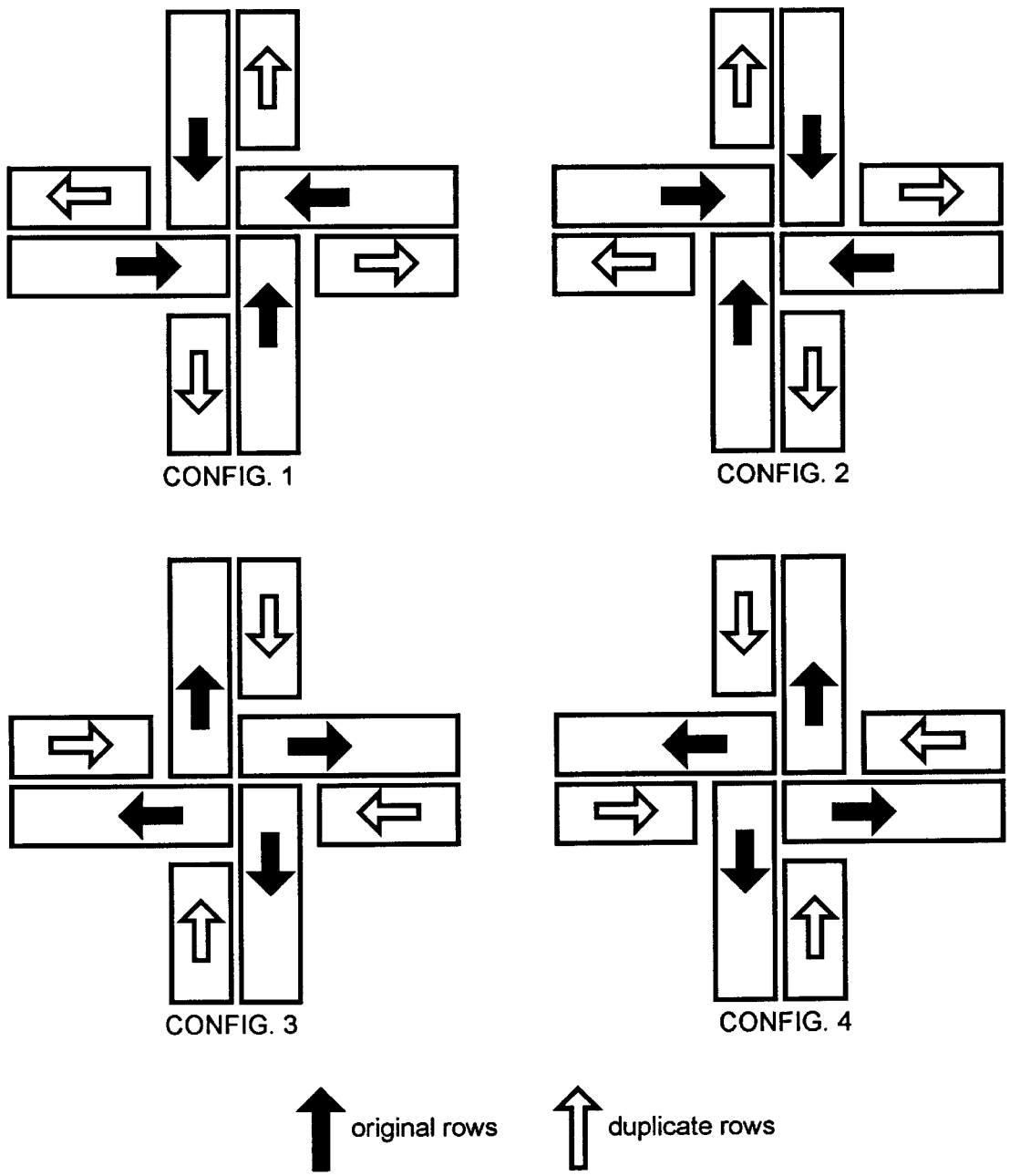
FIG. 17 shows the directional flow configurations for Quad-Mode Multiple Cell 2 and Quad-Mode Multiple Cell 2A displays along with the correct positioning of original and duplicate rows for each directional flow configuration.

For Directional Flows, please refer to FIG. 17.

QUAD-MODE MULTIPLE CELL 2.A.

All settings are the same as those of Quad-Mode Multiple Cell 2 except that a timed sequence is used, as with Bi-Mode Multiple Cell 1.A.

QUAD-MODE-PIANO-SEQUENCED

Figure 20:
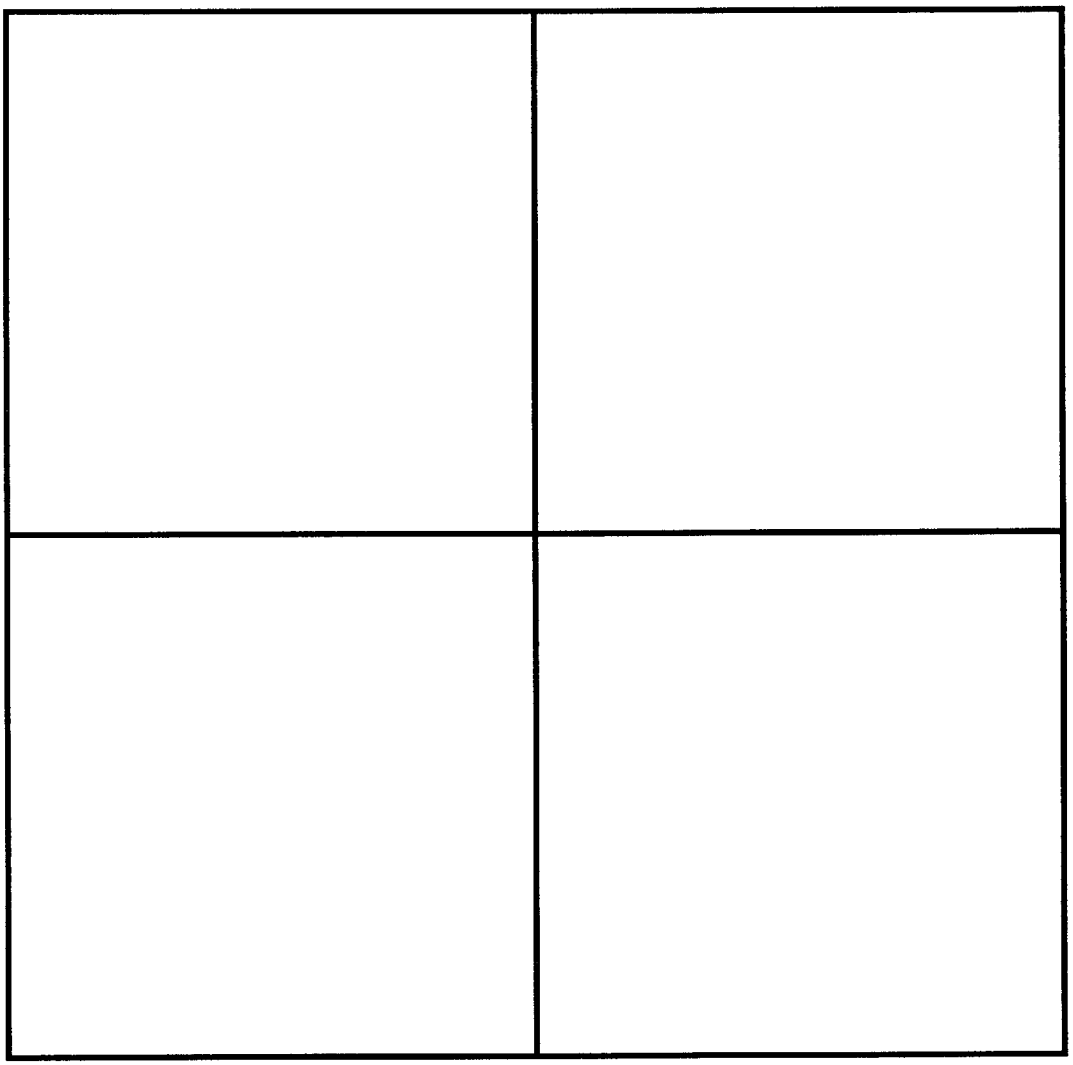
FIG. 20 shows the Initial Piano Quad-Mode Layout.

This particular display methodology is unlike all the others as it utilizes a distinctly different motion pattern, does not require that split fields of views (visual cortex input channels) be established for concurrent viewing—concurrence does not play a role in this particular methodology—and is presented in a flat 2-dimensional display rather than using perspective (FIG. 20). The motion is based on a continuous and interconnecting "flip-jump" of images and is effective in a tri-mode, quad-mode and higher configurations.

Four images are presented on a screen in near proximity and laid out so that each image corresponds to the four quadrants set by splitting a square in four.

Figure 21:
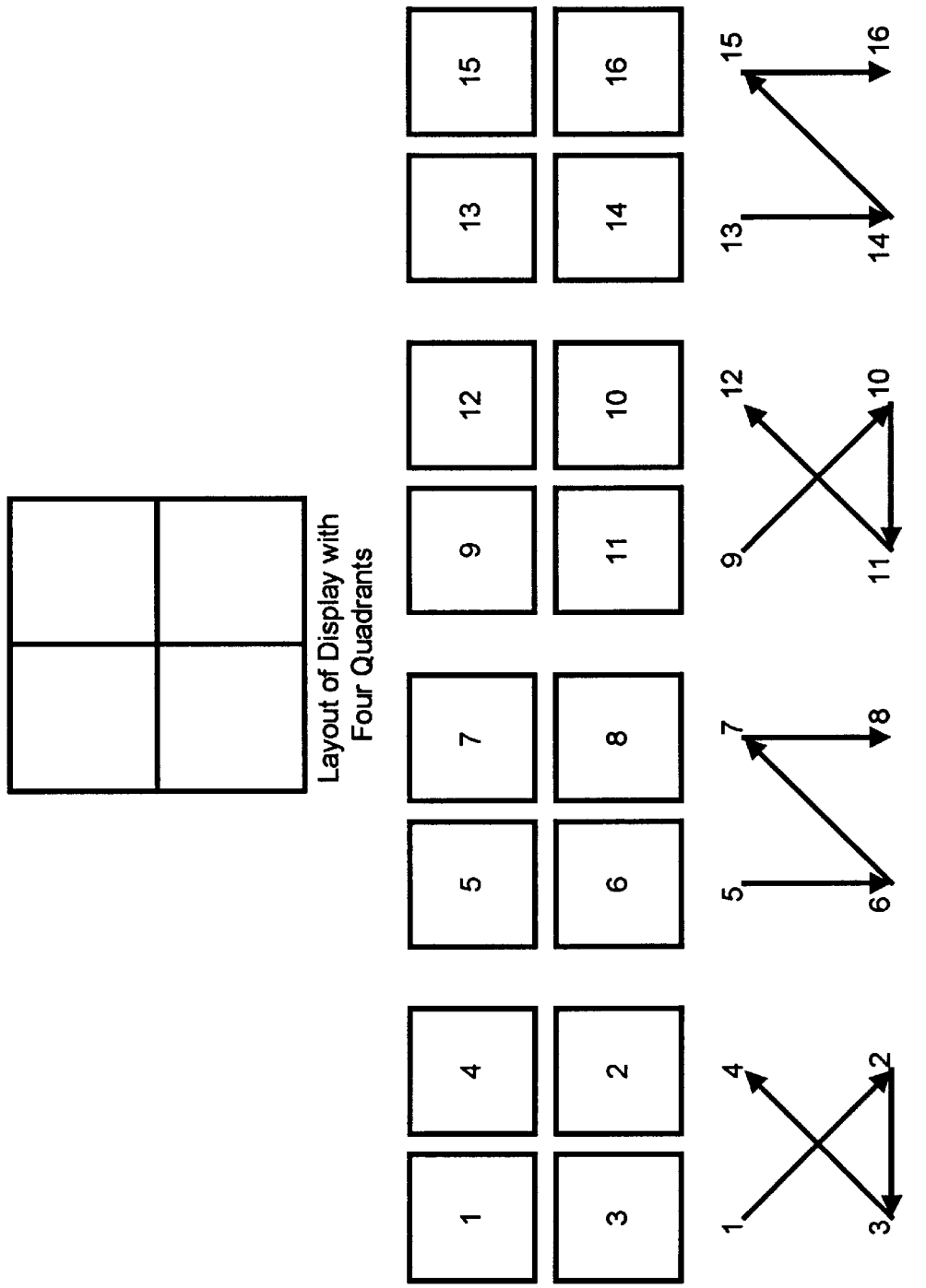
FIG. 21 shows an 8-step "jump-flip" sequence within a Quad-Mode Piano Sequence.

Image 1 flips-on in the upper left hand quadrant, flip-jumping to the second image on the bottom right quadrant, then proceeding to the bottom left corner and finally flip-jumping back to the upper right quadrant. Image 5 flips-on at the starting point of image I—the-upper left quadrant—, flip-jumping to the bottom left quadrant following to the next set position, the upper right quadrant and finalizing the eight step sequence in the bottom right quadrant. The sequence will loop again with image 9 until all images in the database have been exhausted or the user has interrupted the motion (FIG. 21).

The establishing of these 8 step sequences (which could also be 16 steps or any multiple of the number of quadrants) changes the visual path so that the user is kept naturally alert and attempts to commit the sequence to memory while undergoing the sequence process. Eventually, the user knows precisely and almost by second nature where on the screen to set his/her sight.

This process also results in an exponential browsing speed for large numbers of images, such images being pictures, text (images of text) or a combination of both.

LUMINANCE ZONES

Figure 22:
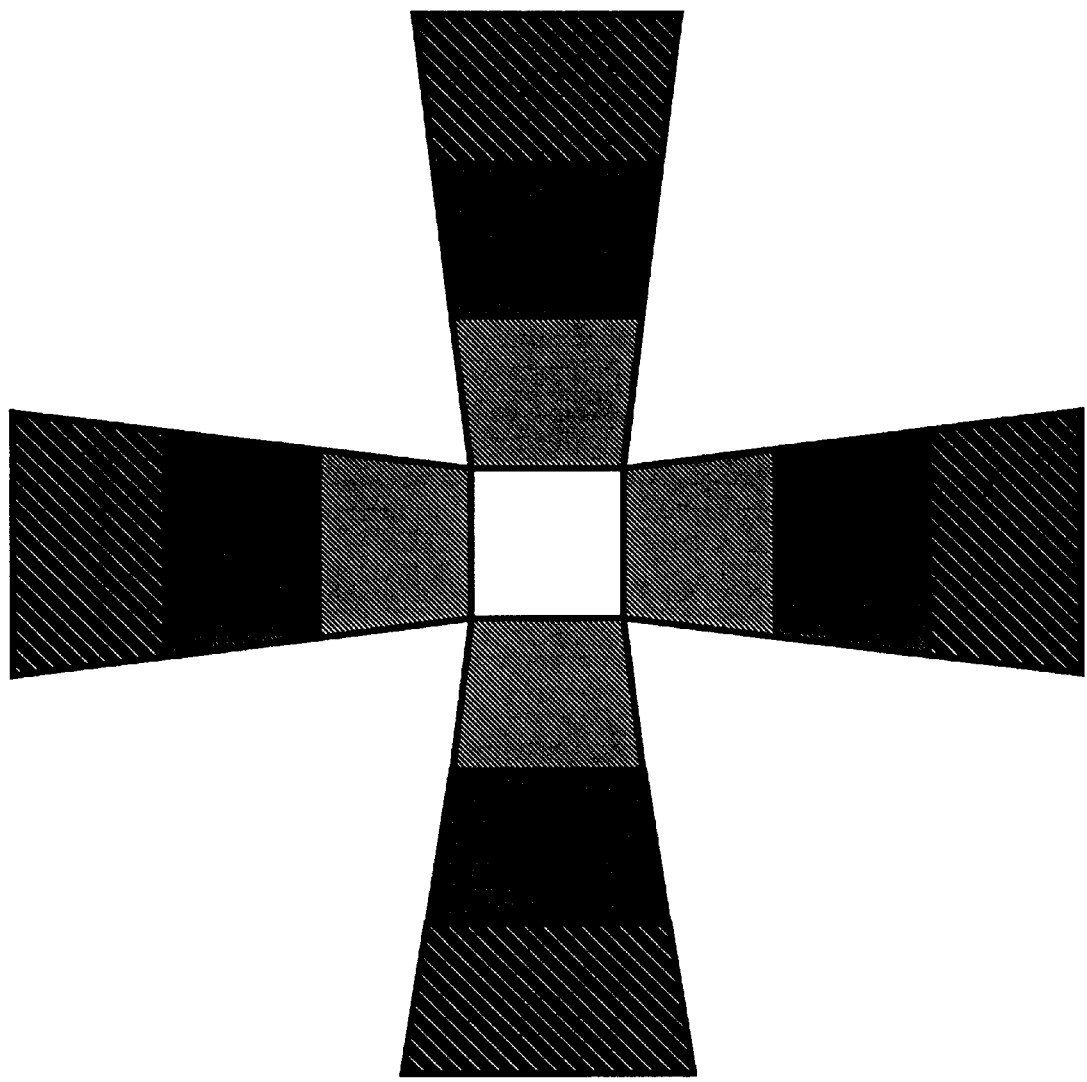
FIG. 22 shows a Quad-Mode Multiple Cell 1 display with Dim Luminance Zones.

The luminance zone feature may be utilized in all cases of a Multiple Cell Mode display at the user's option. It simply calls for the central cells to be highlighted by a higher level of luminance than the cells adjoining them in all rows. The adjacent cells 2 through 5 are dimmed by a shaded zone (FIG. 22). By differentiating the central cell with a higher level of luminance, the MUI directs the user's attention to the central field of view where central quadrants are located and where images will be afforded a last chance for identification. (Note however, that the user may revert to classic scroll features to backtrack a stream or an "Interrupt Flow" button should his/her attention to a specific image warrant a complete interruption or a backtracking motion of the stream.)

In the case of Multiple Cell Mode configurations where five cells per row are displayed and where the setting is in "Parametric Repeat Pattern and Aligned Proximity", a third and intermediate level of luminance is used. It differentiates the field of view at the center of the display, the positions of image alignment in each row—adjacent central field of views—and the total overall display which would be the dimmest of all luminance zones.

VISUAL TAG SEARCH

In searching through large databases, a user may be offered the use of a textual search engine to filter the data by the computer so that only information of particular interest is either returned or accessed for viewing and analysis. Visual Tag Search incorporates the idea of further defining a search but does so in a strictly visual format. It differs significantly from the textual search engine since unlike the textual search engine it actively involves the user in the search of specific information in a MUI environment.

Textual search engines rely on one or several text boxes for entry of user-defined parameters (in certain cases those parameters are pre-defined) after which the search process is autonomous until data that matches the parameters is located by the engine and displayed for the user to analyze.

Figure 18:
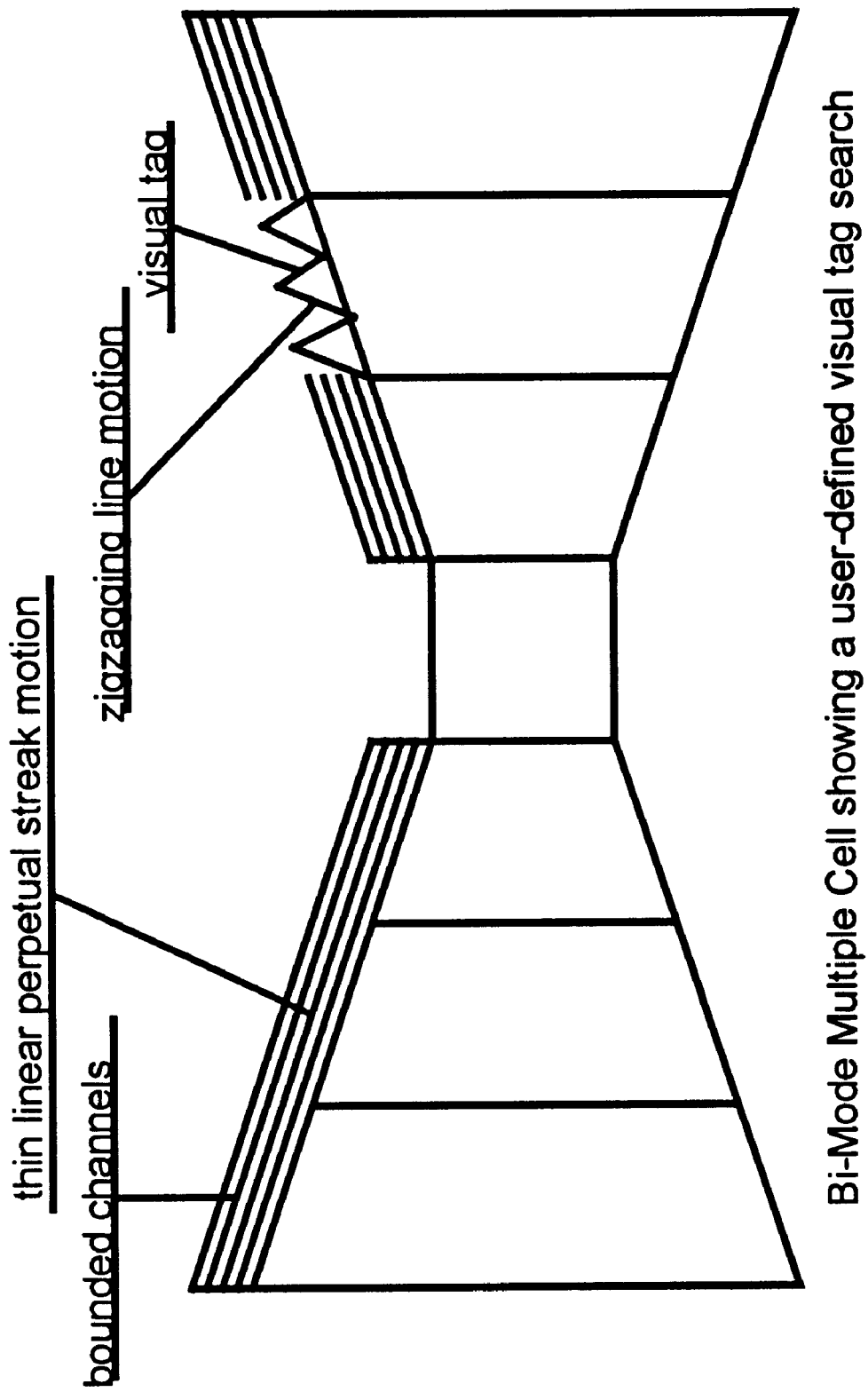
FIG. 18 shows a Bi-Modal Multiple Cell display with a Visual Tag Search (VST) along with the explicit manifestation of a Visual Tag as inserted in bounded channels.

Visual Tag searches also rely at the initial user setting level on user defined or pre-defined parameters. Once this step is taken, motion based visual tags displayed on a bounded channel will appear above data cells that match the parameters, thus visually signaling the user (FIG. 18). Once the visual tag has entered the visual field's orbit, the specific motion used inside the bounded channel will distinguish itself from the regular stream motion, communicating to the user that further action may be taken, an action herein described as "Tag user induced access mode" (FIG. 19).

To further understand how a Visual Tag Search operates, a case scenario is presented: A user elects to view a shopping catalog through the Bi-Mode Multiple Cell 1 configuration to look for TV's and VCR'S. In choosing all of the assignment settings—directional flow of stream motion, speed, assignment of categories to left and right row—the MUI offers the user the possibility of further refining the search in the categories chosen. The user assigns a Visual Tag to the definition of "TV's & VCR's in the less than $500 range". When, as described above, the Visual Tag enters the visual field's orbit, i.e., above the right row, the user's perception of a VCR image in cell 2 indicates that this particular product falls under the parameter of "less than $500". At this juncture, the user may click on the image to interrupt the flow and access the in-depth textual description of the product—model #, order #, features etc.—or the user may click on the Visual Tag itself launching it into "Tag User Induced Access Mode", an action which summons the MUI to open a vertical row below cell 2 and present an image stream of all other VCR's that pertain to the set parameter (FIG. 19). Note that the regular stream motion of the right and left horizontal rows is at a standstill allowing the user to focus instead on the newly opened vertical row of streaming images.

DESCRIPTION OF MOTION IN VISUAL TAG SEARCH (VTS) CHANNEL

The motion utilized in the VTS channel depends on a streak motion effect. Thin lines streak at very high speed, running parallel to the channels bounding (enclosing) frame. When an image below the VTS channel matches the VTS defining parameter, the actual tag also reveals its own and distinctive stream motion while surrounded by the streak of thin lines. The tag itself may display frantically zigzagging lines, streaming perpendicular to the original streak motion effect (FIG. 18).

Such dramatic visual motions-are not to be mistaken for mere special effects, since their visual communicative values are calculated. The MUI presents an environment where most elements are in perpetual motion, motions that become effective for the user at very high speeds. As images occupy a prominent if not the most prominent position in the overall display, the VTS channel must rely on a visual methodology that is unobtrusive most of the time except when it must signal the user. The frantically zigzagging lines running perpendicular to the streak motion lines represent a striking opposite of value, thus rendering them effective.

SLIDE VIEW

Figure 23:
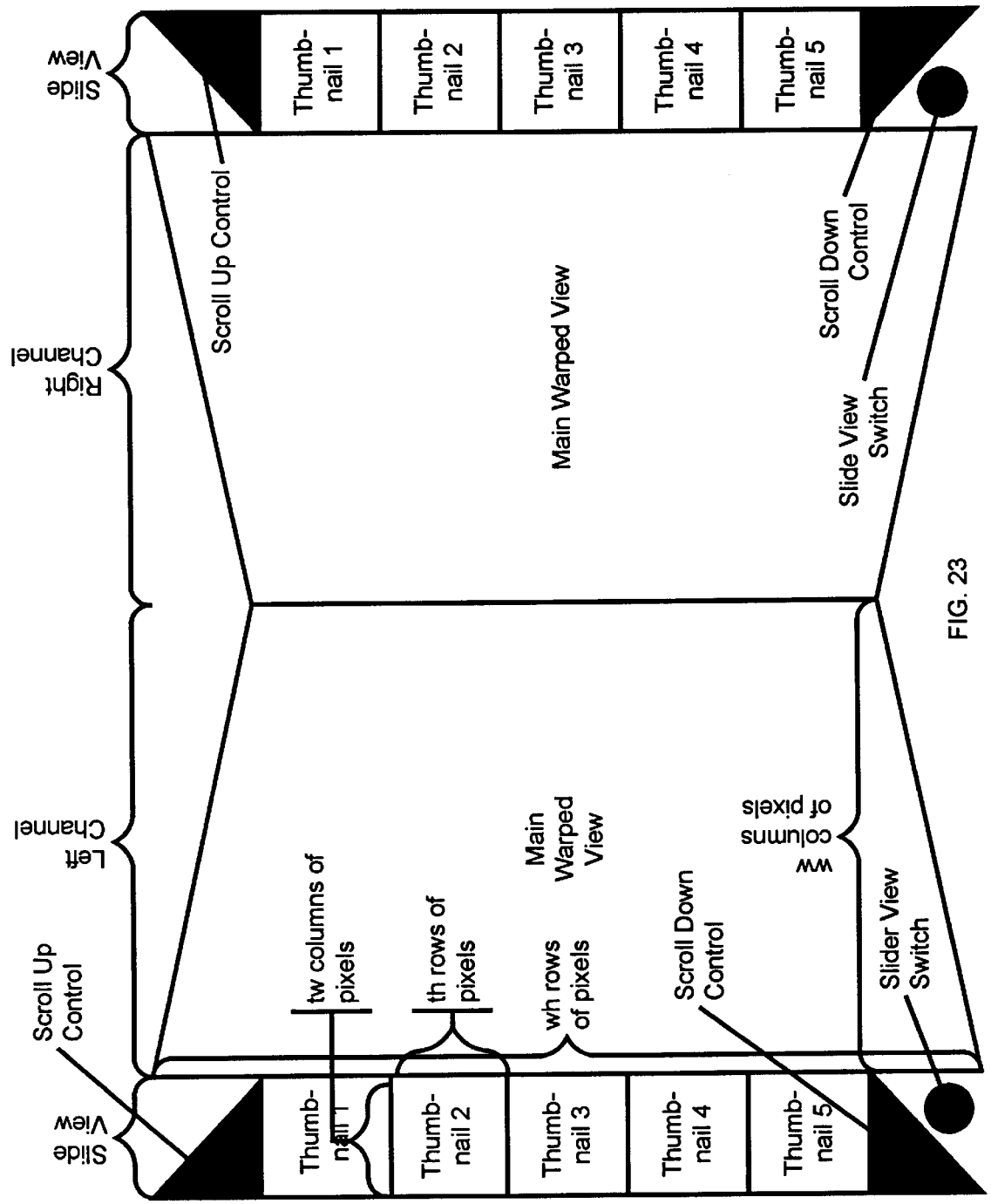
FIG. 23 shows the initial Bi-Mode layout along with a slide-view of individual image cells.
Figure 24:
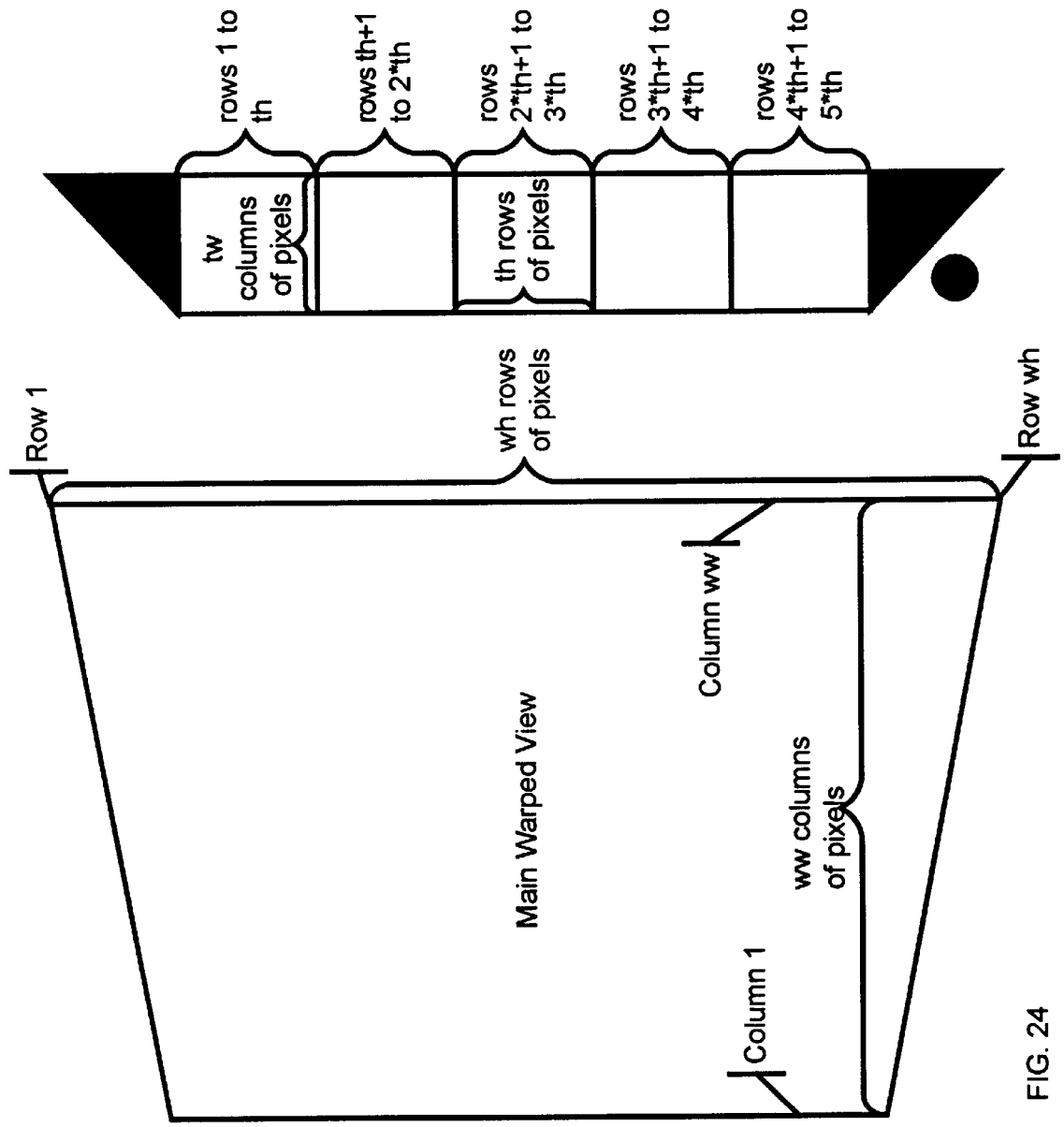
FIG. 24 shows a half panel view corresponding to FIG. 23.
Figure 25:
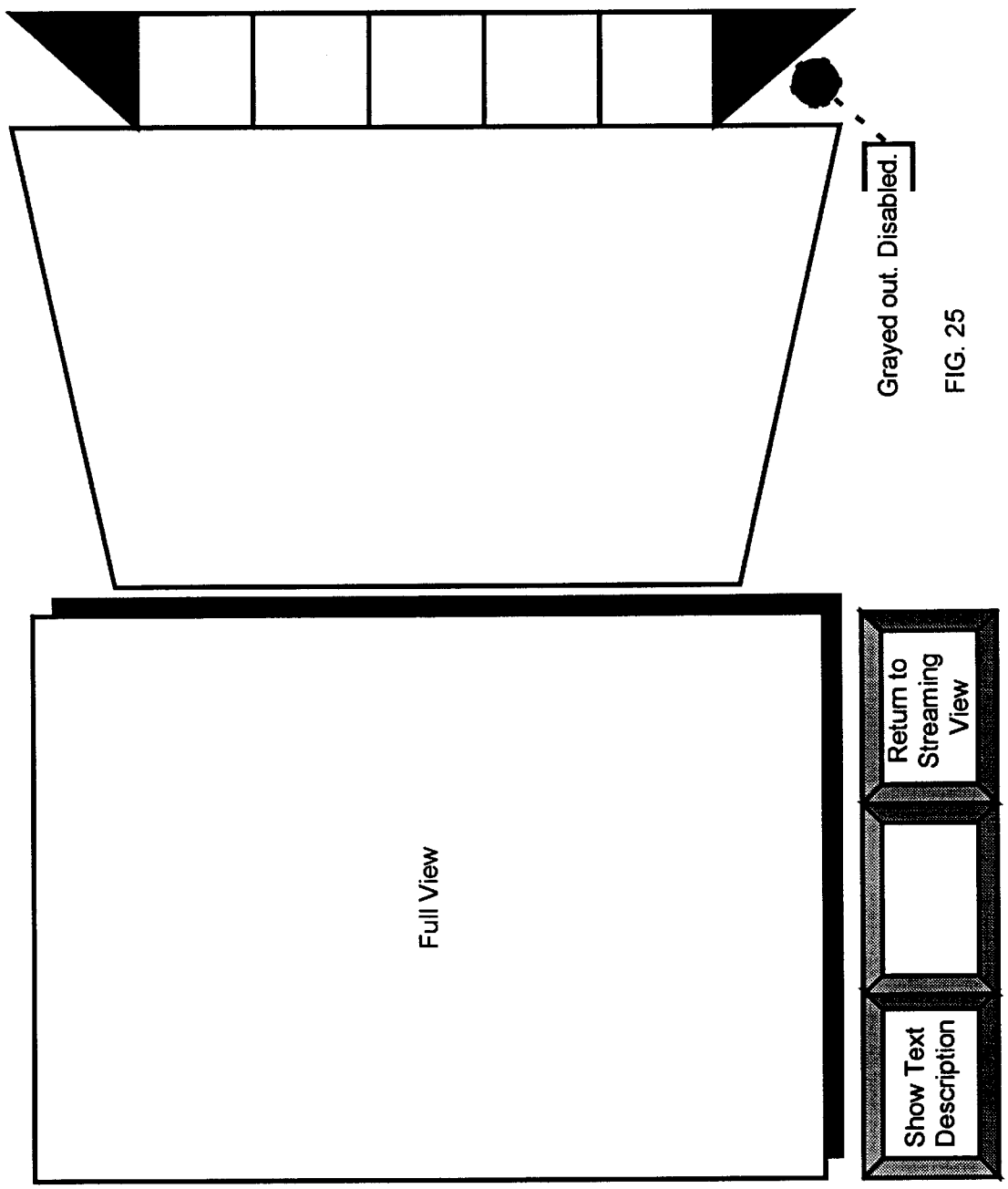
FIG. 25 shows a Bi-Mode layout when a picture on the right channel is selected.
Figure 26:
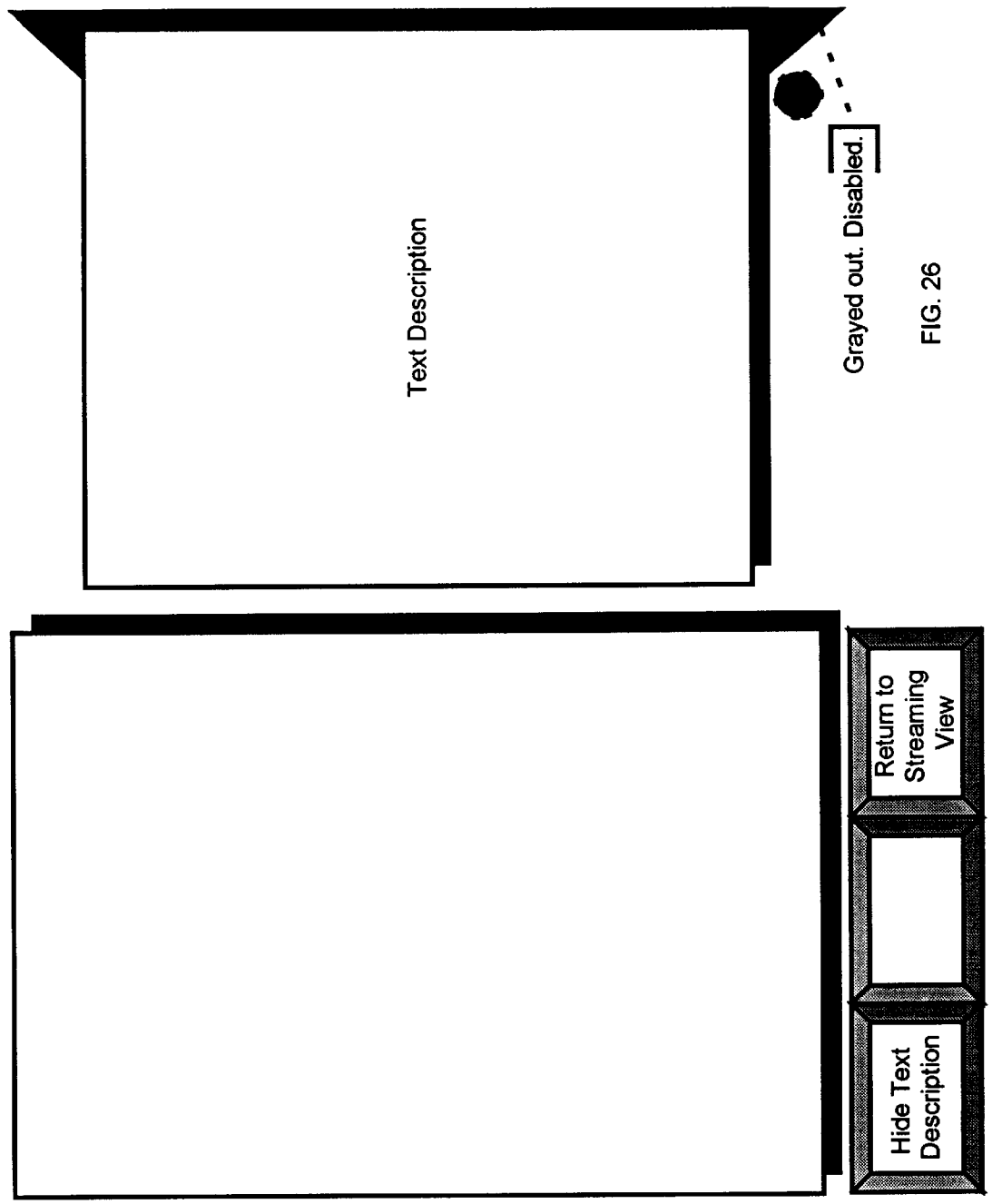
FIG. 26 shows a bi-Mode layout when the Text Description button is pressed (Right Channel picture selected).
Figure 27:
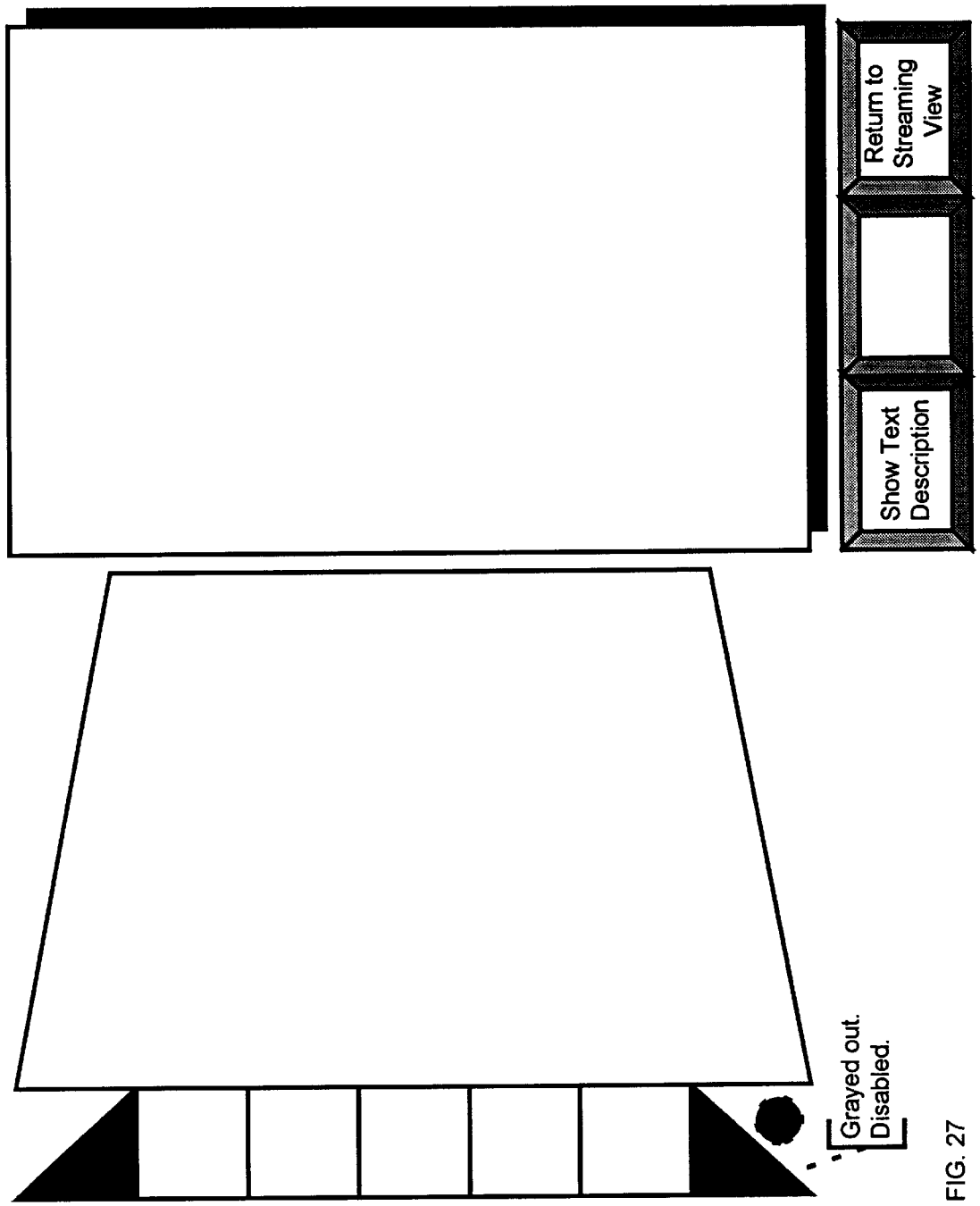
FIG. 27 shows a Bi-Mode layout when a picture on the left channel is selected.
Figure 28:
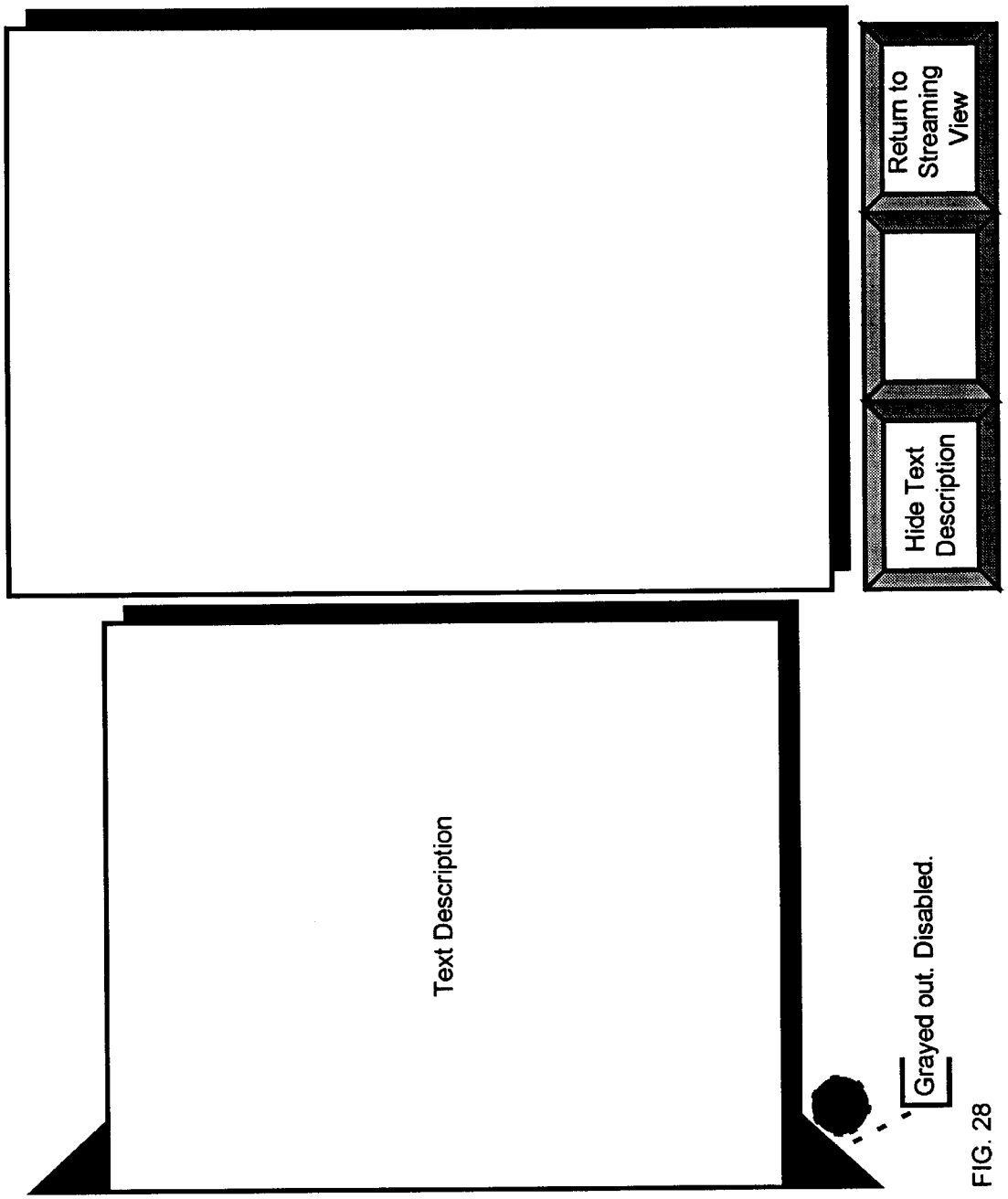
FIG. 28 shows a Bi-Mode layout when the Text Description button is pressed (Left Channel picture selected).
Figure 29:
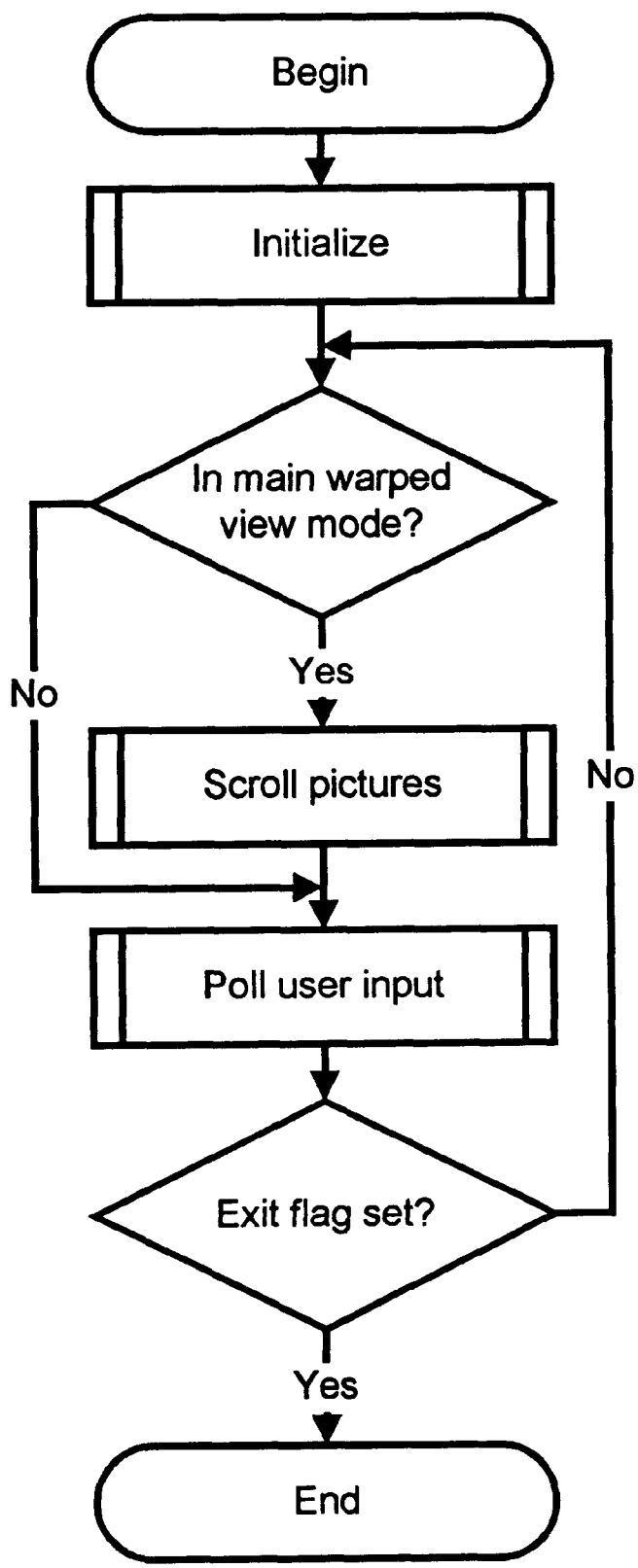
FIG. 29, Bi-Mode—Main Routine: shows the overview of how the Bi-mode works.

Slide View (FIG. 23) is a feature used in the beginner's Bi and Quad Mode which displays a slide view on the side of the respective quadrants with 4 or 5 mini-data cells, each equivalent to an image that is either in position in a quadrant, has just left the quadrant's position or is about to enter the quadrant's position. It allows the user to see the outgoing or incoming images and further establish a visual location of an image in relation to others. A Slide View will also move the mini-data cells in relation to the streaming images inside the quadrants.

Although the invention has been described in terms of its preferred embodiments, it is not intended that it be limited to these specific embodiments. Instead the invention is to be construed as broadly as is legally permitted as defined by the following claims.

I claim:

1. A data viewing terminal for displaying graphical indices corresponding to elements of a database of information, said terminal interfacing with a processor that displays said graphical indices as images moving across a viewing screen,
   said screen divided into a plurality of viewing segments, each viewing segment displaying said graphical indices in motion in a direction predetermined for said segment, such that the graphical indices in at least one pair of adjacent viewing segments move in opposing directions; and
   means for selecting one of said graphical indices;
   wherein said viewing segments are configured and said graphical indices are moving such that two input channels are presented to a visual cortex of a user.

2. The data viewing terminal for displaying graphical indices of claim 1, wherein each viewing segment has an apparent perspective vanishing point such that the motion of each image moves towards and decreases in size as it approaches the vanishing point of the segment.

3. The data viewing terminal for displaying graphical indices of one of claims 1 or 2 in which there are at least four viewing segments arranged of which three have graphical indices flowing in parallel directions and a fourth opposing direction.

4. The data viewing terminal for displaying graphical indices of one of claims 1 or 2 in which there are at least four viewing segments arranged so that there are two pairs of viewing areas having graphical indices flowing parallel within each pair and in opposing directions as between pairs.

5. A data viewing terminal for displaying graphical indices corresponding to elements of a database of information, said terminal interfacing with a processor that displays said graphical indices as images moving across a viewing screen,
   said screen divided into a plurality of viewing segments comprising left and right rows narrowing in perspective towards a central region, each viewing segment displaying graphical indices in motion towards said central region, such that the graphical indices in each viewing segment are present for a predetermined time before moving into the next adjacent segment; and
   means for selecting one of said graphical indices.

6. The data viewing terminal of claim 5, wherein the viewing terminal has an outer edge and motion of the segments towards a central vanishing point causes the viewer to view the outer edges of the data viewing terminal, whereby graphical indices at the outer edges are focused upon by the user.

7. The data viewing terminal for displaying graphical indices of claim 5 wherein each of said viewing segments comprises a parametric repeat pattern of identical pairs of graphical indices in reverse linear order, each pair comprising two elements moving in anti-parallel motion.

8. A data viewing terminal for displaying graphical indices corresponding to elements of a database of information, said terminal interfacing with a processor that displays said graphical indices as images moving across a viewing screen,
   said screen divided into a plurality of viewing segments comprising left and right rows broadening in perspective towards a central region, each viewing segment displaying graphical indices in motion towards said central region, such that the graphical indices in each viewing segment are present for a predetermined time before moving into the next adjacent segment; and
   means for selecting one of said graphical indices;
   wherein said viewing segments are configured and said graphical indices are moving such that two input channels are presented to a visual cortex of a user.

9. A data viewing terminal for displaying graphical indices corresponding to elements of a database of information, said terminal interfacing with a processor that displays said graphical indices as images moving across a viewing screen,
   said screen divided into at least four quadrants of viewing segments in which said graphical indices stream in parallel or anti-parallel directions, wherein at least one pair of adjacent elements moves antiparallel to an adjacent stream; and
   means for selecting one of said graphical indices;
   wherein said viewing segments are configured and said graphical indices are moving such that two input channels are presented to a visual cortex of a user.

10. The data viewing terminal of claim 9 in which only one quadrant has a graphical stream that move antiparallel to the remaining graphical streams.

11. The data viewing terminal of claim 9 in which two quadrants have graphical streams that move antiparallel to the remaining graphical streams.

12. A data viewing terminal for displaying graphical indices corresponding to elements of a database of information, said terminal interfacing with a processor that displays said graphical indices as images moving across a viewing screen,
   said screen divided into multiple cells of viewing segments having a perspective converging to a central portion of the screen, wherein the graphical images within each segment move toward said central portion; and
   means for selecting one of said graphical indices.

13. A data viewing terminal for displaying graphical indices corresponding to elements of a database of information, said terminal interfacing with a processor that displays said graphical indices as images moving across a viewing screen,
   said screen divided into multiple cells of viewing segments, wherein a plurality of said graphical indices are repeated in different cells and the motion of streams of said indices brings identical indices together during a portion of their motion; and means for selecting one of said graphical indices.

14. The data viewing terminal for displaying graphical indices of one of claims 1,2 and 5–13, wherein said viewing screen comprises one or more regions comprising luminance zones in which images are distinguished by color from indices outside said luminance zones.

15. A data viewing terminal for enabling a user to display graphical indices corresponding to elements of a database of information, said terminal interfacing with a processor that displays said graphical indices as images moving across a viewing screen,
said screen divided into multiple cells of viewing segments, wherein each cell is associated with a visual tag region moving in opposite directions, said tag regions each comprising one of at least first and second types, said second type being associated with cells having content that matches predefined parameters; and
said visual tag regions being associated with said second tag type being selectable by the user.

16. The data viewing terminal of claim 15, wherein said first type of tag comprises streaming lines and said second type of tag comprises a zig-zag pattern.

17. The data viewing terminal of claim 15, wherein said second tag type upon selection by the user acts as a trigger to expand its associated visual segment to open further visual segments.

18. The data viewing terminal of claim 17, wherein said further visual segments comprise a vertical row of segments.

19. A data viewing terminal for enabling a user to display graphical indices corresponding to elements of a database of information, said terminal interfacing with a processor that displays said graphical indices as images moving across a viewing screen,
said screen divided into a piano view of multiple cells of viewing segments that converge to a central portion of the screen, wherein said segments display information in a preset temporal sequence such that the order in which information is displayed to the different segments repeats in a regular sequence or series of sequences,
wherein said regular sequence or series of sequences are configured such that the visual cortex of a user can recognize the visual pattern of the regular sequence or series of sequences.

20. A data viewing terminal for enabling a user to display graphical indices corresponding to elements of a database of information, said terminal interfacing with a processor that displays said graphical indices as images moving across a viewing screen,
said screen divided into quadrants and aligned mini-data cells, each mini-data cell comprising a reduced copy of a corresponding image present in a quadrant or adjacent to a quadrant,
and such that the central mini-cell is equivalent to an image in a quadrant, and the central cell's adjacent mini-cells are equivalent to images that have already been displayed or are about to be displayed in a quadrant.

21. The data viewing terminal for enabling a user to display graphical indices of claim 20, wherein said mini-data cells contain information corresponding to streaming information within the quadrants.

22. A computer program product for presenting a plurality of images on a display, comprising:
at least one computer readable medium;
computer program instructions embodied in the at least one computer readable medium for a causing a computer to:
present a first subset of the plurality of images in a first viewing area of the display, each of the first subset of images moving in a first direction; and
present a second subset of the plurality of images in a second viewing area of the display, each of the second subset of images moving in a second direction;
wherein the first and second viewing areas are configured and the images are moving such that two input channels are presented to a visual cortex of a user.

23. The computer program product of claim 22 wherein the first and second directions are opposite each other.

24. The computer program product of claim 23 wherein the first and second directions are toward a central region of the display.

25. The computer program product of claim 23 wherein the first and second directions are away from a central region of the display.

26. The computer program product of claim 23 wherein the first direction is toward a top edge of the display and the second direction is toward a bottom edge of the display.

27. The computer program product of claim 22 wherein the computer program instructions further cause the computer to:
present a third subset of the plurality of images in a third viewing area of the display, each of the third subset of images moving in a third direction; and
present a fourth subset of the plurality of images in a fourth viewing area of the display, each of the fourth subset of images moving in a fourth direction;
wherein the first, second, third and fourth viewing areas are configured such that two input channels are presented to a user's visual cortex.

28. The computer program product of claim 27 wherein the first and second directions are opposite each other and the third and fourth directions are opposite each other.

29. The computer program product of claim 27 wherein the first and second directions are opposite each other and the third and fourth directions are the same.

30. The computer program product of claim 22 wherein each of the first and second viewing areas comprises an image region which narrows in aspect toward a central region of the display, the first and second subsets of images moving in their respective image regions.

31. The computer program product of claim 30 wherein each image region provides perspective views of the images therein, selected ones of the plurality of images being further toward the central region than others of the plurality of images and therefore appearing farther away than the others of the plurality of images.

32. The computer program product of claim 22 wherein each of the first and second viewing areas comprises an image region which is two-dimensional in appearance.

33. The computer program product of claim 22 wherein movement of the first and second subsets of images appears smooth to the user's visual cortex.

34. The computer program product of claim 22 wherein each of the first and second viewing areas comprises a plurality of image regions which move across the display in the first and second viewing areas in the first and second directions, respectively.

35. The computer program product of claim 34 wherein the computer program instructions further cause the computer to present each of the first and second subsets of images in a corresponding image region in the first and second viewing areas, each of the image regions periodically stopping for a predetermined period of time.

36. The computer program product of claim 34 wherein the computer program instructions further cause the computer to present each of the first and second subsets of images in a corresponding image region in the first and second viewing areas, each of the image regions appearing to the user's visual cortex to move smoothly across the display.

37. The computer program product of claim 22 wherein the computer program instructions further cause the computer to:

present first duplicates of the first subset of images in the first viewing area, each of the first duplicates moving in a third direction opposite the first direction; and present second duplicates of the second subset of images in the second viewing area, each of the second duplicates moving in a fourth direction opposite the second direction.

38. The computer program product of claim 37 wherein movement of the images and their duplicates causes each image to be presented adjacent its duplicate in a central portion of the viewing area in which each image is presented.

39. The computer program product of claim 22 wherein each of the first and second viewing areas comprises a first region having an increased luminance relative to a remaining portion of the viewing area thereby highlighting images in the first region.

40. The computer program product of claim 22 wherein the computer program instructions further cause the computer to visually identify at least one of the plurality of images in at least one of the first and second viewing areas according to at least one user specified criterion.

41. The computer program product of claim 40 wherein visual identification of the at least one of the plurality of images is effected by augmenting the at least one of the plurality of images.

42. The computer program product of claim 40 wherein the computer program instructions further cause the computer to present a visual tag region adjacent the images in each of the first and second viewing areas, the visual tag region having a particular characteristic when adjacent the at least one of the plurality of images.

43. The computer program product of claim 42 wherein the computer program instructions further cause the computer to enable the user to view an additional stream of images relating to the at least one of the plurality of images.

44. The computer program product of claim 43 wherein the additional stream of images is presented in response to the user selecting the at least one of the plurality of images.

45. The computer program product of claim 22 wherein the computer program instructions further cause the computer to:

provide a first image region in the first viewing area in which the first subset of images moves and second image region in the second viewing area in which the second subset of images moves;

provide a first slide view region in the first viewing area, the first slide view region presenting selected ones of the first subset of images; and provide a second slide view region in the second viewing area, the second slide view region presenting selected ones of the second subset of images.

46. The computer program product of claim 45 wherein the selected ones of the first subset of images comprises images currently moving through the first image region, images about to enter the first image region, and images which recently left the first image region, and wherein the selected ones of the second subset of images comprises images currently moving through the second image region, images about to enter the second image region, and images which recently left the first second region.

47. The computer program product of claim 45 wherein the first slide view region presents more of the first subset of images than the first image region, and wherein the second slide view region presents more of the second subset of images than the second image region.

48. A method for transmitting computer program instructions from a server to a remote device via a wide area network, comprising:

storing computer program instructions in a memory associated with the server, the computer program instructions being for causing a computer to:

present a first subset of the plurality of images in a first viewing area of the display, each of the first subset of images moving in a first direction; and present a second subset of the plurality of images in a second viewing area of the display, each of the second subset of images moving in a second direction;

wherein the first and second viewing areas are configured and the images are moving such that two input channels are presented to a user's visual cortex; and transmitting the computer program instructions from the server to the remote device.

49. A computer implemented method for presenting a plurality of images on a display, comprising:

presenting a first subset of the plurality of images in a first viewing area of the display, each of the first subset of images moving in a first direction; and presenting a second subset of the plurality of images in a second viewing area of the display, each of the second subset of images moving in a second direction;

wherein the first and second viewing areas are configured and the images are moving such that two input channels are presented to a user's visual cortex.

50. The method of claim 49 wherein the plurality of images are transmitted to a computer associated with the display from a remote platform via a wide area network, the computer having a computer readable medium in which computer program instructions for performing the method are stored.

51. The method of claim 49 wherein the plurality of images are transmitted to a computer associated with the display from a remote platform via a wide area network, the remote platform having a computer readable medium in which computer program instructions for performing the method are stored.

52. A computer, comprising:

memory;

a processor; and a display;

wherein computer program instructions are stored in the memory for causing the processor to:

present a first plurality of images in a first viewing area of the display, each of the first plurality of images moving in a first direction; and present a second plurality of images in a second viewing area of the display, each of the second plurality of images moving in a second direction;

wherein the first and second viewing areas are configured and the images are moving such that two input channels are presented to a user's visual cortex.

53. A computer program product for presenting a plurality of images on a display, comprising:
  at least one computer readable medium;
  computer program instructions embodied in the at least one computer readable medium for a causing a computer to:
    present a first subset of the plurality of images in a first viewing area of the display, each of the first subset of images moving within a first image region in a first direction; and
    present a second subset of the plurality of images in a second viewing area of the display, each of the second subset of images moving within second image region in a second direction opposing the first direction;
    wherein each of the first and second image regions narrows in aspect toward a central region of the display and provides perspective views of the images therein, and wherein the first and second viewing areas are configured and the images are moving such that two input channels are presented to a visual cortex of a user.

54. A computer program product for presenting a plurality of images on a display, the display being divided into a plurality of viewing regions, the computer program product comprising:
  at least one computer readable medium;
  computer program instructions embodied in the at least one computer readable medium for a causing a computer to:
    sequentially presenting a first subset of the plurality of images in the viewing regions according to a first pattern;
    after presenting the first subset, sequentially presenting a second subset of the plurality of images in the viewing regions according to a second pattern; and
    alternating between the first and second patterns for successive subsets of the images.

55. The computer program product of claim 54 wherein the display is divided into four viewing regions including an upper and lower left viewing regions and upper and lower right viewing regions, the first, second and successive sets each including four of the plurality of images, the first pattern being upper left, lower right, lower left, upper right, and the second pattern being upper left, lower left, upper right, lower right.

* * * * *